Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 1

INVENTORS
KENNETH A. BELL
RAYMOND J. KLOTZ
DONALD E. WALLIS
KARL K. WOMACK

BY Ronald J. Clark

ATTORNEY

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 3

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 7

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 20

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 21

Nov. 17, 1970 K. A. BELL ET AL 3,541,518
DATA HANDLING APPARATUS EMPLOYING AN ACTIVE STORAGE DEVICE
WITH PLURAL SELECTIVE READ AND WRITE PATHS
Filed Sept. 27, 1967 59 Sheets-Sheet 23

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 27

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 29

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 32

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 33

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 37

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 38

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 40

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 41

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 44

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 45

Nov. 17, 1970 K. A. BELL ET AL 3,541,518
DATA HANDLING APPARATUS EMPLOYING AN ACTIVE STORAGE DEVICE WITH PLURAL SELECTIVE READ AND WRITE PATHS
Filed Sept. 27, 1967 59 Sheets-Sheet 47

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 48

Nov. 17, 1970 K. A. BELL ET AL 3,541,518

DATA HANDLING APPARATUS EMPLOYING AN ACTIVE STORAGE DEVICE WITH PLURAL SELECTIVE READ AND WRITE PATHS

Filed Sept. 27, 1967 59 Sheets-Sheet 52

United States Patent Office 3,541,518
Patented Nov. 17, 1970

3,541,518

DATA HANDLING APPARATUS EMPLOYING AN ACTIVE STORAGE DEVICE WITH PLURAL SELECTIVE READ AND WRITE PATHS

Kenneth A. Bell and Raymond J. Klotz, Rochester, Minn., Donald E. Wallis, Marblehead, Mass., and Karl K. Womack, Endicott, N.Y., assignors to International Business Machines Corporation, Armonk, N.Y., a corporation of New York Filed Sept. 27, 1967, Ser. No. 670,919
Int. Cl. G06f *13/00;* G11c *9/00*
U.S. Cl. 340—172.5 5 Claims

ABSTRACT OF THE DISCLOSURE

The invention basically comprises a plurality of matrix storage devices, a plurality of addressable external registers, an arithmetic logic unit, and a data assembler and switching mechanism employing a plurality of transfer paths. The data assembler and switching mechanism disclosed responds to address information obtained from a main store, a local store, or external registers all of which can be addressed. Control information from the main store permits the data assembler and switching mechanism to transfer words or portions of words between the various storage devices, and controls the assembling of words of data utilizing portions of words obtained from various external registers, the local store, or the main store.

BRIEF SUMMARY OF THE INVENTION

The main data store matrix employed in the present invention has direct access to any desired external register. The external registers have direct access to the arithmetic logic unit and the output from the arithmetic logic unit has direct access to a plurality of external registers. A fast access working data store matrix is capable of rendering a plurality of output cycles for each data access to the main data store matrix. In interrupt and branch operations, data movement is kept to a minimum by the availability of the access paths between the external control registers and the working data matrix. More specifically, particular locations in the working data store matrix are pre-designated to receive the contents of predetermined control registers. The data accesses under branching and interrupt conditions are made with a single addressing configuration to address the control registers. During these accesses, direct transfer is made between the contents of the control registers and the pre-designated locations in the working data store matrix. The pre-designated locations and the use of a minimum number of control registers significantly reduce the number of memory accesses normally required under the interrupt and branching conditions. The independent address circuit operating with each storage device and the use of a multi-bit main data bus allow any storage location in the working data store to address any work location in the main data store matrix. The use of the working data store matrix as the repository of the various control features and functions of the present computer design provides increased performance by reducing the necessary accesses to these control registers.

The foregoing and other objects, features and advantages of the invention will be apparent from the following more particular description of a preferred embodiment of the invention, as illustrated in the accompanying drawings.

BRIEF DESCRIPTION OF THE SEVERAL VIEWS OF THE DRAWINGS

FIG. 3 shows the layout of FIGS. 3*a* through 3*m*;

FIGS. 3*a* through 3*m* are a detailed view showing the unit and sub-unit switching which occurs within the assembler and data switching circuit shown in FIG. 1;

FIG. 5 shows the arrangement of FIGS. 5*a* through 5*p*;

FIGS. 5*a* through 5*h* show a portion of the sub-unit identification means employed in the instant invention and FIGS. 5*i* through 5*p* show the storage access paths for the active store unit 17 shown in FIG. 1;

DETAILED DESCRIPTION

Figure 1:
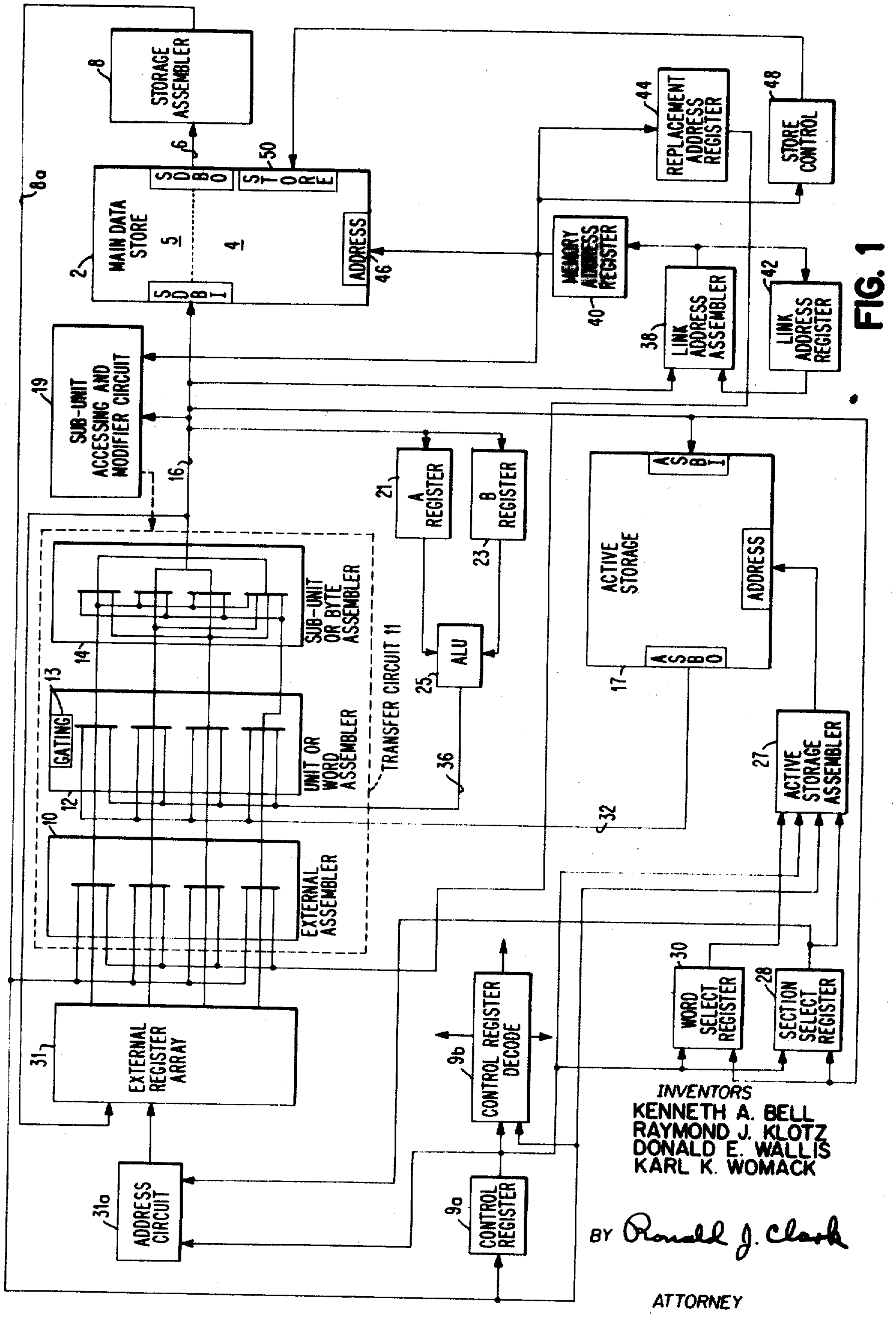
FIG. 1 is a general block diagram showing the main data paths employed in the instant invention.

Referring to FIG. 1, there can be seen a general block diagram showing the main data paths employed in the instant invention. It is the function of these data paths to transfer the data between a main data store matrix, a secondary data store matrix, an arithmetic logic unit, and an external array of registers. The term data refers generally to any combination of electrical manifestation normally found in a data processing system. More specifically, these refer to both instructions which commonly make up an operative program, control words which commonly make up a microprogram for directing the operation of a processing mechanism, and the actual data input which is to be operated upon in the manner determined by the instructions. A main data store 2 is of standard design employing cores, transistor stages, or any other well-accepted storage medium as the mechanism for storing an individual bit in a storage word. The words employed in the present environment comprise four individual bytes of data. Each of the bytes comprises eight binary bits of information and one bit of information is held in one storage element. Therefore, upon each access to the main storage circuit 2, 32 bits of information are interrogated from or written into the 32 corresponding storage elements. The main storage circuit 2 performs a second function and that is to store the control words in a control storage area 4 integral with a data and program information store 5. As is well known, the purpose of the control words is to control the logic manipulation within the remaining circuit elements of the central processing system whereby the data contained in the data storage sub-section 5 is effectively processed.

All information read from main storage is placed on a storeage data bus out 6 which transfers the words of information from main storage 2 to a storage data bus out assembler 8. The output of the assembler 8 is the assembler bus out **8*a*. The bus out 8*a* is applied to a control register 9*a* and subsequently to a control decode circuit 9*b* and directly to external assembler circuit 10. The assembler circuit 10 forms one stage of a multiple stage data switching circuit 11. The remaining stages comprise a unit or word assembler 12 and a sub-unit or byte assembler 14. Control words read from the control storage area 4 are placed in the control register 9*a* and then decoded in circuits distributed throughout the apparatus and represented by the control register decode 9*b* to bring up the proper gating and branching lines to perform the function indicated by the control word. Data read from the data storage area is gated into the external assembler 10. The data flow from the assembler 10 is thereafter under the control of the particular control word in command. Depending upon the particular control word presently being executed, the data is gated into the unit or word assembler 12 and thereafter selecttively gated in response to a gating circuit 13 into the sub-unit or byte assembler 14. The output of the sub-unit assembler 14 forms a main data bus 16. The main data bus 16 transfers words from the assembler 14 to an active storage circuit 17, a sub-unit accessing register and modifier circuit 19, and a pair of input registers 21 and 23, which form the input for an arithmetic logic unit 25. The bus 16 forms an input to the main storage unit 2. The active storage unit 17 is a secondary storage unit unrelated to main storage and comprises transistor storage elements for the storage of data. The selection of the transistor as the storage element is prompted out of the requirement that active storage have as fast an access time as is possible. Equivalent storage elements could be substituted therefor. The addressing of the active storage circuit 17 is accomplished by an active storage address assembler 27. The assembler 27 receives information from a plurality of sources including a section select register 28, a word select register 30, the storage assembler 8, the control register 9*a* and the decode circuit 9*b*. The registers 28 and 30 form a part of an external register array 31. However, because of their special application of furnishing address indicia to the assembler 27 they are specifically shown associated therewith. The external register array receives data input from bus 16. Individual registers, or predetermined groups of registers are selected to receive the data on the bus 16 by an address circuit 31*a*. The circuit 31*a* also receives input address indicia from the control register 9*a* and the section select register 28. The bus 8*a* also forms an input to the decode circuit 9*b*. The active storage X and Y drive lines are the output of the assembler 27. Data is fed into the active storage circuit 17 from the main data bus 16 and is read from local storage onto an active storage bus out 32 and is entered into the unit assembler 12**.

The external assembler circuit 10 is a group of gating circuits that receive data words from the storage assembler 8 and a group of hardware registers in the array 31. The output of the external assembler 10 forms one input to the unit or word assembler 12.

The unit assembler 12 is divided into four sets of latch type circuits; each set may hold one byte of data. The input to the word assembler 12 is from the external assembler 10, active storage bus out 32 and an arithmetic bus 36. The output of the unit assembler 12 is applied to the sub-unit assembler 14.

A memory address assembler 38 is associated with the main data store 2 and its output is applied to a memory address register 40 and a link address register 42. The output of register 40 is applied to a replacement address register 44 and to an address circuit 46 in main storage 2. The output of the register 40 is applied to a store control circuit 48 which in turn activates a store circuit 50 with control signal. The output of the register 44 forms an input to the assembler 10.

Figures 2, 2O:
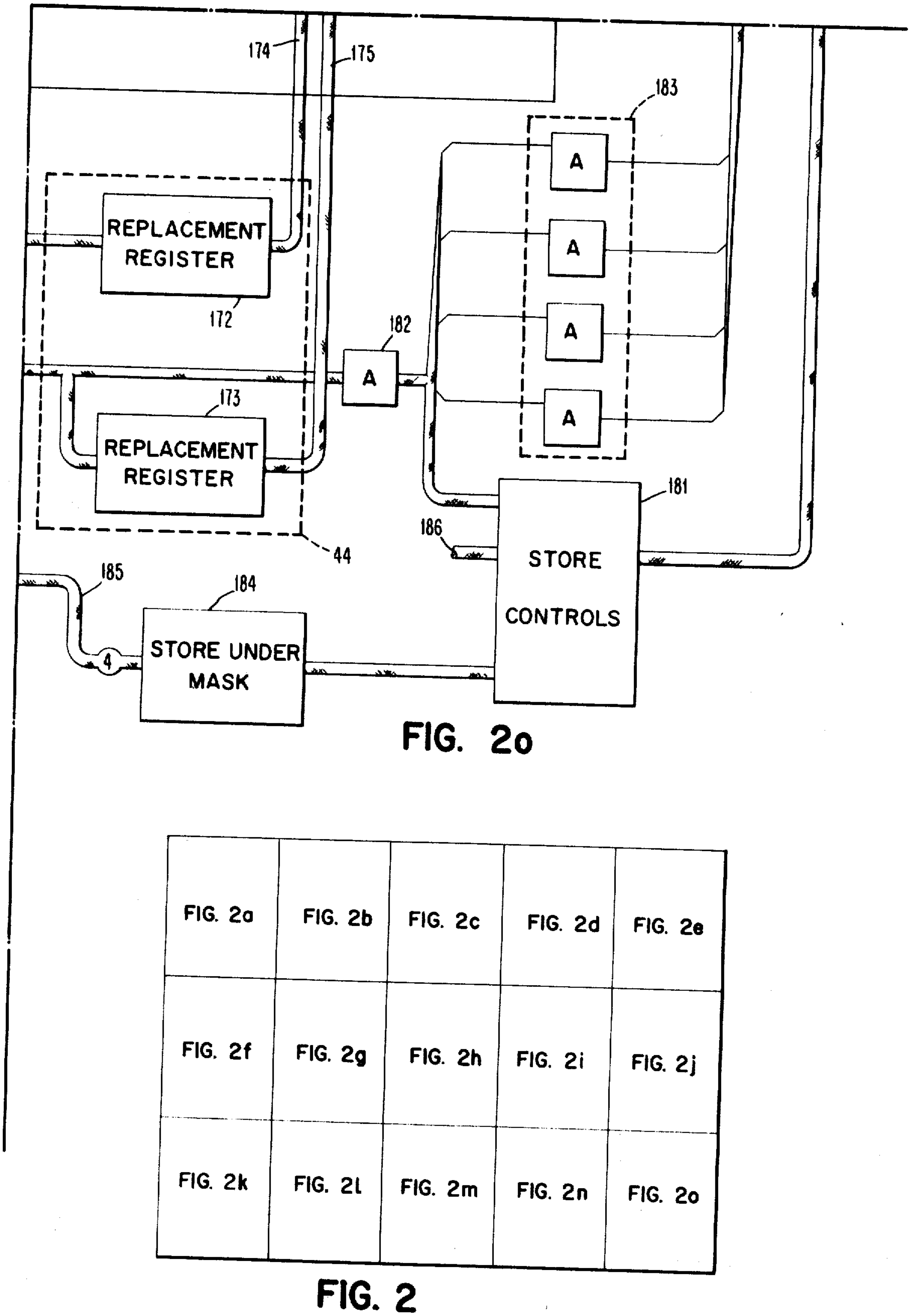
FIG. 2 shows the layout of FIGS. 2*a* through 2*o*.
Figure 2A:
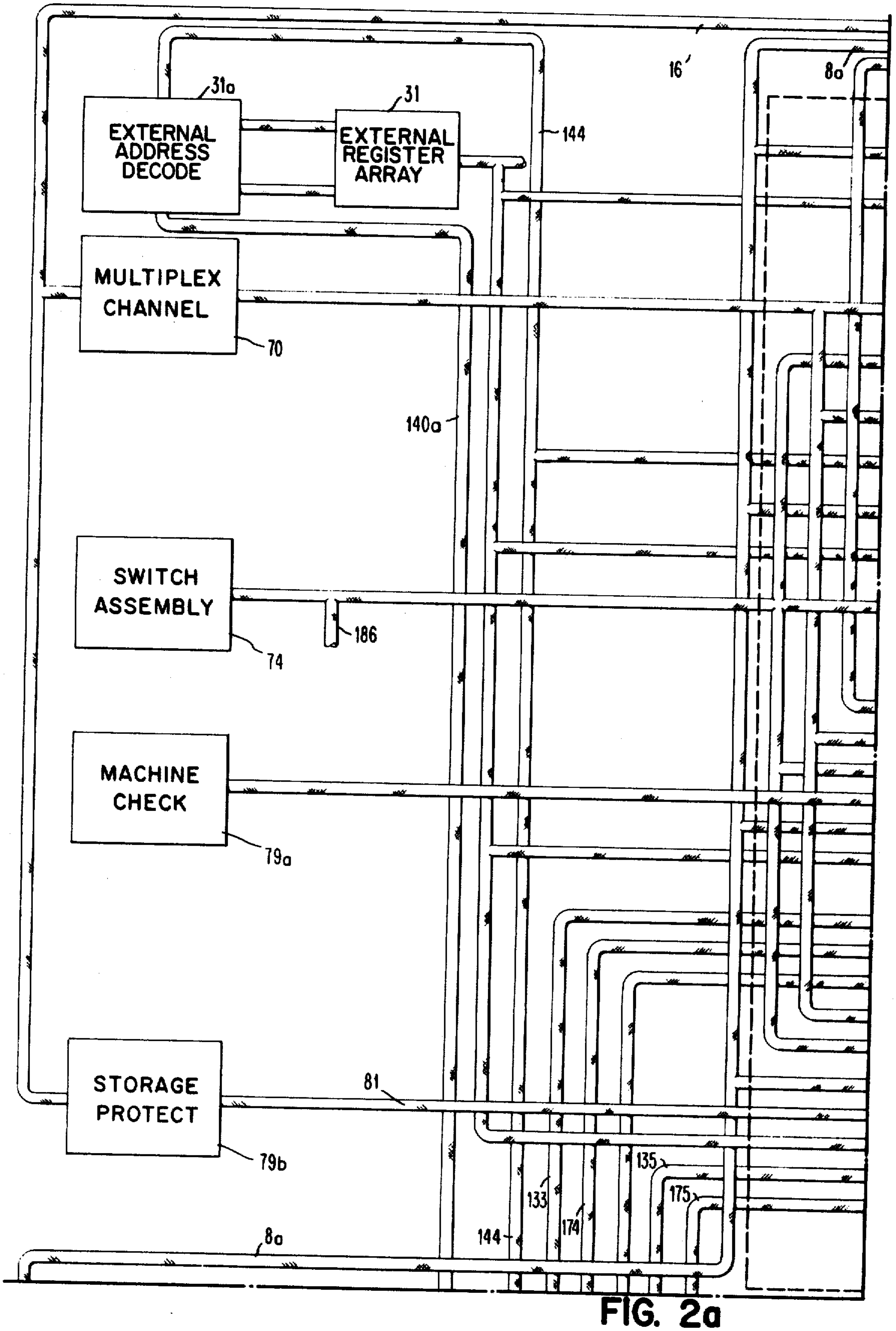
FIGS. 2*a* through 2*c* are a block diagram showing a more detailed layout of the instant invention.
Figure 2B:
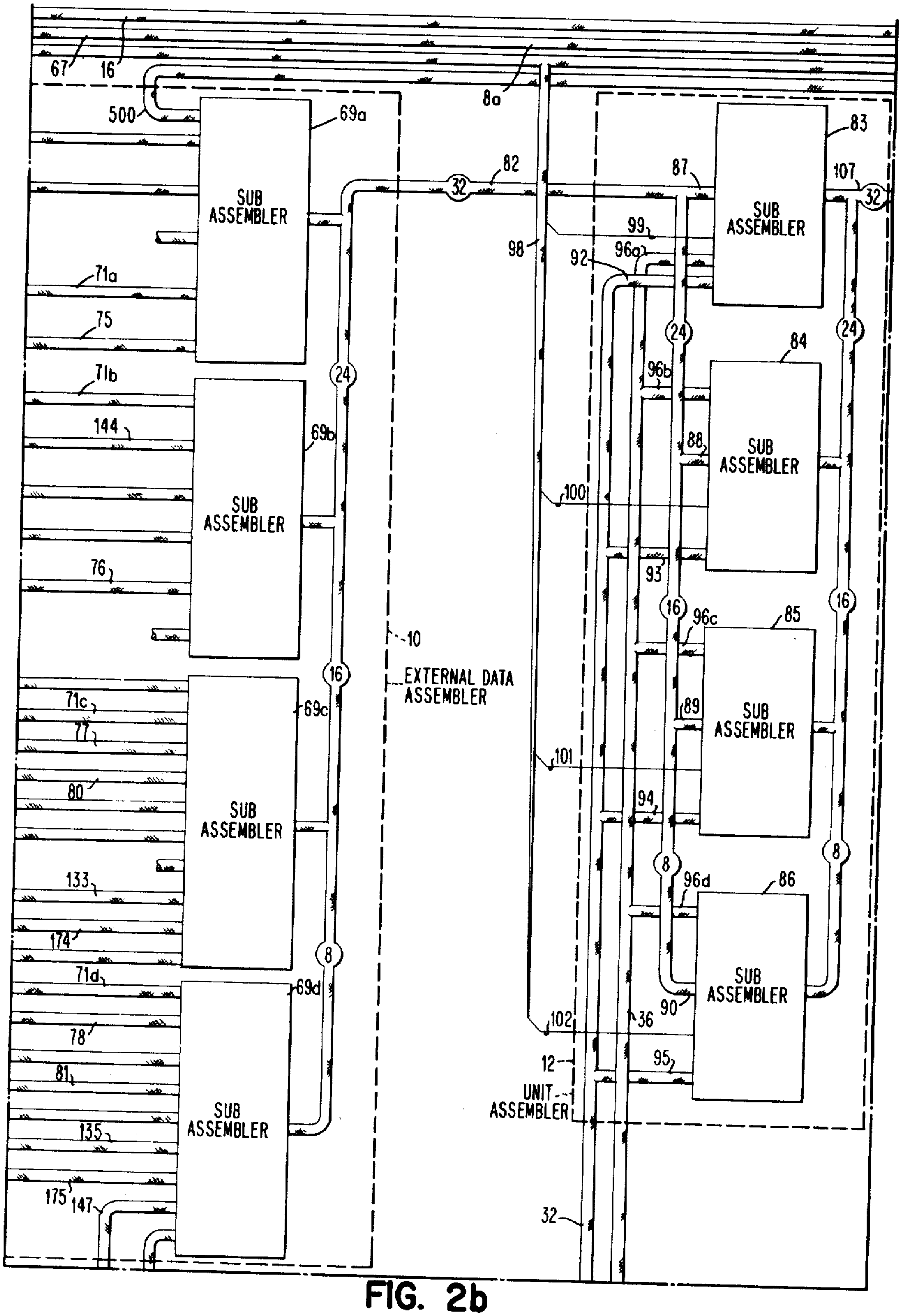
Figure 2C:
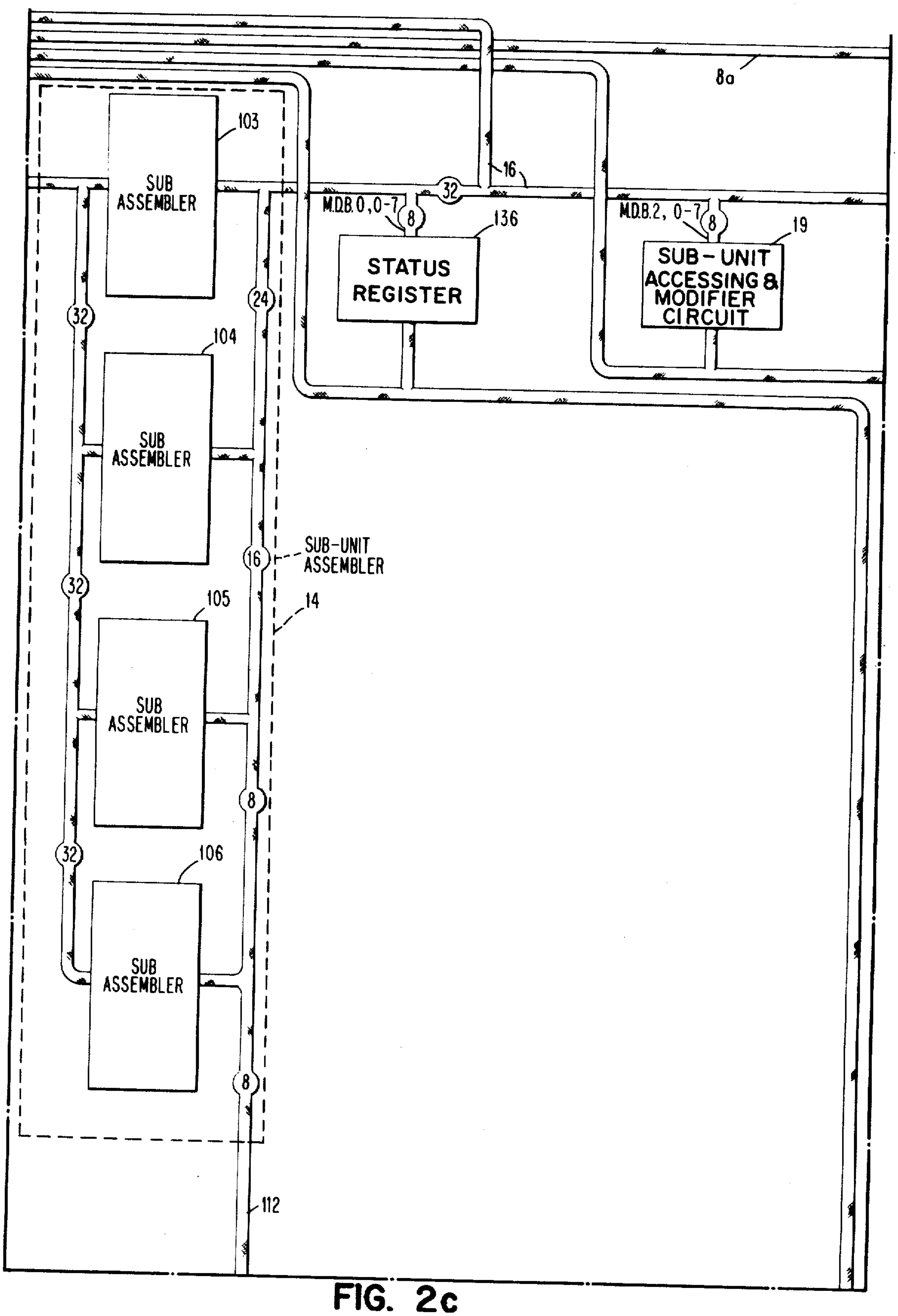
Figure 2D:
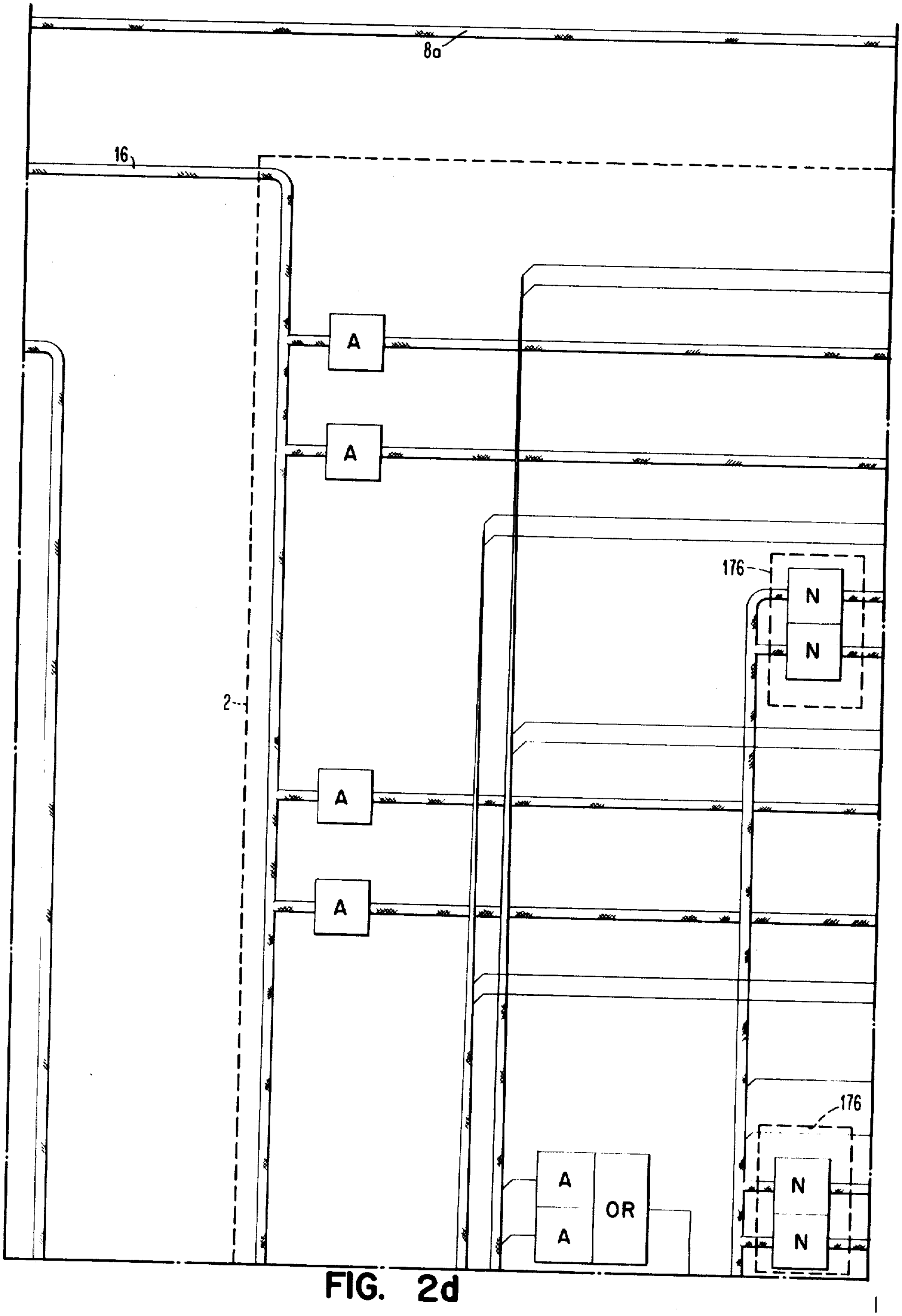
Figure 2E:
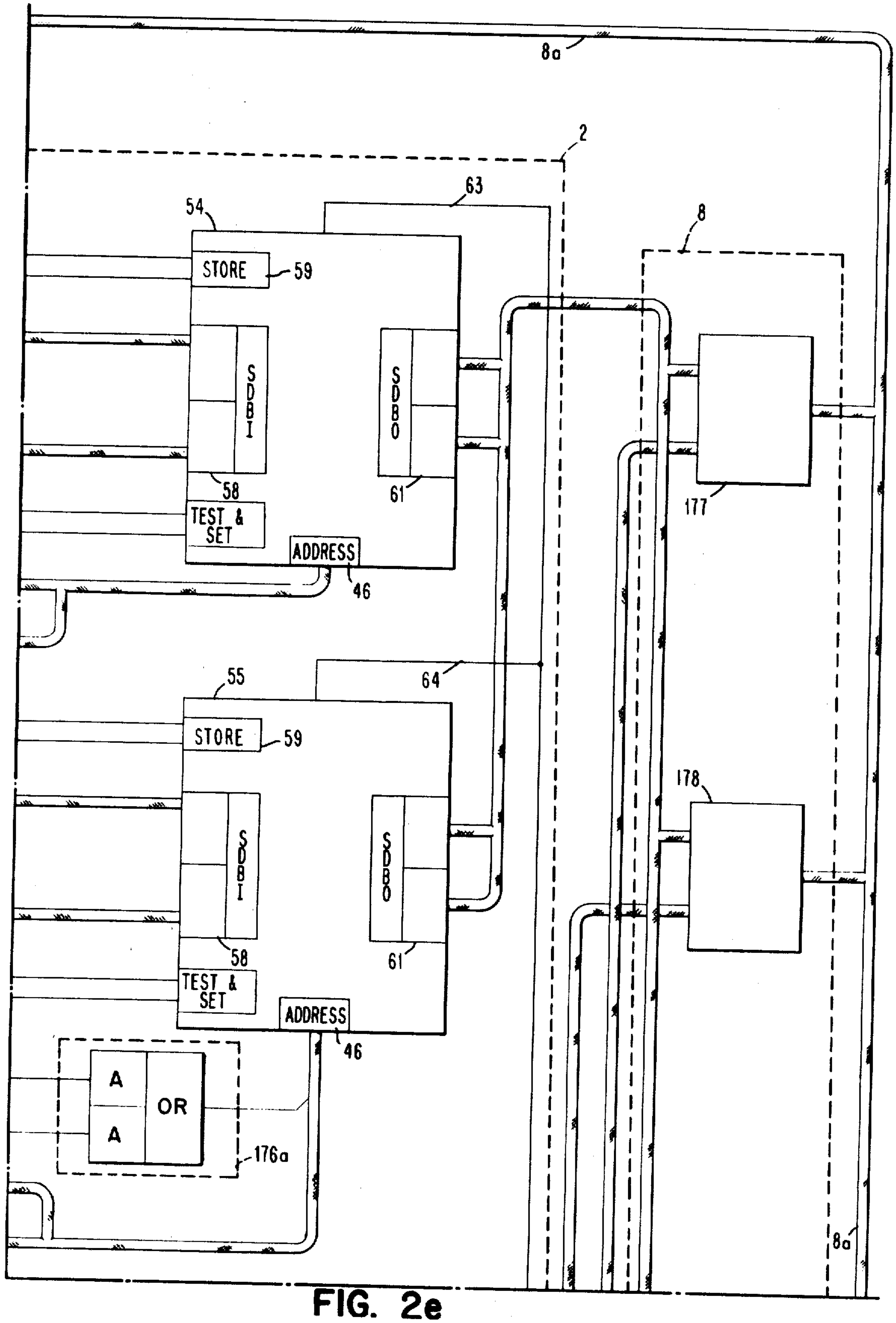
Figure 2F:
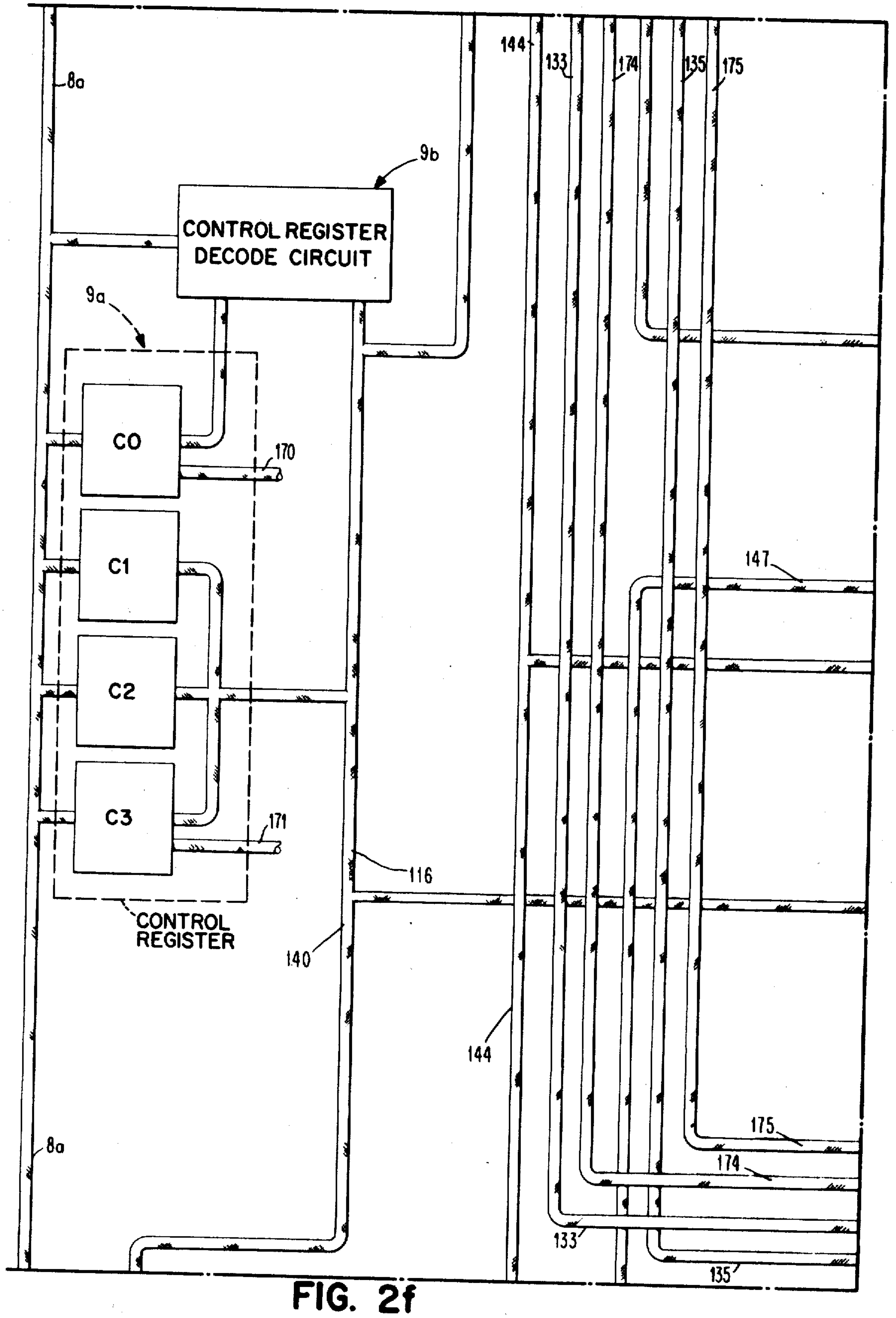
Figure 2G:
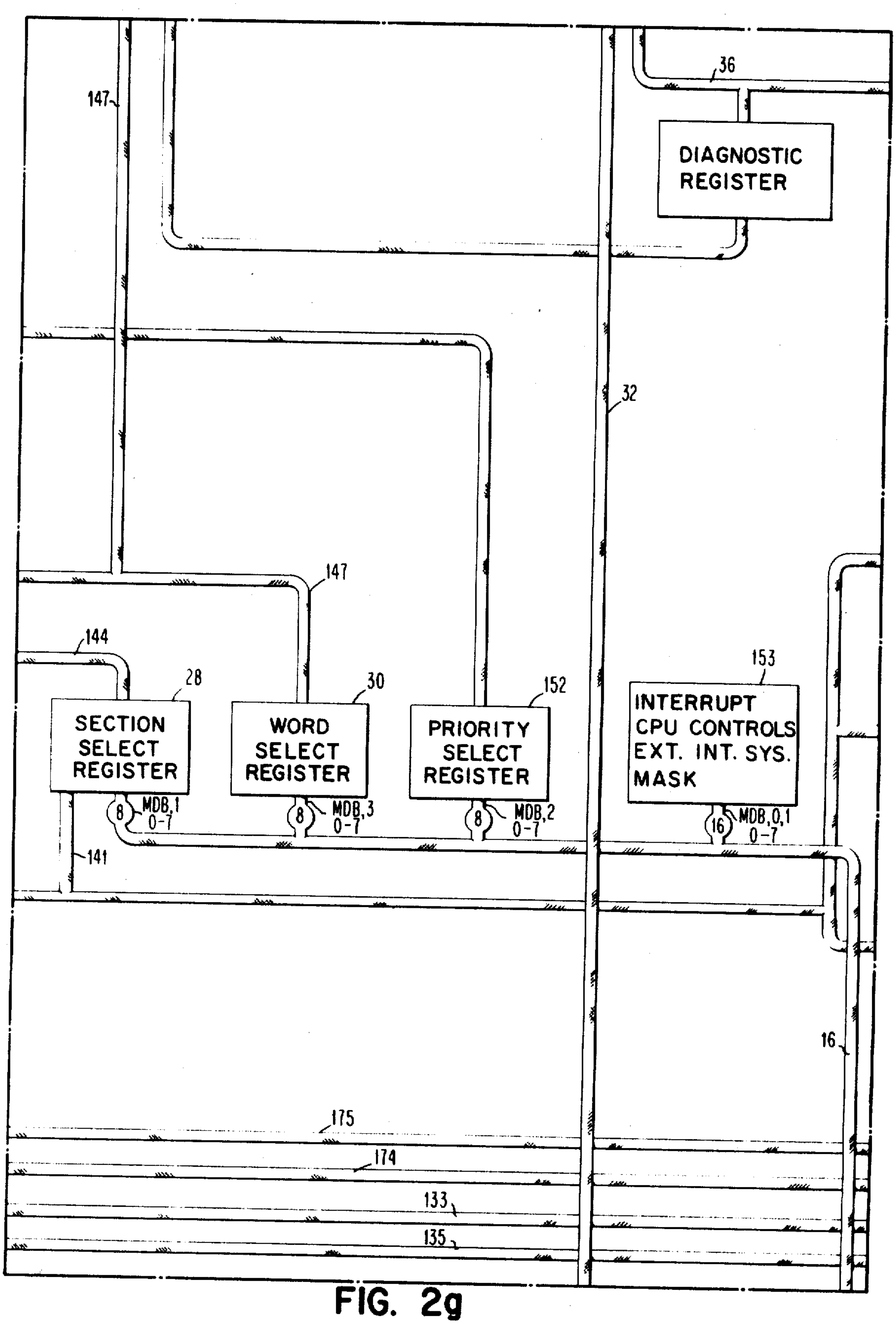

Referring to FIGS. 2*a* through 2*c* there can be seen a more detailed block diagram of a data processing system which can advantageously employ the present invention. A main storage circuit 2 is of standard design, employing cores, transistor stages, or any other well-accepted storage medium as a mechanism for storing an individual bit in a storage word. The memory selected is of the expanable type employing a plurality of basic operation modules (BOM) 54 through 57, shown in FIGS. 2*e* and 2*j*. Each of the modules 54 through 57 is comparably equipped and employs the following enumerated circuits as ancillary circuits to the basic storage medium. A storage data bus in (SDBI) circuit 58 accepts the information from the main data bus 16. A store circuit 59 is an enabling circuit which indicates that the information available on the SDBI 58 associated with the BOM having the active store circuit 59 is to be stored at the location indentified by the contents of the address circuit 46. In summary, the store circuit 59 provides a half select current to all locations in the selected BOM and the lines selected by the address in the address circuit 46 supply the remaining required half select current. The line selected thereby is energized to accept data from the SDBI 58. In a write-out situation, the word selected by the address circuit 46 interrogates a word location and reads it out into the storage data bus out (SDBO) circuit 61.

Each of the remaining basic operating modules is comparably equipped for storing or for reading out a unit of information, which unit comprises 16 data bits. As a matter of convenience, this unit is further divided into byte sizes comprising eight data bits. Therefore, a basic operating module contains a half word of information. A BOM select control circuit 62 is the means whereby pairs of the BOM's are selected. The details of the BOM select control are well known in the prior art. Briefly, this circuit operates to enable pairs of a plurality of output lines 63 through 66 in various combinations for reading out two half words into the storage data assembler 8. The output of the storage data assembler 8 is the storage data assembler bus out (SDABO) **8*a*. This bus 8*a* comprises, as a matter of convenience for the present embodiment, a full unit of information or, more specifically, 32 data bits. This means that the SDABO 8*a* accepts in any combination an output from the various BOM's 54 through 57. Furthermore, the SDABO combines these half words in such a manner as to properly present, in parallel, a full unit of information or a full word to the external assembler 10**.

The external assembler 10, shown in FIG. 2*b*, has a separate sub-assembler **69*a* through 69*d* responsive to each sub-unit of information. As previously mentioned, the information carried by SDABO 8*a* is a word comprising four bytes; therefore, each sub-assembler 69*a* through 69*d* handles one byte. The external assembler accepts information from an additional plurality of sources. For example, information from a multiplex channel 70 is distributed among the sub-assemblers 69*a* through 69*d* by the buses 71*a* through 71*d* respectively. The multiplex channel also is 32 bits in width and the corresponding bytes are applied to the correspondingly numbered sub-assemblers in the external assembler 10. An additional input is from the various switches on the console panel shown as a switch assembly 74. The switches 74 are able to enter information, especially addresses, into the main memory by way of the external assembler 10. Each switch has the capability of entering one hexidecimal digit. Since the hexidecimal digit requires four binary bits of information for description thereof, each sub-assembler is capable of accepting two switch positions. The switches are identified as AB, CD, EF, GH and are applied to the sub-assemblies 69*a* through 69*d* by the buses 75 through 78 respectively. Additional sources of information for application to the external assembler originate in a machine check register 79*a*. The machine check register only finds access to the external assembler 10 by sub-assembler 69*c* over a bus 80. The storage protect register 79*b* is applied to the sub-assembler 69*d* by a bus 81. The external address decode circuit 31*a*** and the external register gating circuits are shown in greater detail with reference to FIG. 4.

The output of the external assembler 10 is applied to the word or unit assembler 12 by a bus 82 capable of carrying a full unit of information or 32 bits separated into four byte channels. The unit assembler 12 comprises four sub-assemblers 83 through 86 each capable of handling a sub-unit of information or a byte. The respective channels of bus 82 are distributed among the sub-assemblies 83 through 86 by a plurality of buses 87 through 90 respectively. The unit assembler 12 receives a second series of input signals from the active storage circuit 17 over an active storage bus 32. Corresponding bytes from the active storage bus 32 are applied to the sub-assemblers 83 through 86 by a plurality of buses 92 through 95 respectively. In this manner, byte 0 from the ASBO 32 is applied to the sub-assembler 83 associated with byte 0 from the data bus 82. An additional input to the unit assembler 12 is applied thereto from the arithmetic logic unit 25 by the arithmetic bus 36. The bus 36 has the capacity of carrying in parallel the output from the ALU 25. In this embodiment, the bus carries eight data bits or one byte. This byte is applied selectively in parallel to the sub-assemblers 83 through 86 by a plurality of buses 96*a* through 96*d* respectively.

The sub-assemblers 83 through 86 are gated to the byte or sub-unit assembler 14 by a series of enabling signals on an accessing bus 98. These enabling signals are applied to the various sub-assemblers 83 through 86 by an equal plurality of gating lines 99 through 102 respectively. These gating signals not only enable the output from the associated sub-assembler 83 through 86 respectively, but also open the input gate to a respective sub-assembler 103 through 106 in the sub-unit assembler 14. In this manner, the contents of the sub-assemblers 83 through 86 can be gated to a sub-assembler 103 through 106 within the sub-unit assembler 14. However, this is only one of the gating arrangements available within the instant invention. The information from the unit assembler 12 is gated to the sub-unit assembler 14 over a bus 107. Again the bus 107 is capable to carrying four bytes or four sub-units of information from the output of the unit assembler 12. This bus 107 is applied to each of the sub-assemblies 103 through 106 of the byte assembly 14 which are shown in greater detail hereinafter with reference to FIGS. 3*a* through 3*h*. The output from the sub-unit assembler 14 is the main data bus 16 which is capable of carrying four bytes of information or a full unit of information.

Figure 2H:
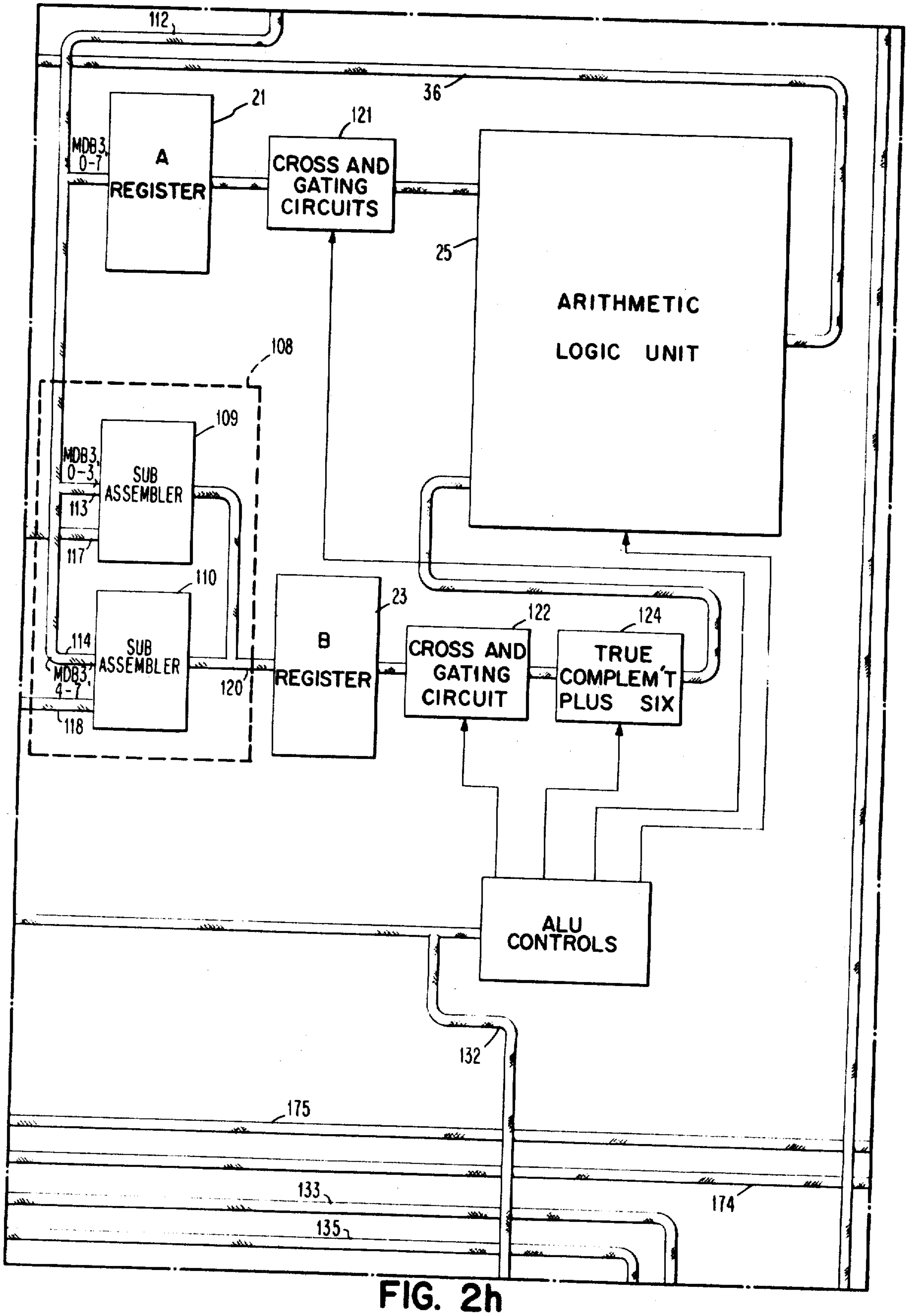
Figure 2I:
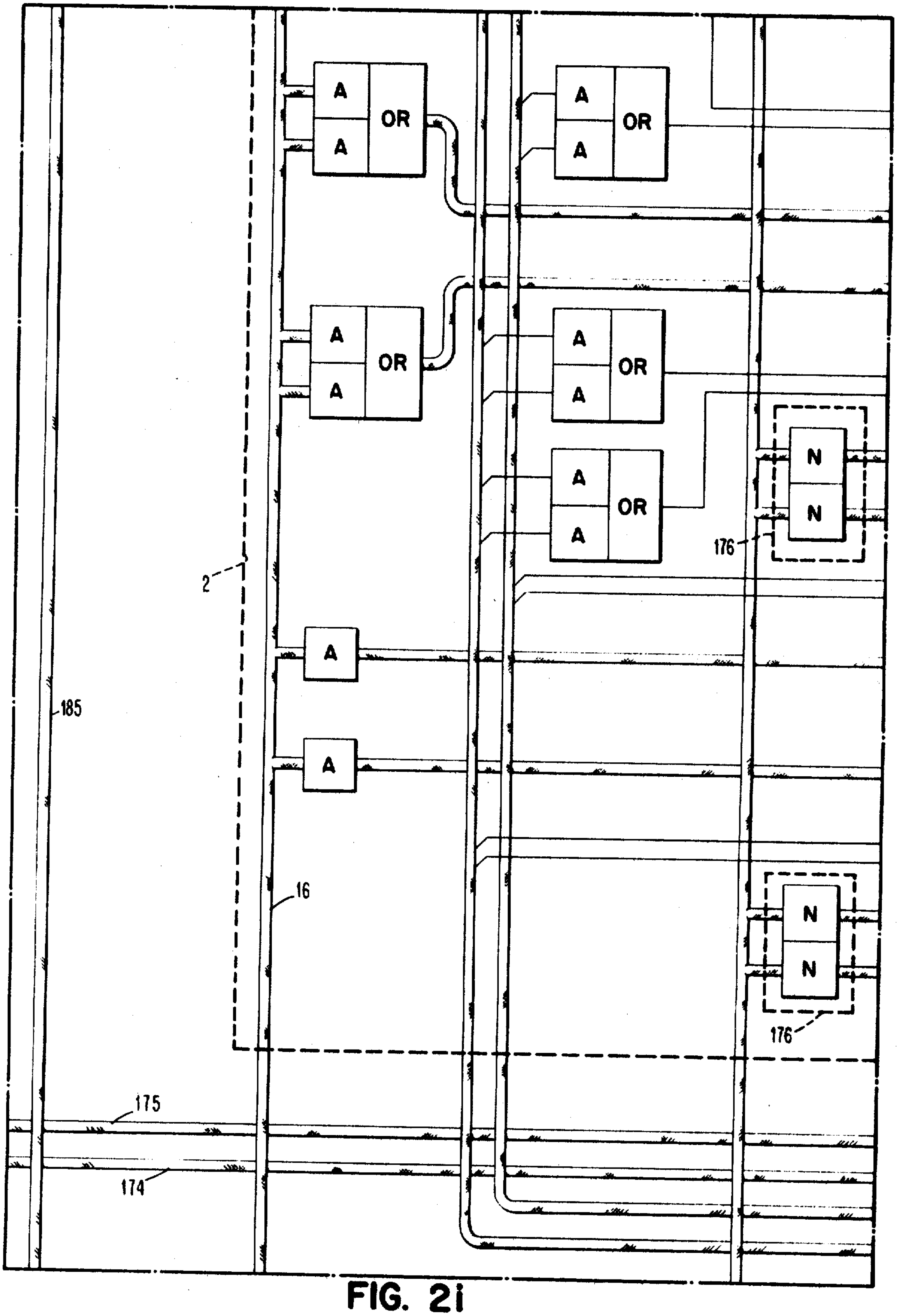
Figure 2J:
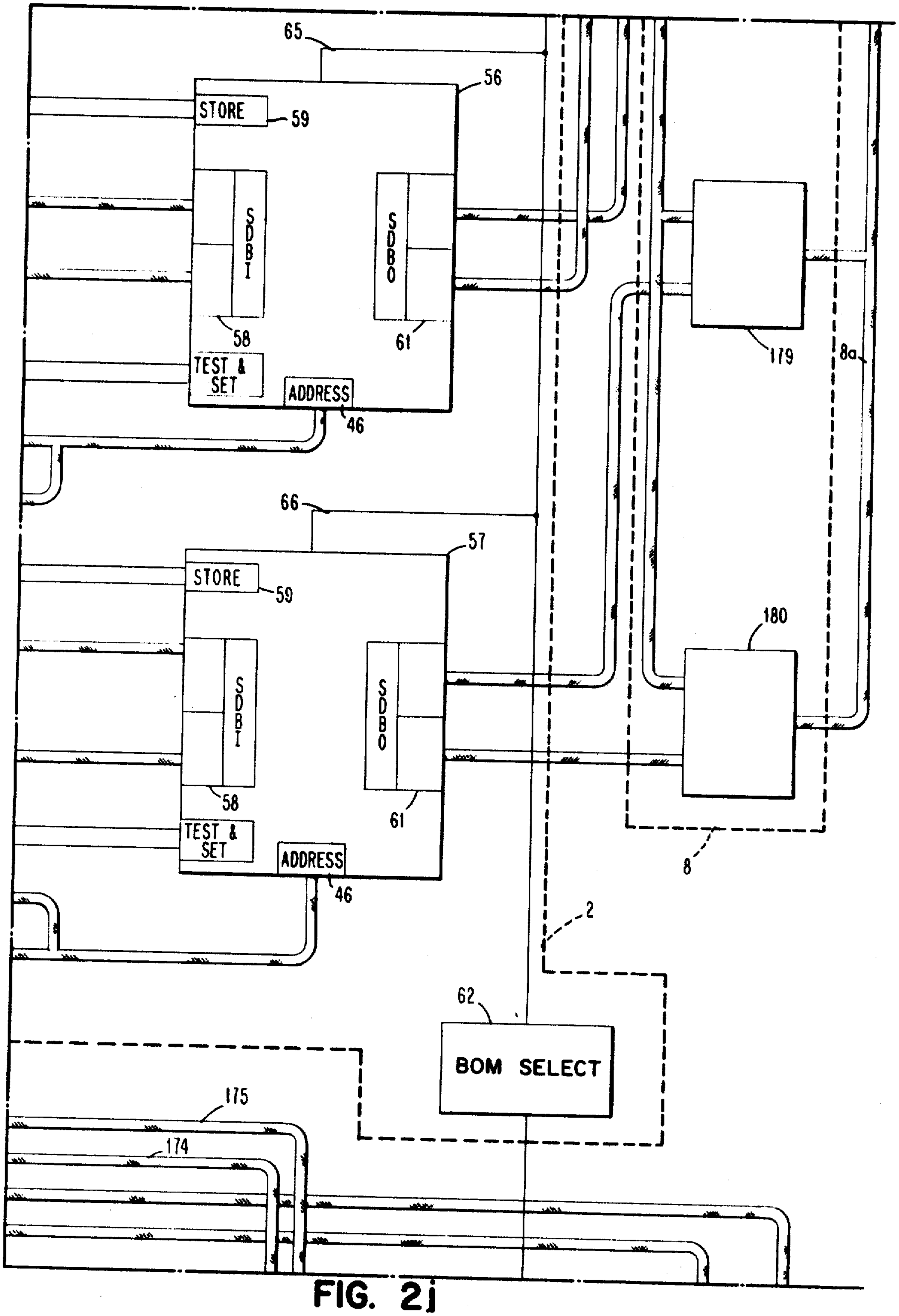

The output from the sub-unit assembler 40 is applied in parallel to the A register 21 and a B register assembler 108, shown in FIG. 2H. The B assembler 108 comprises a plurality of sub-assemblers 109 and 110. The output from the sub-assembly 106 can be selectively applied to either of the sub-assemblers 109 and 110 over a bus 112 comprising additionally a plurality of buses, 113 and 114, applied to the respective sub-assemblies 109 and 110. The sub-assemblers 109 and 110 have a further series of input signals applied thereto over a control register bus 116. The bus 116 is three bytes or 24 bits in width and is applied selectively to either of the sub-assemblers 109 and 110 by an additional pair of buses 117 and 118 respectively. The output of the B assembler 108 is applied to the B register 23 by a B assembler output bus 120. The A register 21 and B register 23 inputs to the ALU 25 are applied thereto by well-known cross and partial gating circuits 121 and 122 respectively. The gating circuit 121 is capable of crossing the high four bits with the low four bits or gating only the high four bits or the low four bits to the ALU 25. The gating circuit 122 is capable of gating only the high four bits or the low four bits of the B register 23 to the ALU 25. A true complement and plus six circuit 124 is located intermediate the circuits 122 and 25. The details of any of these circuits are not necessary for the understanding of the present invention.

The mechanism for generating an address in main memory 2 is the memory address register 40 and the memory address assembler 38. The link address register 42 provides a mechanism for saving the last previous contents of the register 40 in response to a branching situation. The register 40 comprises a further plurality of registers 125 through 127 and each register has the capacity for storing one byte of address information and the bytes are called the M1, M2 and M3 bytes respectively. The register 42 comprises a pair of individual byte registers 128 and 129. The memory address assembler 38 comprises two sub-assemblers 130 and 131. Like all other assemblers, the assembler 38 receives information from a plurality of input sources and also control signals from the control register 9*a* over a bus 132 and the bus 116. The register 9*a* comprises a unit of information comprising four bytes of control data. The control register decode circuit 9*b* operates to decode the various inputs from the register 9*a*. The output of the decode circuit 9*b* is distributed throughout the remaining part of the circuitry to enable the gating of information from and into the remaining circuits of the machine.

The remaining inputs to the sub-assembler 130 comprise the output of the register 128 as applied by a bus 133, and the output of the unit sub-assembler 85 as applied thereto through the sub-assembler 105 and by the bus 16 and a further bus 134. The contents of the bus 133 are applied also to sub-assembler 69*c*. The remaining inputs to the sub-assembler 131 comprise the output of the register 129 as applied by a bus 135, the output of a status register 136 as applied by a bus 137 and the output of the sub-assembler 86 as applied thereto through the sub-assembler 106 and by the bus 16 and a further bus 138. The contents of the bus 135 are applied also as an input to the sub-assembler 69*d*.

The memory address assembler 38 selectively gates data bits from the main data bus 16, from the link register 42, from the current control word, or the status register 136 into the register 40.

Figure 2K:
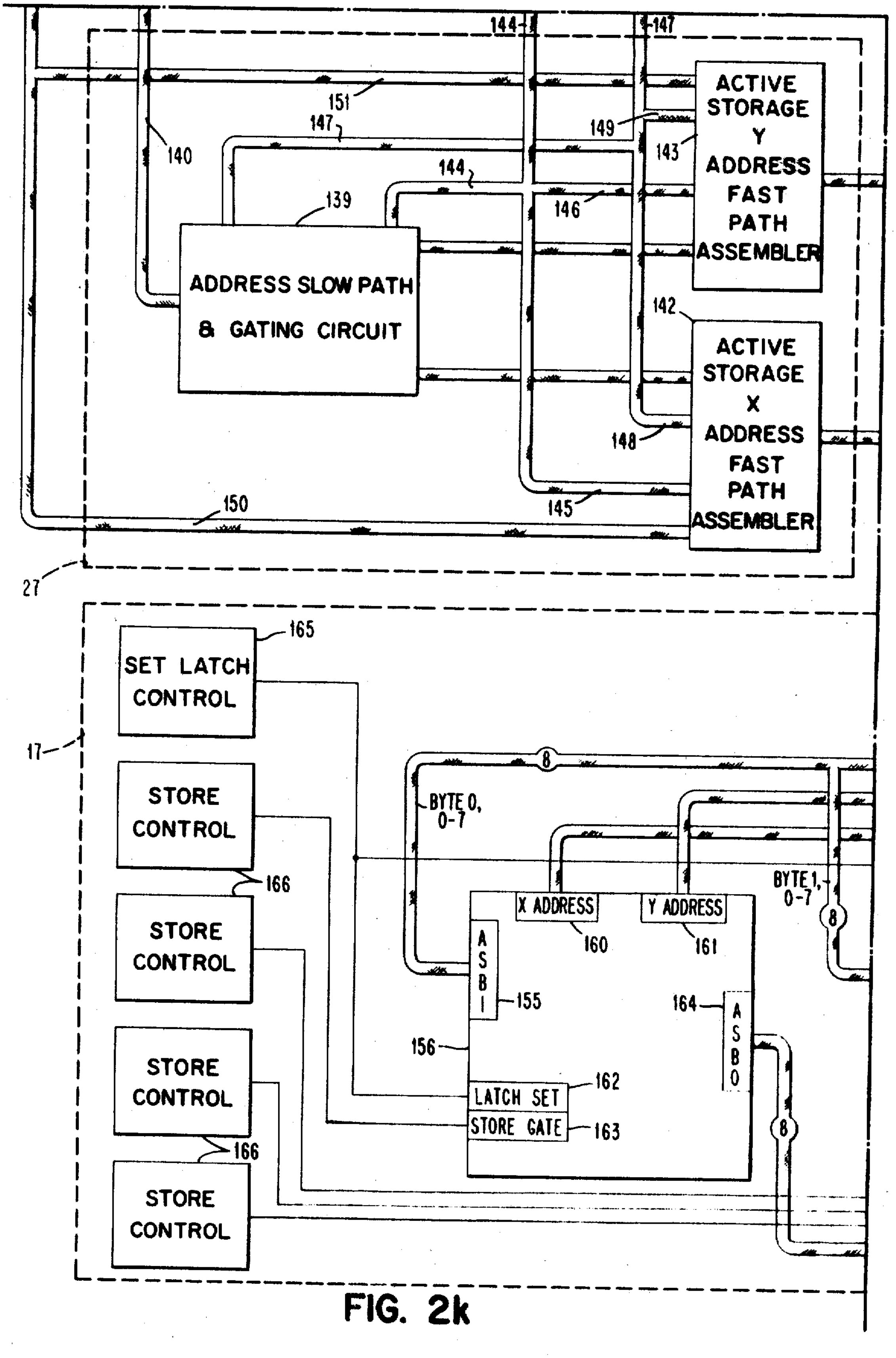
Figure 2L:
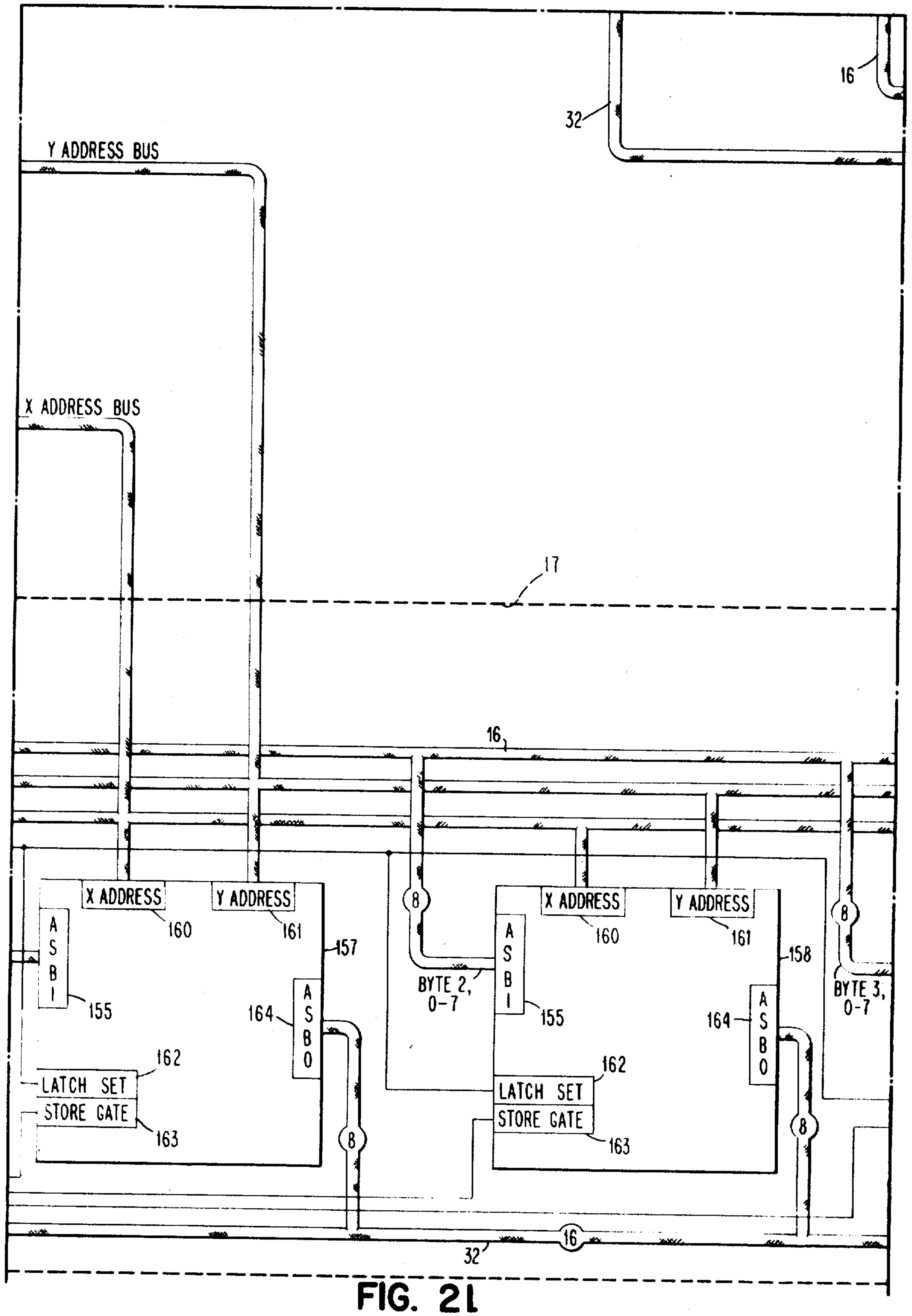
Figure 2M:
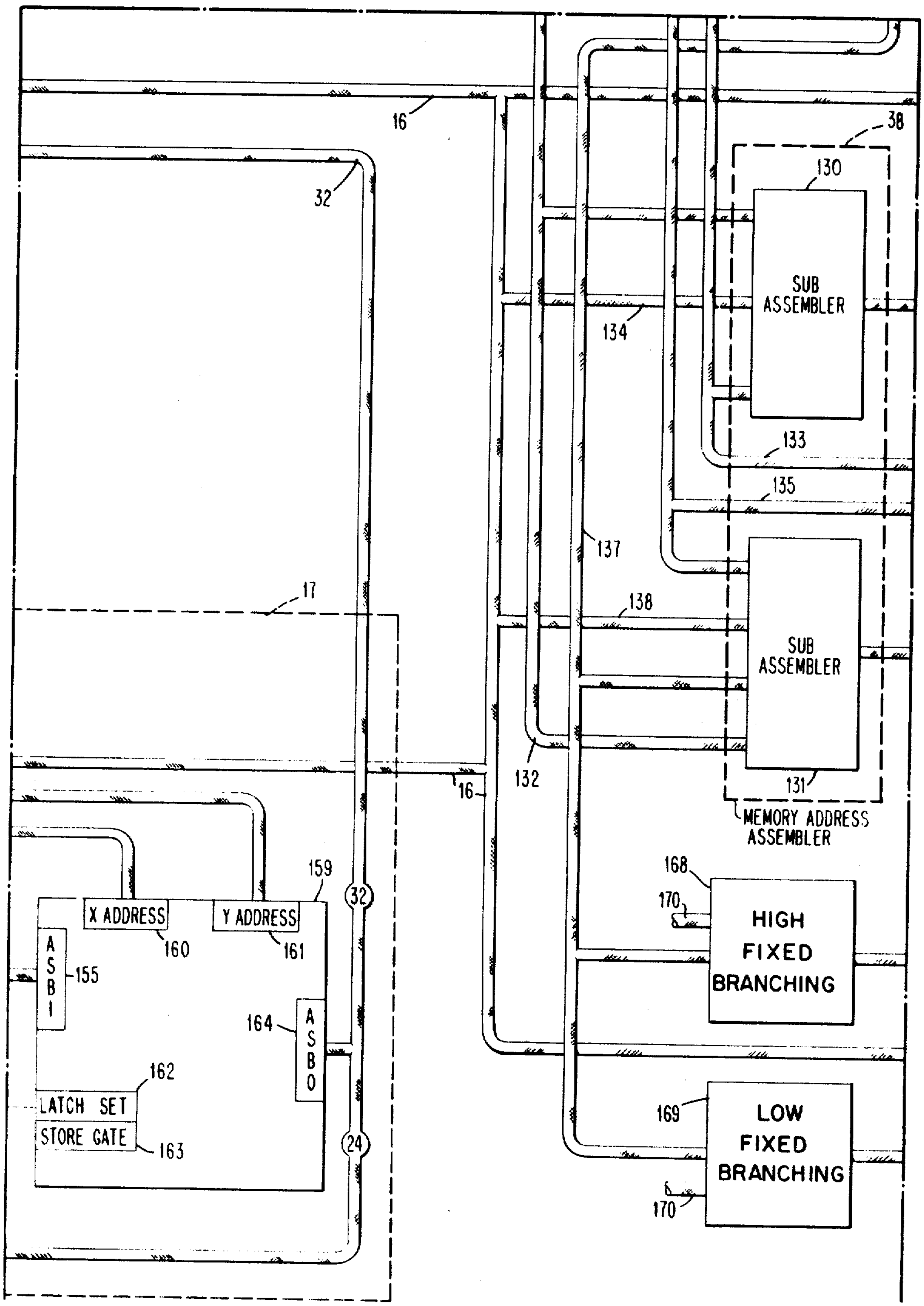

The output of the register 9*a* is applied to an address slow path and gating circuit 139 within the active storage address assembler 27, shown in FIG. 2*k*, and the section select register 28 by the bus 116 and a plurality of lines 140 and 141 respectively. A bus 140*a* connects the bus 116 to the decode circuit 31*a*. The output of the circuit 139 is applied to an active storage X address assembler fast path circuit 142 and to an active storage Y address assembler fast path circuit 143. The circuit 142 generates the X axis address line and the circuit 143 generates the Y axis addressing lines. Together they select a single word from the active storage memory 17. The register 28 furnishes information to the circuits 142 and 143 over a bus 144 and a plurality of branch buses 145 and 146 respectively. The bus 144 is also connected as an input to the sub-assembler 69*b* in the external assembler 10 and as an input to the decode circuit 31*a*. An additional input to the circuits 142 and 143 is applied thereto from the word select register 30 over a bus 147 and a plurality of branch buses 148 and 149. Additionally the bus 147 is employed as an input to the sub-assembler 69*d* in the external assembler circuit 10. The final inputs to the circuits 142 and 143 originate from the storage data assembler 8 and are applied therefrom over the storage data assembler bus out 8*a* and a plurality of branch buses 150 and 151.

The main data bus 16 acts as input bus for a plurality of additional circuits. The sub-unit accessing and modifier circuit 19 is responsive to the main data bus byte 2, bits 0–7. The status register 136 is responsive to the main data bus byte 0, bits 0–7. The word select register 30 receives input information from the main data bus 16 byte 3, bits 0–7. The section select register 28 is responsive to the main data bus byte 1, bits 0–7. A priority select register 152 is responsive to the main data bus 16, byte 2, bits 0–7. An interrupt and control register 153 is responsive to the main data bus 16, bytes 0 and 1. Other circuits responsive to the main data bus 16 are a branch control circuit 154 and the active storage bus in (ASBI) circuit 155.

The active storage circuit 17 comprises a second plurality of basic operating modules 156 through 159. The basic operating modules 156 through 159 need not have the same capacity as the previously mentioned modules 54 through 57. Their resemblance resides in the fact that a larger memory system comprises a plurality of smaller similarly constructed basic operating modules.

Each basic operating module includes in addition to the ASBI 155 an X address circuit 160, a Y address circuit 161, a latch set circuit 162, a store gate 163, and an active storage bus out (ASBO) circuit 164. The information to be stored in a basic operating module is applied to the ASBI 155 and it is stored at the addressable location designated by the contents of the circuits 160 and 161. The X address and Y address circuits together select a single storage location into which the contents of the ASBI 155 is to be stored. In those situations when the information is to be interrogated from the basic operating module 156, the contents of the X address and Y address select the location and the contents are read out into the ASBO circuit 164. The latch set circuit 162 operates to enable the write out procedure while the store gate 163 operates to enable the storage procedure.

Each of the basic operating modules 156 through 159 stores a unit of information. This unit of information need not be the same length as the unit of information held in the basic operating memory 54 through 57. The unit of information stored in a basic operating module, such as 156, is eight binary bits or one byte. The address information stored in the circuits 160 and 161 of each basic operating module 156 through 159 is applied to these circuits in parallel from the circuits 142 and 143. This means that one byte of information is addressed in each module simultaneously. One byte of information from each basic operating module is transferred from the ASBI 155 associated with each basic operation module or transferred onto the ASBO 164 and the bus 32.

In reviewing then, when a single address is furnished from the circuits 142 and 143, a full word of information, four bytes, are read out from the respective modules 156 through 159 and placed onto their respective locations in the active storage bus 32. This full word of information is applied to the sub-assemblers 83 through 86 over the plurality branch buses 92 through 95. Corresponding bytes from the BOM's 156 through 159 are applied to sub-assemblers 83 through 86 respectively. The latch set circuits 162 are enabled from a set latch control circuit 165. The store gate circuits 163 are enabled from a plurality of store gate control circuits 166, one of which circuits is associated with each BOM 156, through 159.

Figure 2N:
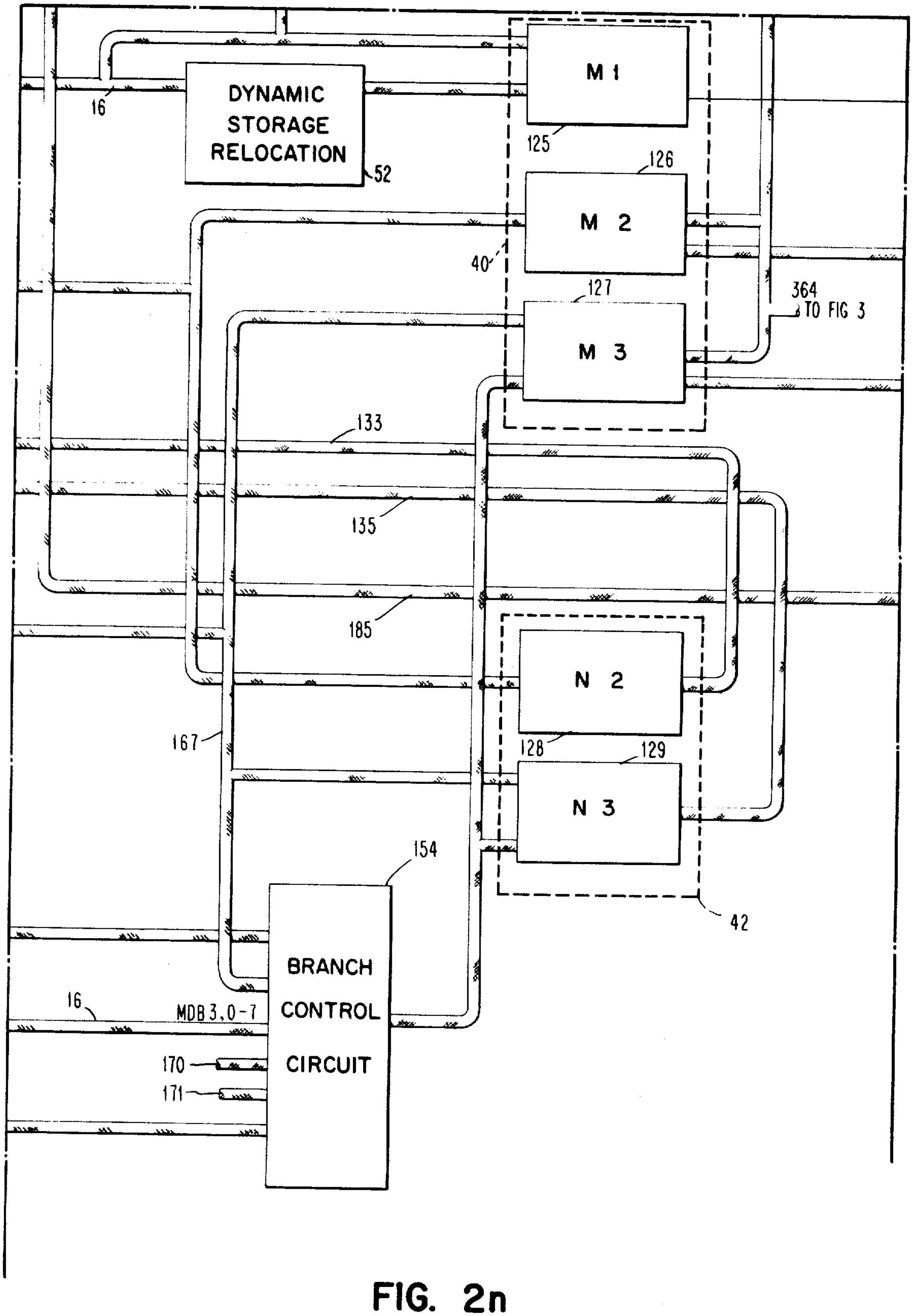

The branch control circuit 154, shown in FIG. 2*n*, is equipped with a plurality of input signals. One previously mentioned set of signals is from the main data bus 16, byte 3 position. The output from the subassembly 131 is applied to the branch control circuit 154 over a bus 167. A high branch circuit 168 and a low branch circuit 169 also furnish input signals to the branch control circuit 154. Output signals from the control register 9*d* are applied to the branch control circuit 154 over a plurality of buses 170 and 171.

The register 40 comprises three sub-unit registers 125 through 127 as previously mentioned. Each register holds eight binary bits of information, but only the registers 126 and 127 are employed for selecting a single storage location within the basic operating modules 54 through 57. The bit positions in the register 125 are available for expansion of the present capacity exhibited by the basic operating modules 54 through 57. When additional storage is placed into the system, the operation of the register 125 will follow the general format as set down for the remaining registers. The outputs from the registers 126 and 127 are applied to a pair of replacement registers 172 and 173 respectively. During certain branching operations, it is necessary to have a parallel back up system as furnished by the pairs of registers 128 and 129 and 172 and 173. The output from the registers 172 and 173 is applied to the sub-assemblers 69*c* and 69*d* respectively in the external assembler 10 by a pair of branch buses 174 and 175 respectively.

The outputs from the registers 126 and 127 are applied in parallel to the address circuit 46 of each of the basic operating modules 54 through 57 by an additional inverter circuit 176. Associated with the basic operating module 55 and the address circuit 46 associated therewith, the bit position 0 of the register 126 is responsive to a special assembler 176*a*. The storage data assembler 8 comprises a plurality of sub-unit registers 177 through 180. The storage capacity of each of these last mentioned registers is one byte and each register is responsive to selected bytes of information from each of the basic operating modules 54 and 55. Each access to the memory 2 brings out four bytes of information, two bytes from each of the modules 54 and 55. The basic operating modules 56 and 57 are shown connected to the registers 177 through 180 in one additional manner when it is desired to expand the storage capacity of the memory system 2.

The output from the register 127 is applied to a storage control circuit 181 by an AND gate 182. The output from the AND gate 182 is a plurality of enabling signals connected to a test and set circuit 183. Enabling signals from the circuit 183 can be used singly or in combination to effect the well-known test and set operation on the BOM's 54 through 57. A remaining input to the storage control circuit 181 originates from a store under mask circuit 184 which is connected to the register 19 by a bus 185. A further input to the circuit 181 is from the switch assembly circuit 74, shown in FIG. 2*a*, over a bus 186.

Referring to FIGS. 5*a* through 5*h*, there can be seen a detailed schematic view of the circuit 19 and certain circuits relating to the circuit 19. A B SOURCE byte address decode circuit 256 is shown, in FIG. 5*a*, comprising a plurality of AND gates 257 through 260. Each of the AND gates has a pair of input signals and a pair of output signals. When the pair of input signals specified thereby are present, the AND gate gives an enabling output signal. When the two input signals are not there, the AND gate gives a negative output signal. The AND gate 257 has a pair of input signals: a plus C1, bit 4 signal and a plus C1, bit 5 signal. However, for the purpose of this description, the control register 9*a* supplies the input signals. The control register 9*a* comprises four byte registers 0 through 3. Each of the registers comprises eight bits. A binary 0 in bit 4 of byte 1 is identified as plus C1, bit 4. A binary 1 is identified as a minus signal. The output signals comprise a plus 0 and a minus 0 output signal.

The AND gate 258 has a pair of input signals, the first of which is the plus C1, bit 4 input signal and the second of which is the minus C1, bit 5 input signal. The output signal of the AND gate 258 is the plus 1 and the minus 1 output signals. The AND gate 259 has a pair of input signals, the first of which is the minus C1, bit 4 input signal and the second of which is the plus C1, bit 5 input signal. The output from the AND gate 259 comprises the plus 2 output signal and the minus 2 output signal. The AND gate 260 has a pair of input signals, the first of which is the minus C1, bit 4 input signal and the second of which is the minus C1, bit 5 input signal. The output from the AND gate 260 comprises a plus 3 and a minus 3 output signal. The output from the circuit 256 is applied to a C1 decode bus 262 for application to an increment/decrement control circuit 264, shown in FIG. 5*g*, forming part of the sub-unit accessing and modifier circuit 19.

An A SOURCE address byte circuit 266 is shown comprising a plurality of AND gates 267 through 270 respectively. The AND gate 267 has two input signals, the first of which is the plus C2, bit 4 input signal and the second of which is the plus C2, bit 5 input signal. The AND gate 267 is equipped with two output signals, the plus 0 and the minus 0 output signals. The AND gate 268 has two input signals: the first of which is the plus C2, bit 4 input signal and the second of which is a minus C2, bit 5 input signal. The output signals from the AND gate 268 comprise the plus 1 output signal and the minus 1 output signal. The AND gate 269 is equipped with two input signals, the first of which is the minus C2, bit 4 input signal and the second of which is the plus C2, bit 5 input signal. The output signal from the AND gate 269 comprises the plus 2 and the minus 2 output signals. The AND gate 270 is equipped with a pair of input signals, the first of which is the minus C2, bit 4 input signal and the second of which is the minus C2, bit 5 input signal. The output from the AND gate 270 comprises the plus 3 output signal and the minus 3 output signal. The A SOURCE decode circuit 266 furnishes a plurality of signals to a C2 byte decode bus 272 for application to the increment/decrement control circuit 264 shown in FIG. 5*g*.

The decode circuits 256 and 266 are employed for two major functions and each corresponds to an A SOURCE or a B SOURCE respectively. These decode circuits indicate whether the indirect byte addresses should be incremented or decremented and also whether the branch operation presently being used is a first mode branch or a second mode branch operation.

Figures 3, 3I:
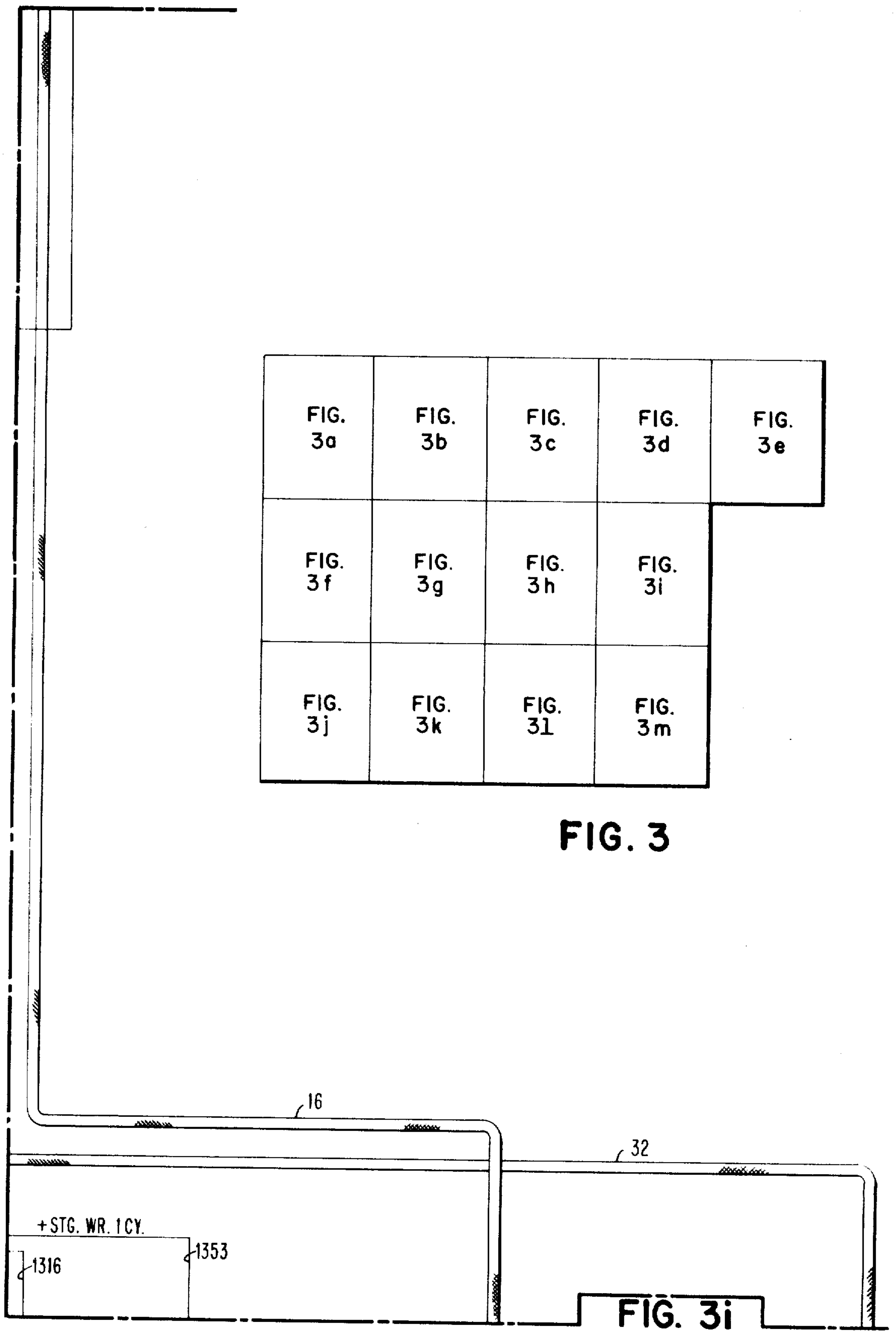
Figure 3A:
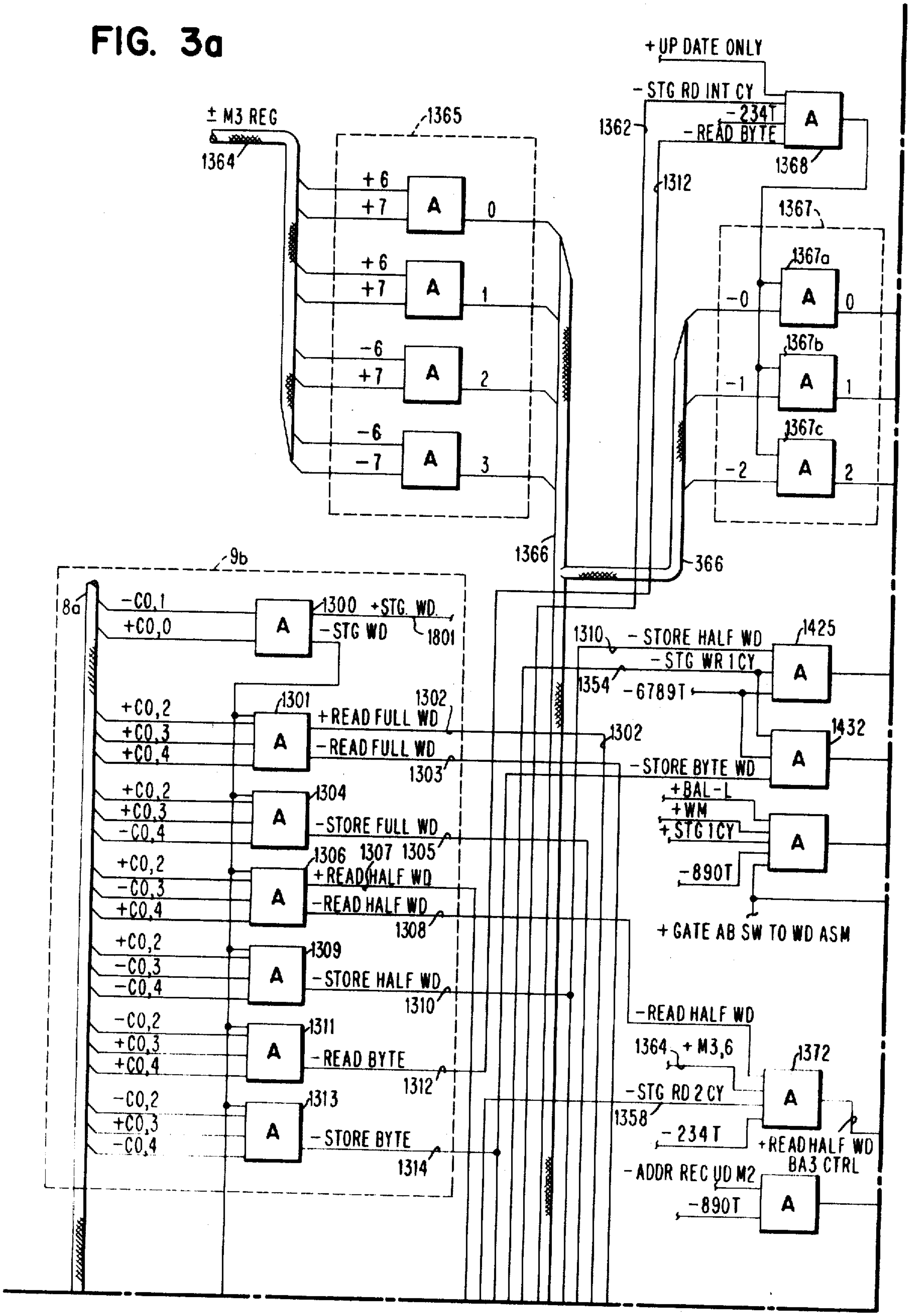
Figure 3B:
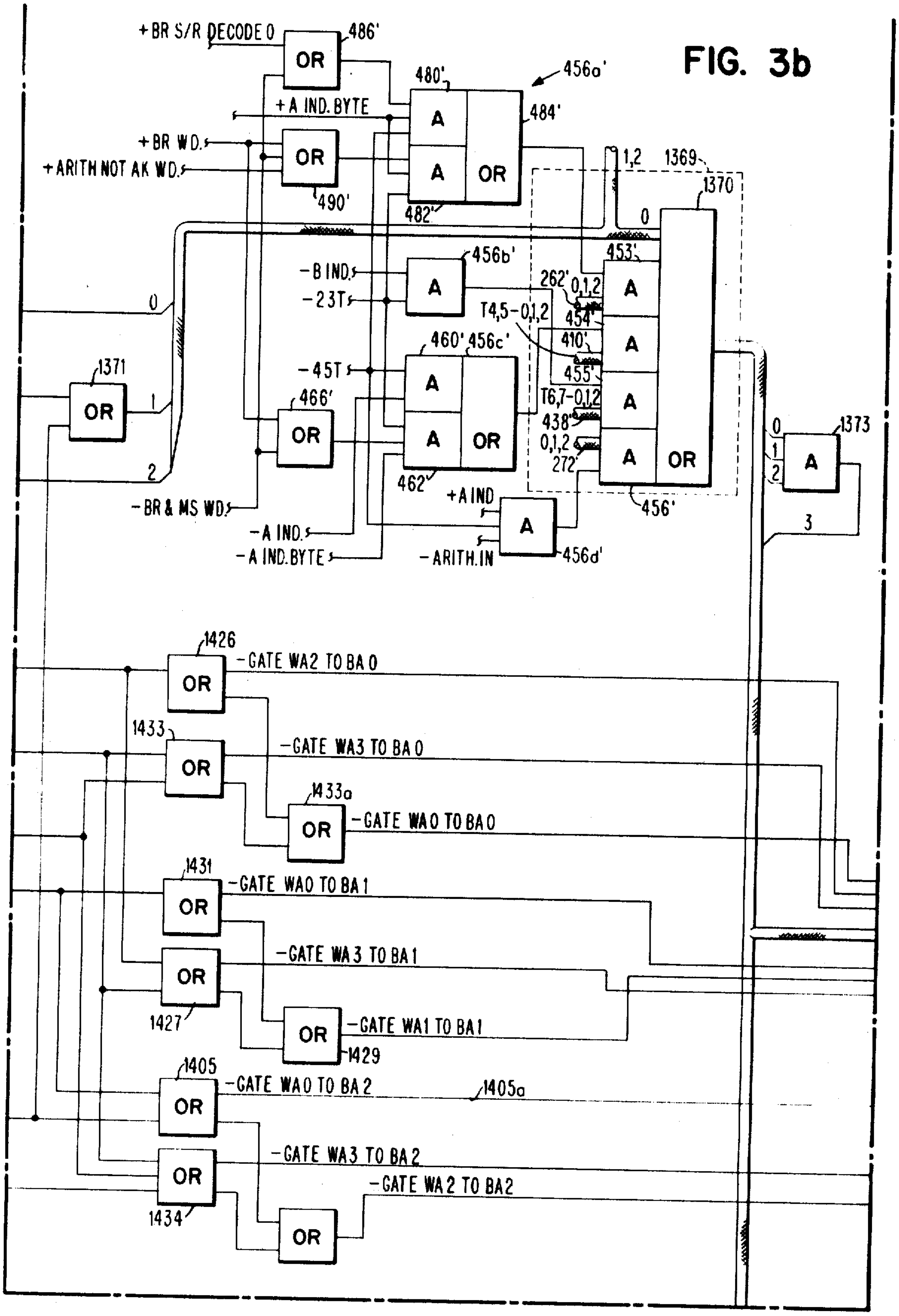
Figure 3C:
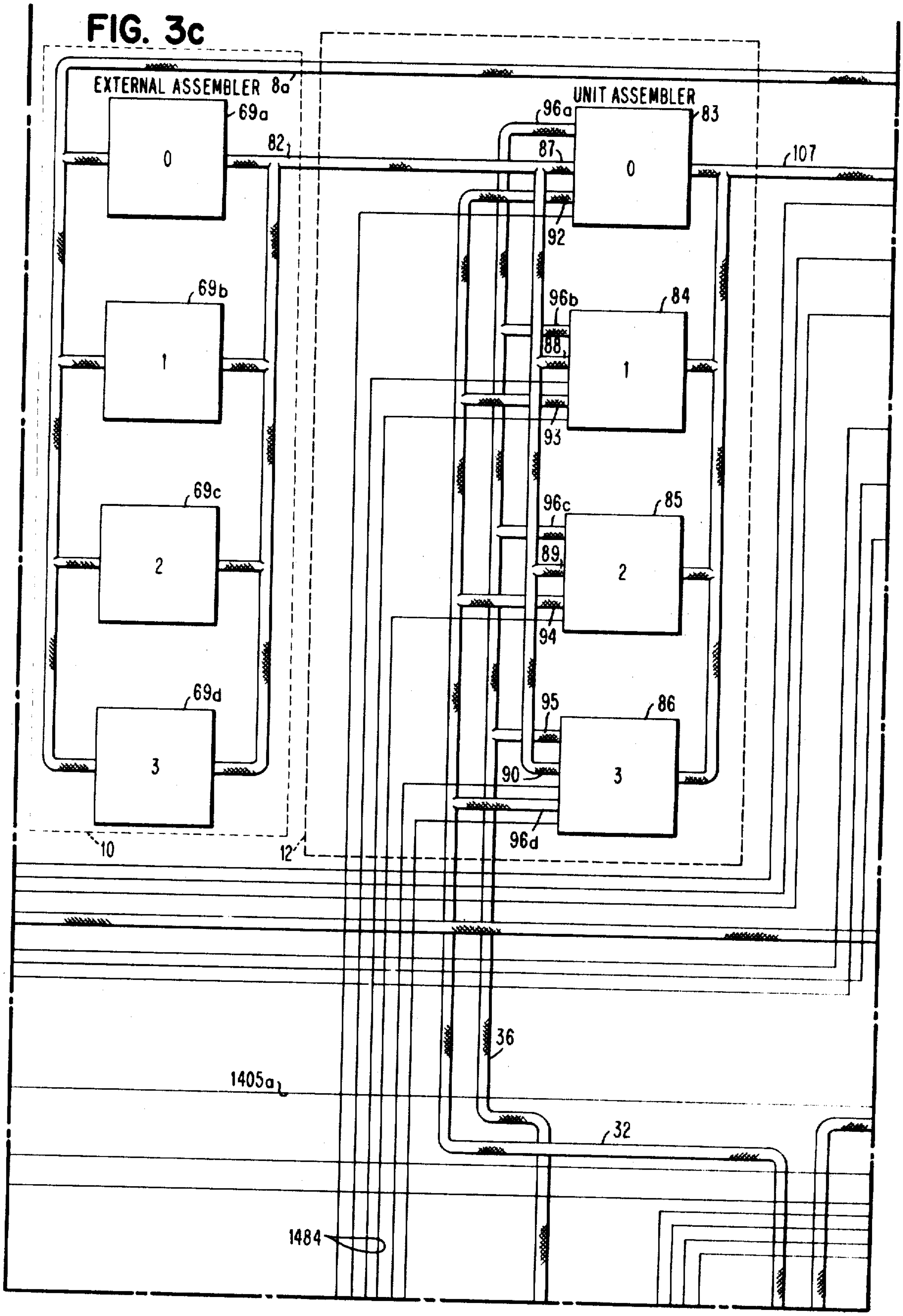
Figure 3D:
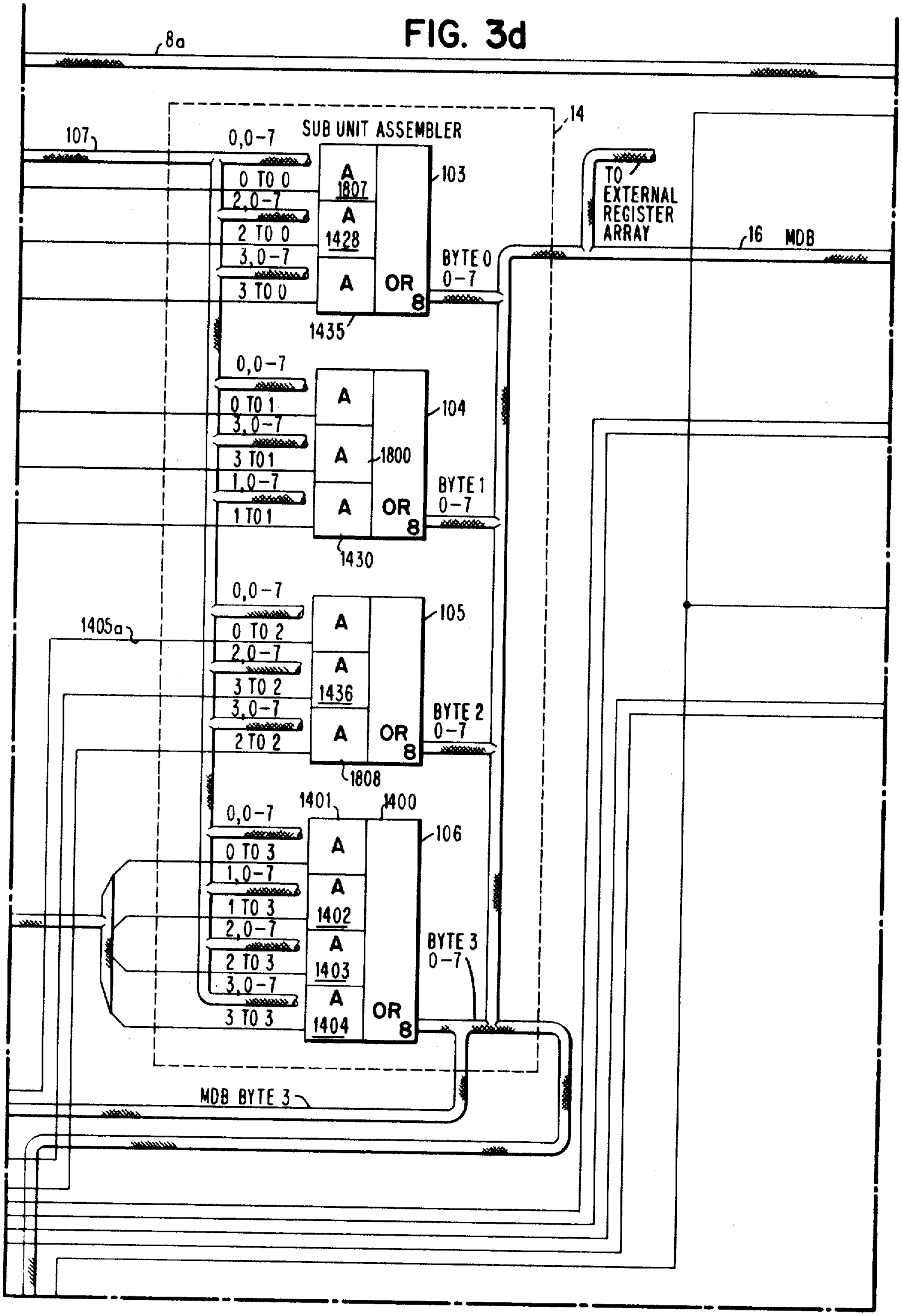

Corresponding to the decode circuits 256 and 266 are a pair of hardware adders 274 and 276 respectively, shown in FIGS. 3*c*. The storage function within the circuit 19 is performed by a register 280, shown in FIGS. 3*b* and 3*f*, having a sub-unit storage capacity of eight binary storage positions 282 through 289. These storage positions are respectively known as the register bit T0 through bit T7. The hardware adders 274 and 276 operate as decode hardware adders wherein they decode the contents of the bits T67 and T45 respectively of the register 280. These pairs of address signals are incremented or decremented in response to control signals from the circuit 264. The output of the adders 274 and 276 are applied to a bus 278.

The register 280 can be loaded from a plurality of input circuits. For example, corresponding bit lines of byte three of the main data bus 16 are connected respectively to the storage elements 282 through 289 by a separate input AND gate 290 in each of the storage positions. The various storage positions of the register 280 are loaded under direction of a load circuit 294, shown in FIGS. 5*b* and 5*f*, which decodes the various enabling conditions collected from throughout the machine for gating information into the various storage locations 282 through 289. The low four positions, 286–289, of the register 280 are loaded from the register 40, byte 3, bit positions 6 and 7 over an indirect byte address bus 296. This bus comprises two lines, 296*a* and 296*b*, connected with bits 6 and 7 of the M3 byte of the register 40. Storage positions 286 and 288 are responsive to M3, 6 by an AND gate 298. Storage positions 287 and 289 are responsive to M3, 7 by an AND gate 300. The selection of a pair of storage positions 286 and 287 or 288 and 289 as a repository for the contents of the M3 byte, bits 6 and 7, is determined by enabling signals generated by the decoding of various other positions of the control register.

Figures 5, 5P:
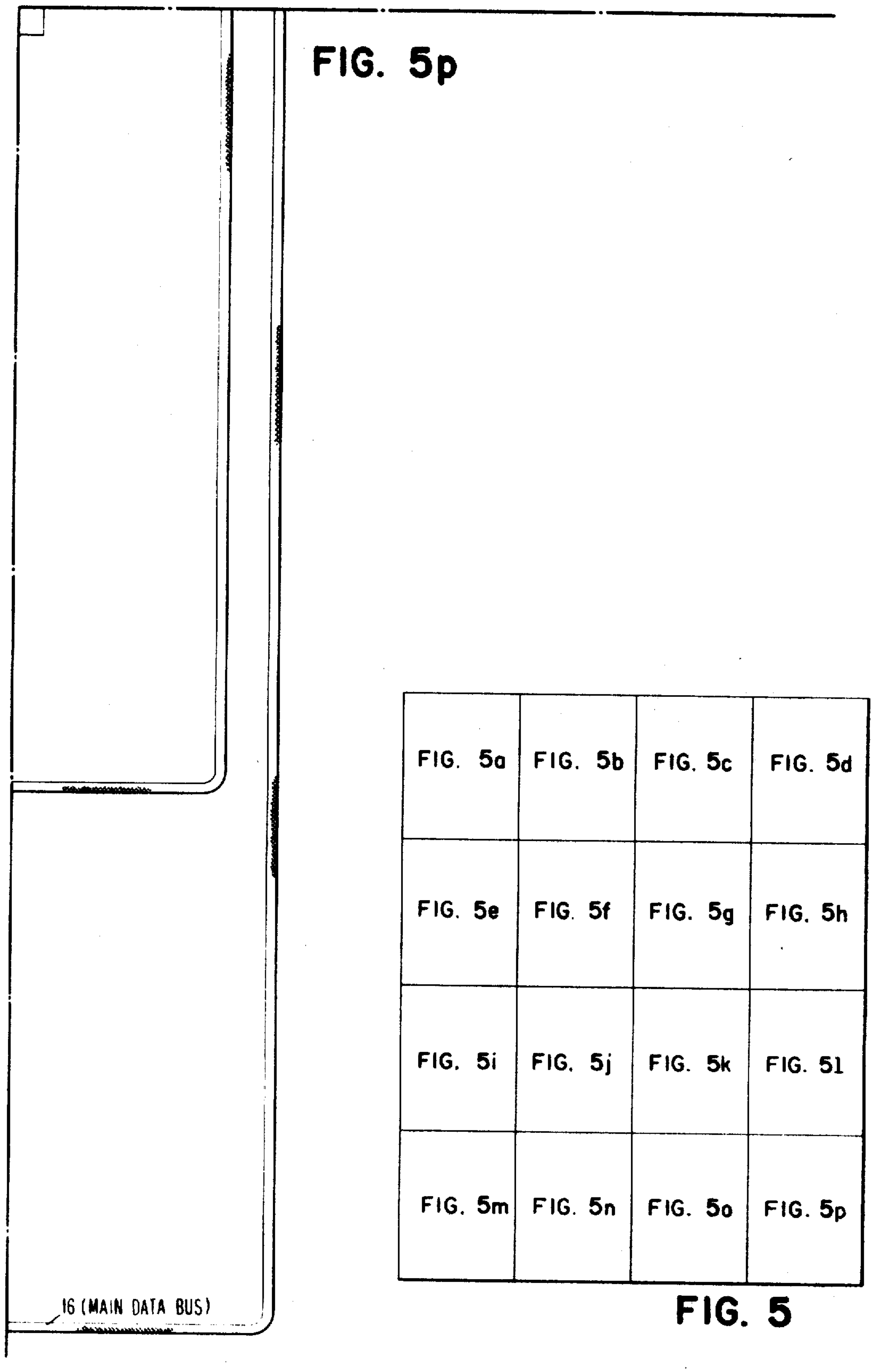
Figure 5A:
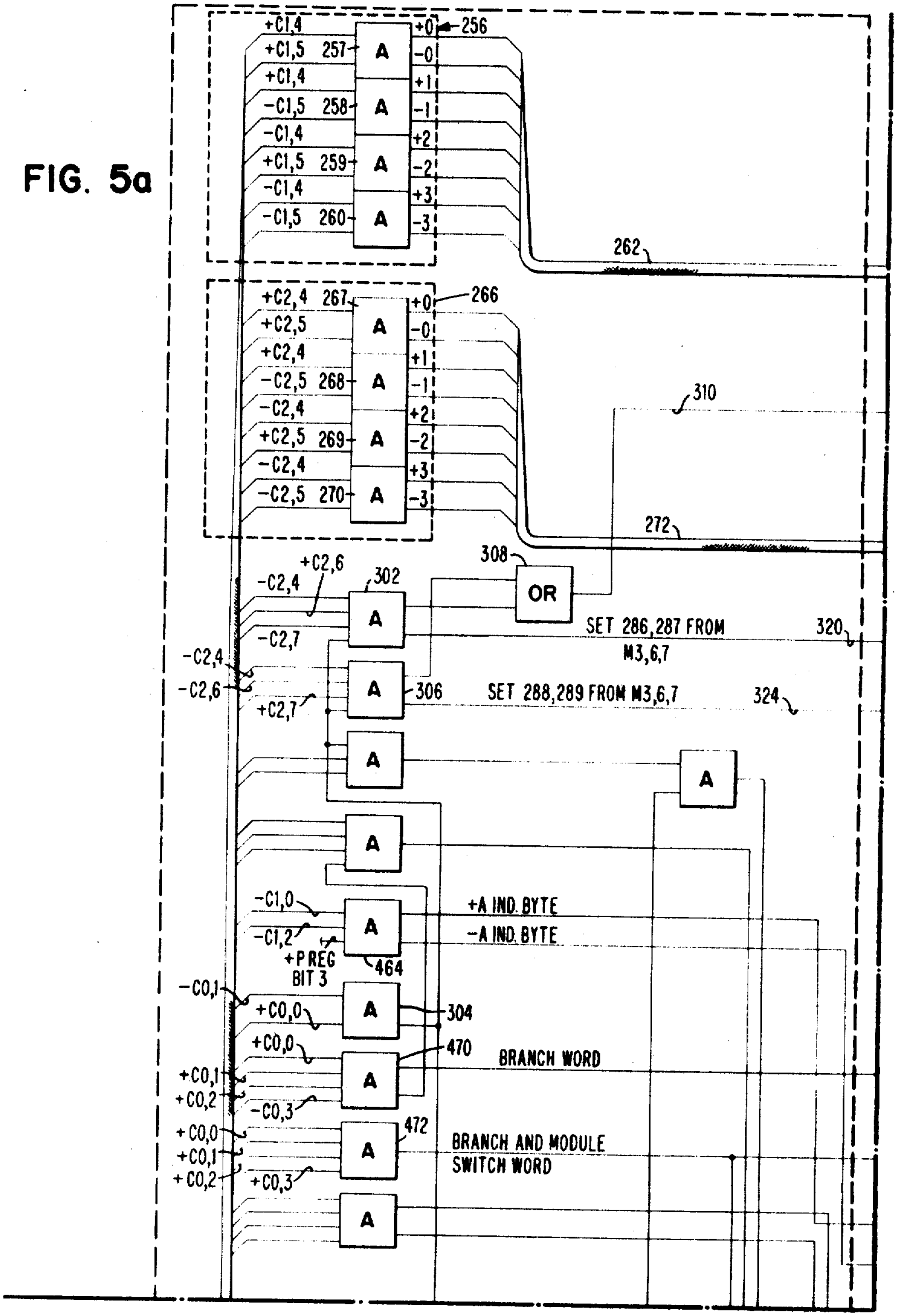

A first AND gate 302, shown in FIG. 5*a*, is equipped with a plurality of input signals from the decode register, the first of which is a minus C2, bit 4 signal, a second of which is a plus C2, bit 6 signal, and the third of which is a minus C2, bit 7 signal. The final input signal is an enabling signal from an AND gate 304. The AND gate 304 has two input signals, the first of which is a minus C0, bit 1 signal and the second of which is a plus C0, bit 0 input signal. The output from the AND gate 304 indicates that the control word presently being decoded is of the storage word type. The output signal from the AND gate 304 controls the remaining functions which occur during a storage type control word. An additional AND gate 306 is equipped with a plurality of input signals, the first of which is the minus C2, bit 4 input signal, the second of which is the minus C2, bit 6 signal, the third of which is a plus C2, bit 7 input signal, and the final input signal is the output from the AND gate 304. The plus enabling output signal from the AND gate 306 is applied to an OR gate 308, which gate has as its second input signal, the plus enabling output signal from the AND gate 302.

The output signal from the OR gate 308 operates to reset, by a line 310, an AND gate 312, each of the storage positions 282 through 285 to a binary zero condition. The AND gate 312 is equipped with a plurality of other gating signals on lines 314 and 316, the complete understanding of which is not necessary for the present invention. The enabling signal on the line 314 is the 8/9 timing signal from the clock circuit and the enabling signal on the line 316 is the plus STORAGE INTERLOCK CYCLE. The enabling signal from the AND gate 302 is applied to an AND gate 318, shown in FIG. 5*f*, over a line 320. The AND gate 318 has a plurality of additional input signals, one of which is the 8/9 timing signal from the clock circuit, on a line 318*a*, and the second of which is the STORAGE READ ONE CYCLE input signal from an AND gate 319 on a line 319*a*. The output from the AND gate 318 is applied as a gating input signal to the AND gates 298 and 300 in the storage positions 286 and 287 respectively. This effectively loads the contents of byte 3, bits 6 and 7 from the register 40 into the positions 286 and 287.

The output signal from the AND gate 306 is applied to an AND gate 322 over a line 324. The remaining input signals from the AND gate 322 are the 8/9 timing signals from the clock circuit, and the STORAGE READ ONE CYCLE. The output from the AND gate 322 is applied to the AND gates 298 and 300 in the storage positions 288 and 289 respectively. This enabling signal from the AND gate 322 effectively stores the contents of the M3 byte, bits 6 and 7 into the storage positions 288 and 289. It can be seen, therefore, that either the storage positions 286 and 287 will be loaded with the contents of the M3 byte, bits 6 and 7 when the enabling signal on the line 320 is available or the storage positions 288 and 289 will be loaded with the contents of the M3 byte, bits 6 and 7 when the enabling signal on the line 324 is available.

The gating signal to the AND gate 290 in the storage positions 282 through 289 originates from a gating circuit 330. The gating circuit 330 comprises a first AND gate 332, having a plurality of input signals applied thereto. The first of which is the minus C0, bit 6 input signal, the second of which is the plus C1, bit 7 input signal, the third of which is the MINUS BRANCH AND MODULE SWITCH word input signal, and the fourth of which is the 9/0 input signal from the clock circuit. A second AND gate 334 has a plurality of input signals applied thereto, the first of which is the 9/0 timing signal from the clock circuit, the second of which is EXTERNAL DESTINATION BYTE TWO control signal, and the third of which is the EXTERNAL WORD T REGISTER control enabling signal. The output signals from the AND gate 332 and 334 are applied to an OR gate 336. The enabling signal from the OR gate 336 is applied as the second input enabling signal to the AND gate 290 associated with each of the storage positions 282 through 289 of the register 280. In this manner, the contents of the main data bus can be gated into the respective locations in the register 280. The output of the register 280 is distributed to various other circuits throughout the machine over the bus 185. Each of the output signals from the positions 282 through 285 is gated directly onto the bus 185, while the output signals from the positions 286 through 289 are gated onto the bus 185 by a buffer circuit 340. The circuit 340 is placed intermediate the output signal of the register 280 and the bus 185 in order to properly gate onto the bus 185, the halves of the register as they are needed. The positions 282 through 285 are used as a loading mask for application to a store under mask circuit 184 while the contents of bit positions 286 through 289 are gated into the hardware adders 274 and 276 to control the indirect byte addressing of the system.

Figure 5B:
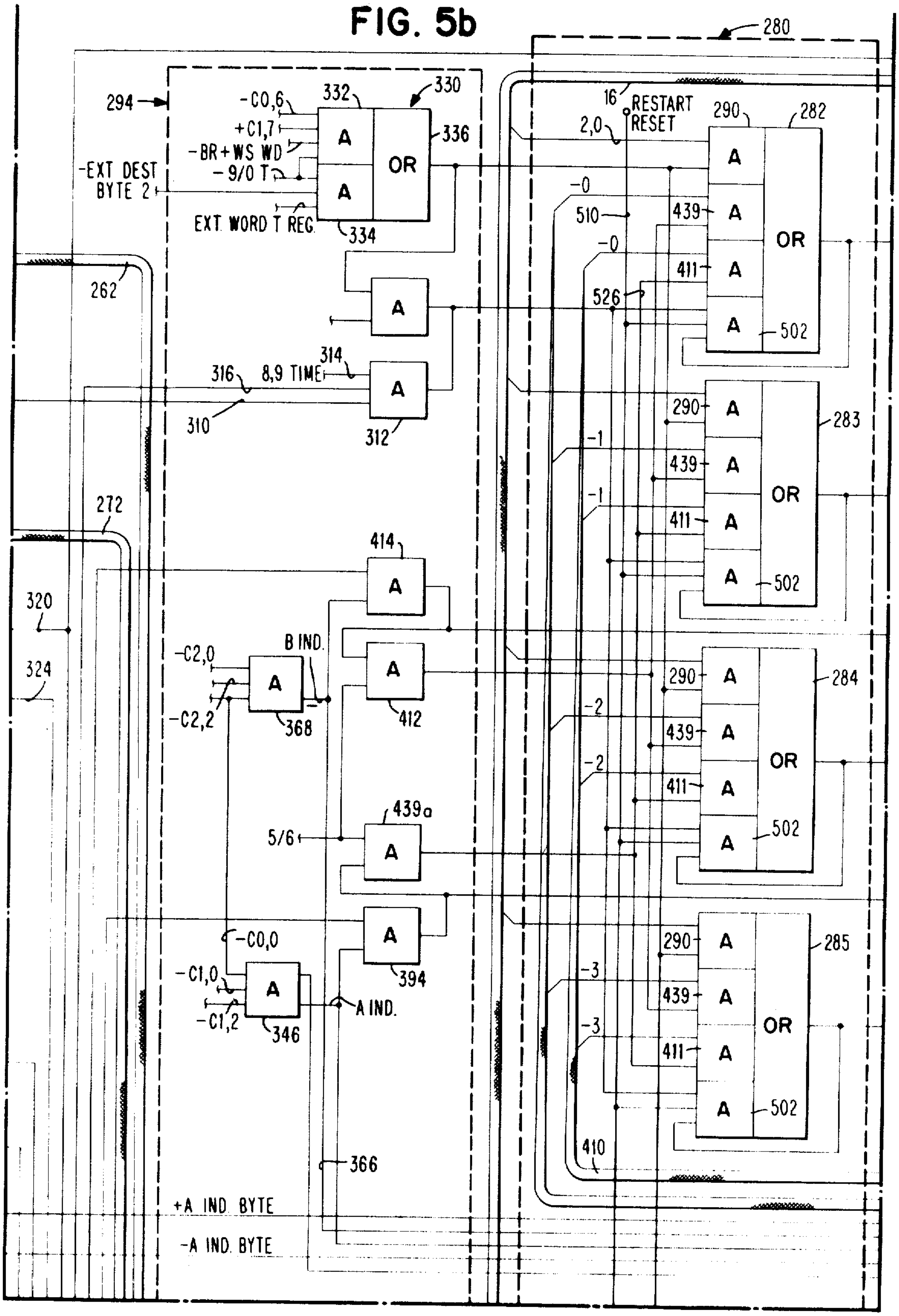
Figure 5C:
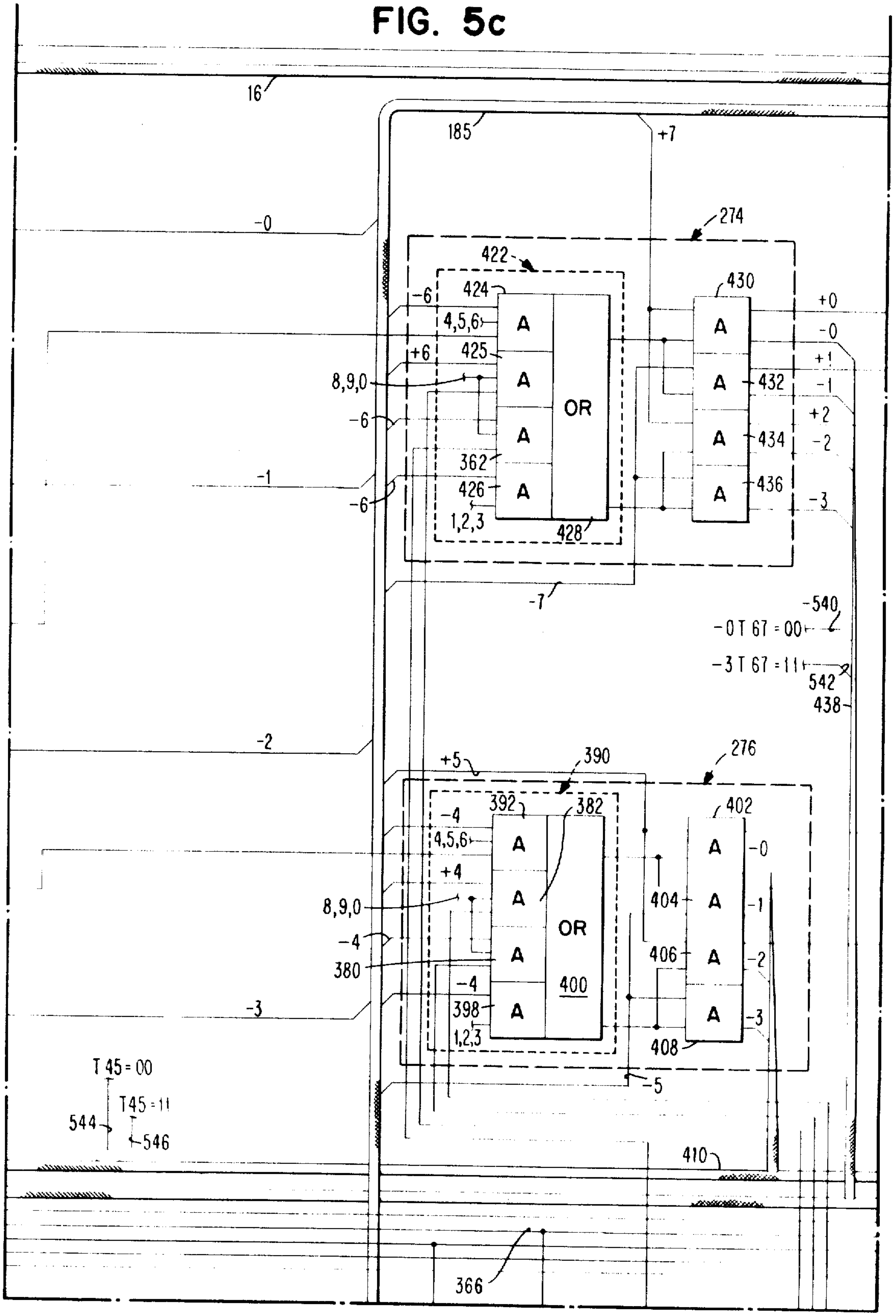
Figure 5D:
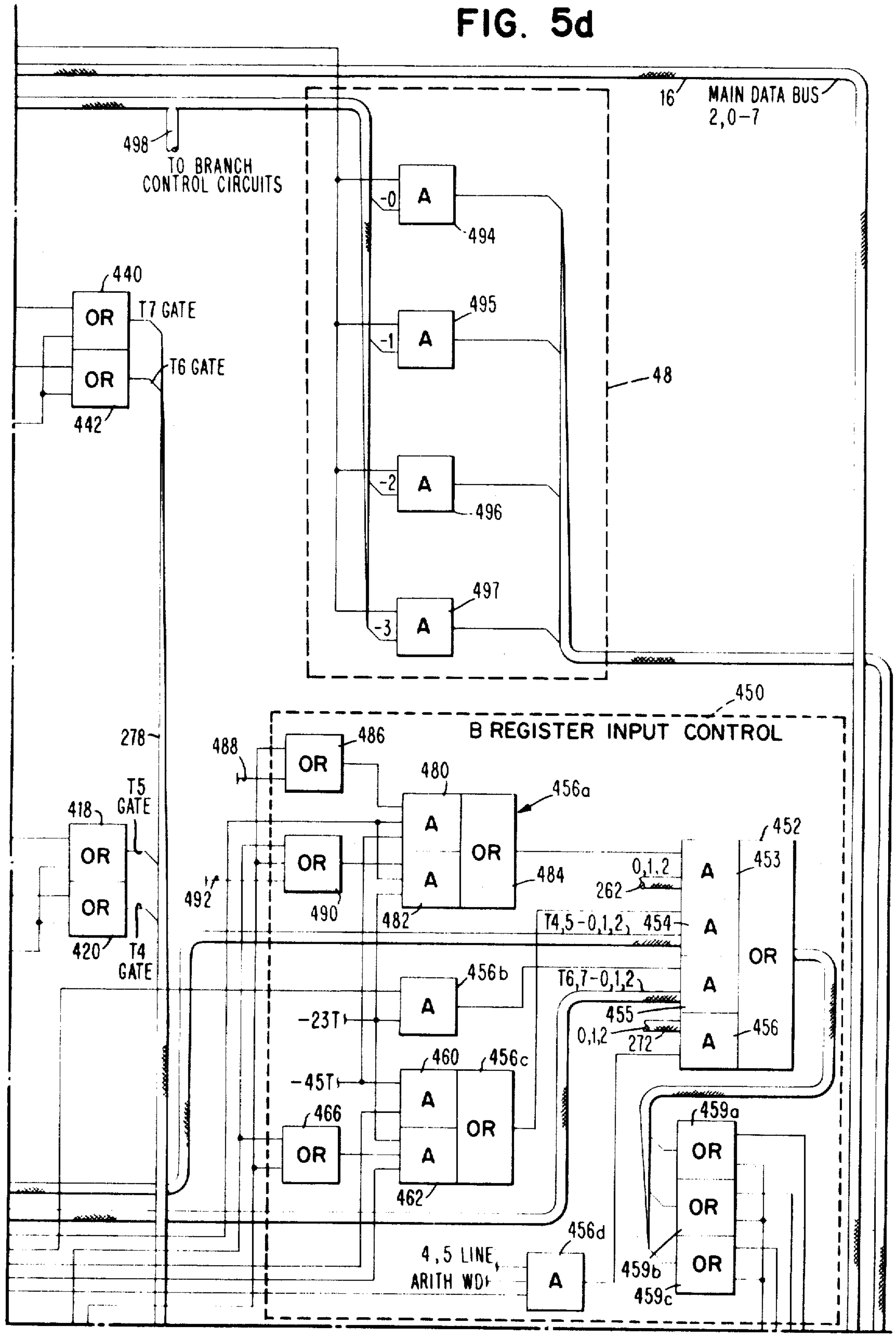
Figure 5E:
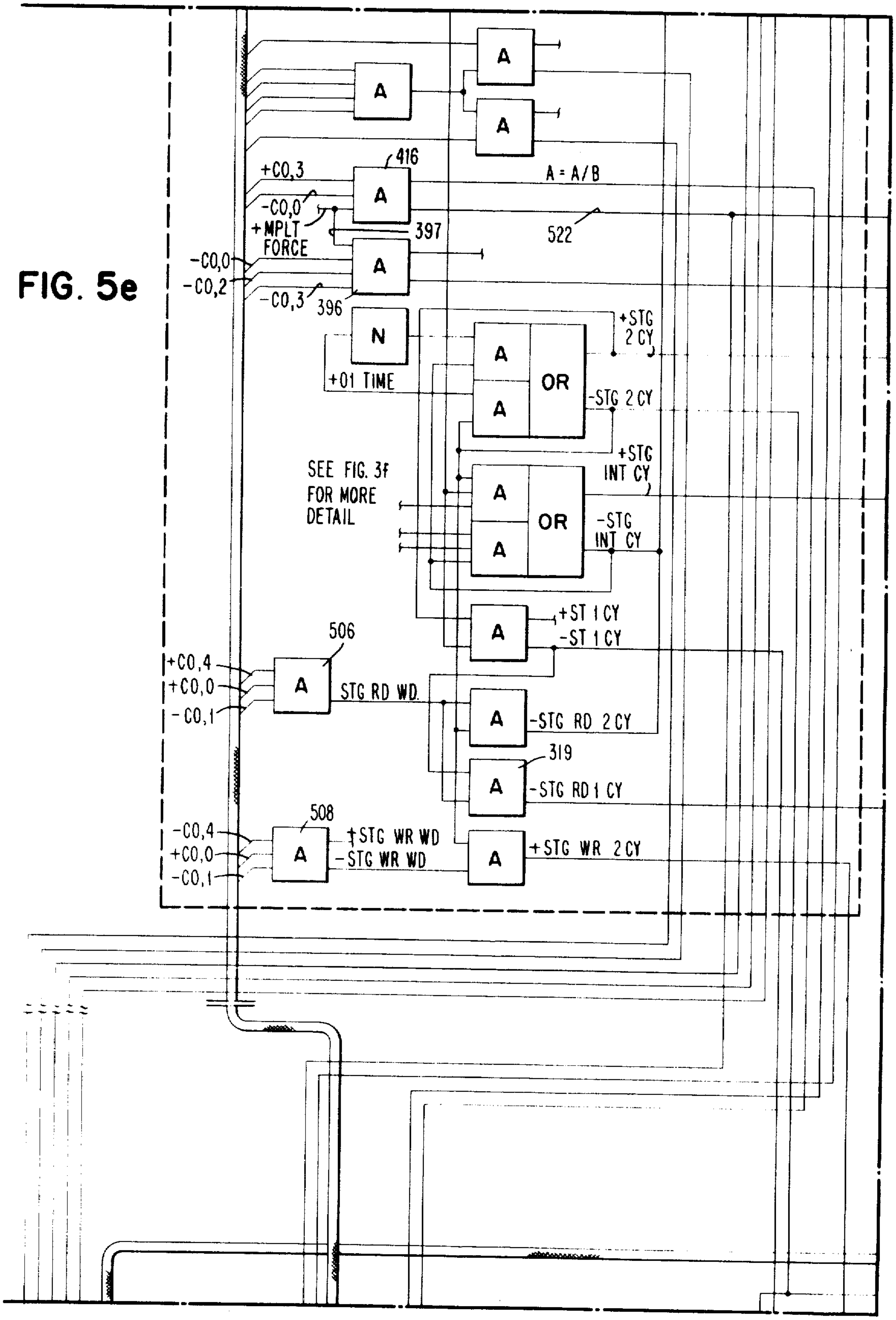
Figure 5F:
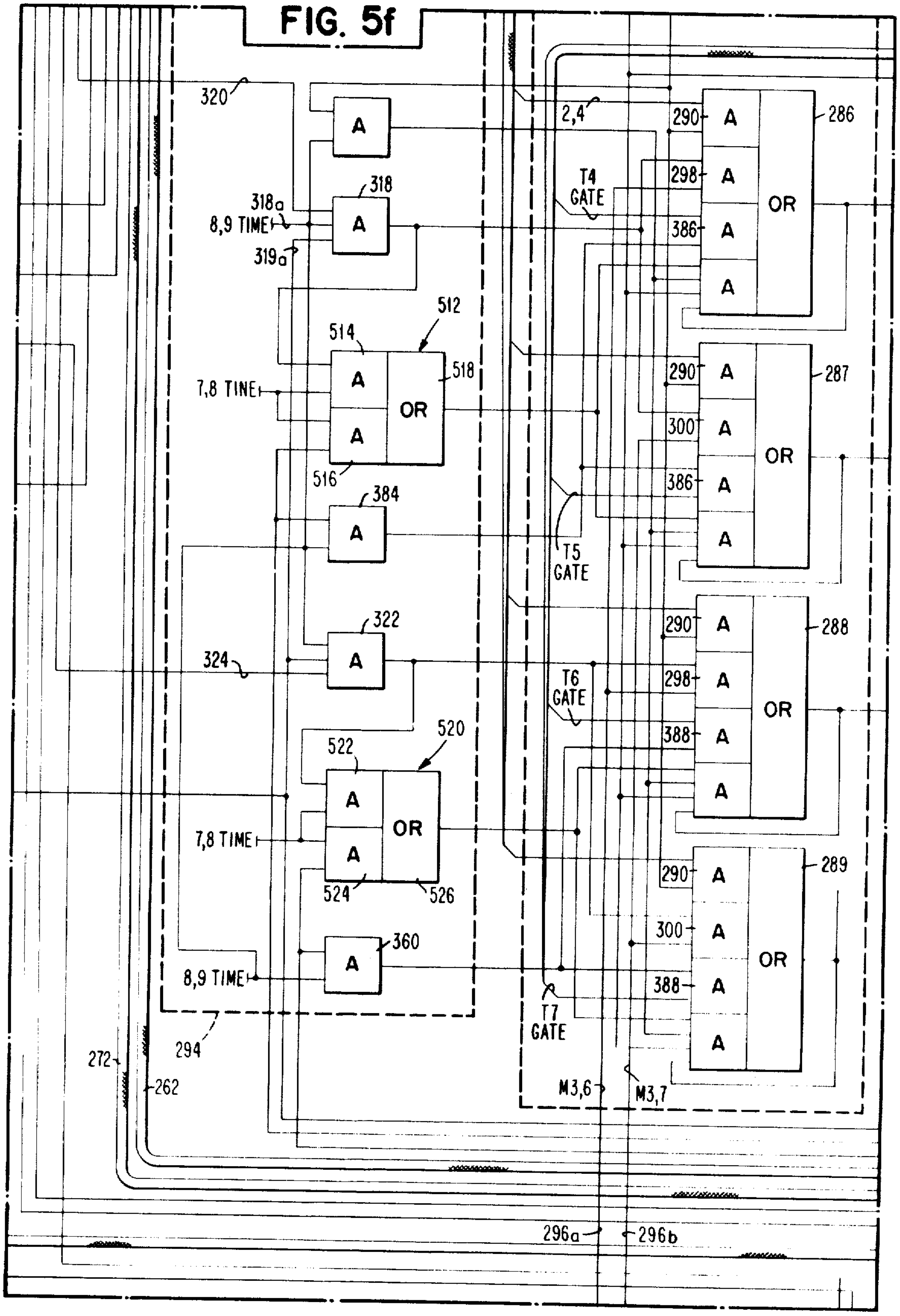
Figure 5G:
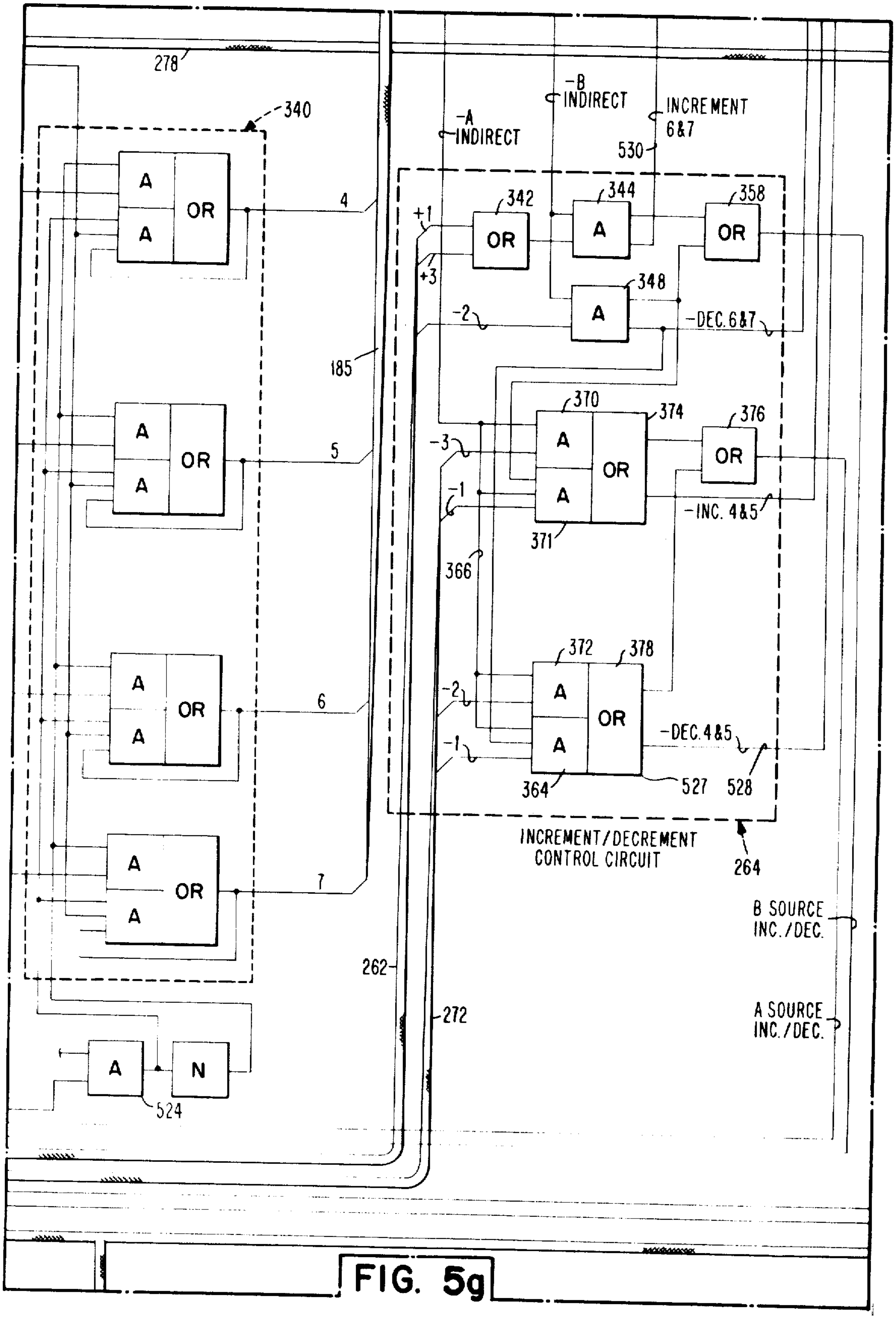
Figure 5H:
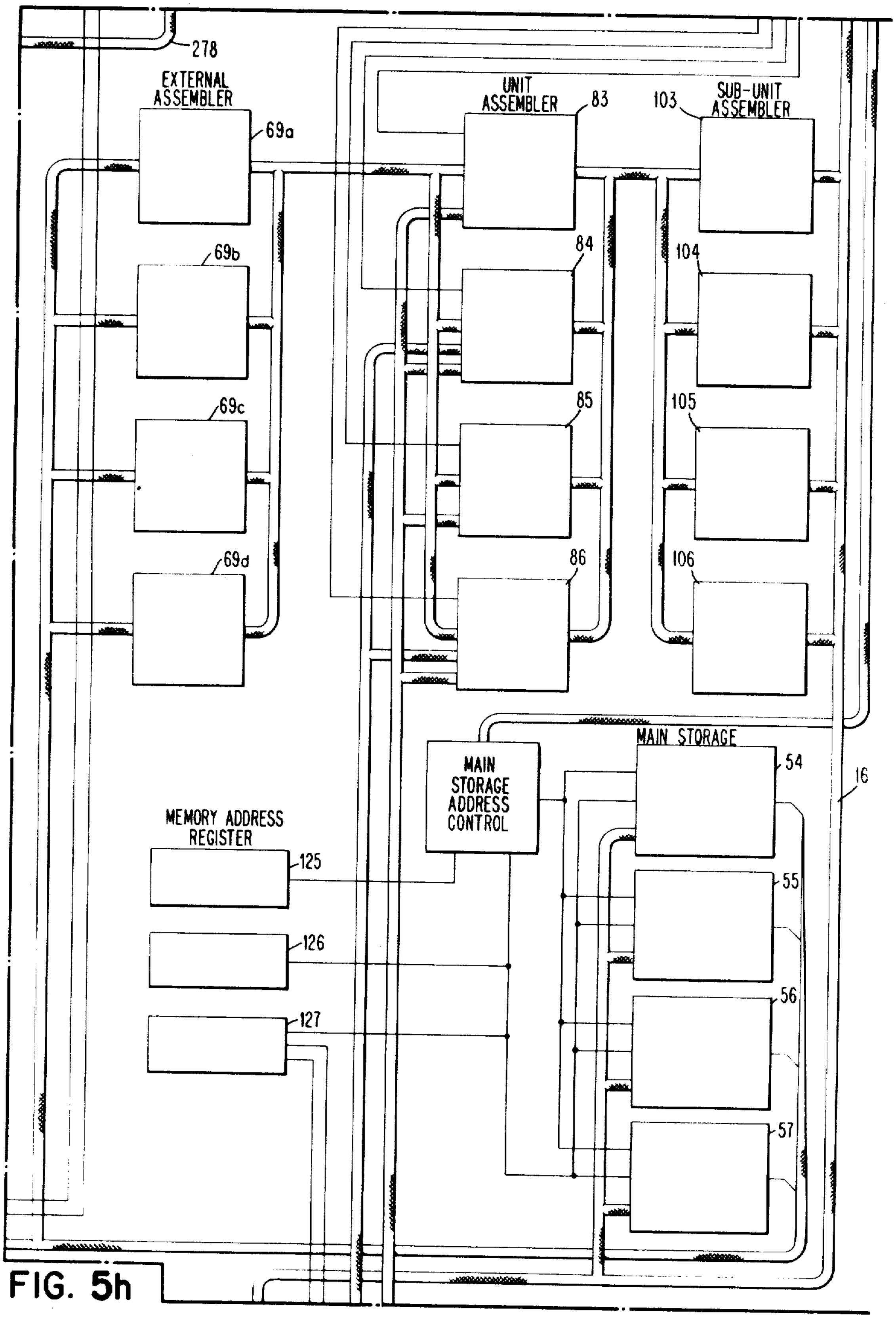

The increment/decrement control circuit 264, shown in FIG. 5*g*, comprises a plurality of logic circuits. A first OR gate 342 is equipped with a plurality of logic circuits. A first OR gate 342 is equipped with a plurality of input signals, the first of which is a plus 1 decode circuit from the decode circuit 256 and the second of which is the plus 3 decode signal from the decode circuit 256. The output signal from the OR gate 342 is applied to an AND gate 344 having as a second input signal the output of an AND gate 368 shown in FIG. 5*b*. The AND gate 368 also decodes various other bit positions of the control register, the first of which is the minus C0, bit 0 input signal, the second of which is the minus C2, bit 0 input signal, and the third of which is the minus C2, bit 2 input signal. The output signal from the AND gate 368 is additionally applied as one input signal to an AND gate 348, shown in FIG. 5*g*, which gate has as a second input signal the minus 2 decode signal from the decode circuit 256. The enabling output signals from the AND gates 344 and 348 are applied to an OR gate 358 which generates the B SOURCE increment/decrement enabling signal for application to an AND gate 360. The AND gate 360 has as a second input signal the 8/9 timing signal from the clock circuit. A second enabling output signal from the AND gate 344 is applied as an enabling signal to an AND gate 362 input circuit of the hardware adder 274 shown in FIG. 5*c*. The AND gate 362 has a plurality of additional input signals, the first of which is the 8/9/0 timing signal from the clock circuit and the second of which is the minus 6 input signal from the bus 185. An enabling output signal from the AND gate 348 is applied as a gating signal to an AND gate 364.

The AND gate 364 has an additional plurality of input signals, the first of which is the minus 1 decode signal from the decode circuit 266 and the second of which is the MINUS A SOURCE INDIRECT BYTE enabling output signal from an AND gate 346 shown in FIG. 5*b*. The AND gate 346 has a plurality of input signals, the first of which is the minus C1, bit 0 input signal from control register, the second of which is the minus C1, bit 2 input signal from the control register, and the third of which is the minus C0, bit 0 input signal from the control register. The output from the AND gate 346 is also applied as an enabling input signal to an additional plurality of AND gates 370, 371, and 372 shown in FIG. 5*g*. The AND gate 370 has a second input signal from the minus 3 decode line of the decode circuit 266. The AND gate 371 has a plurality of additional input signals, the first of which is an enabling output signal from the AND gate 348, the second of which is the MINUS A SOURCE INDIRECT BYTE enabling signal on the line 366, and the third of which is the minus 1 decode signal from the decode circuit 266. The AND gate 372 has an additional input signal from the minus 2 decode signal line from the decode circuit 266. The output signals from the AND gates 370 and 371 are applied to an OR gate 374. One enabling output signal from the OR gate 374 is applied as one input to an OR gate 376. The output signals from the AND gates 372 and 364 are applied as input signals to an OR gate 378. One enabling output signal from the OR gate 378 is applied to the second input to an OR gate 376. A second enabling output signal from the OR gate 374 is the MINUS INCREMENT BIT POSITION T4 and T5 enabling signal which is applied to an AND gate 380 in the hardware adder circuit 276. The minus T4 and T5 decrement signal from the OR gate 378 is applied as an enabling signal to an AND gate 382 of the hardware adder 276. The A SOURCE INCREMENT/DECREMENT signal from the OR gate 376 is applied as an enabling signal to an AND gate 384 shown in FIG. 5*f*. The AND gate 384 has as a second enabling signal the 8/9 timing signal from the clock circuit. The output from the AND gate 384 is applied to an AND gate 386 in both the storage positions 286 and 287 respectively. The second input signal to the AND gate 386 is from the output bus 278 from the adders 274 and 276. The AND gate 386 in position 286 of the register 280 is responsive to the T4 GATE SIGNAL on the bus 278 while the AND gate 386 in position 287 is responsive to the T5 GATE SIGNAL from the bus 278. The output signal from the AND gate 360, shown in FIG. 5*f*, is applied to the AND gate 388 in the storage positions 288 and 289 respectively. The AND gate 388 in storage position 288 has as its second input signal the T6 GATE SIGNAL from the bus 278. The AND gate 388 in storage position 288 has as its second input signal the T7 GATE SIGNAL from the bus 278.

One of the functions of the bus 185 as shown in FIGS. 5*c* and 5*g* is to transfer the contents of the bit positions 4 and 5 of the register 280 to the hardware adder 276 and the bit positions 6 and 7 of the register 280 to the hardware adder 274. A first section 390 of the hardware adder 276 operates as a decode circuit of the 286 and 287 bit positions of the register 280. A first AND gate 392 receives a plurality of input signals, the first of which is the minus bit 4 bit position of the register 280, the second of which is the 4/5/6 timing signal from the clock, and the third of which is the DECREMENT enabling signal from an AND gate 394. The AND gate 394 has a plurality of input signals, the first of which is the A SOURCE INDIRECT BYTE enabling signal from the AND gate 346 and the second of which is the output signal from a decode circuit 396, shown in FIG. 5*e*. The decode circuit 396 again is responsive to the control register. More specifically, the circuit 396 has as its first input signal the minus C0, bit 0 signal, a second input signal of minus C0, bit 2, a third input signal of minus C0, bit 3, and a not MULTIPLEX FORCE signal on a line 397.

The AND gate 382, shown in FIG. 5*c*, is equipped with a plurality of input signals, the first of which is the plus 4 input signal from the bus 185, the second of which is the 8/9/0 timing signal from the clock, and the third of which is the enabling output signal from the OR gate 378. The AND gate 380 is also equipped with a plurality of input signals, the first of which is a minus 4 input signal from the bus 185, the second of which is the 8/9/0 timing signal from the clock circuit, and the third of which is the negative increment T4T5 signal from the OR gate 374. An AND gate 398 is equipped with a plurality of input signals, the first of which is the minus 4 input signal from the bus 185 and the second of which is the 1/2/3 timing signal from the clock circuit. The output from the AND gates 380, 382, 392, and 398 are applied to an OR gate 400. The OR gate 400 generates a first enabling output signal for application to a plurality of AND gates 402 and 404, and a second enabling output signal for application to a plurality of AND gates 406 and 408. The AND gate 402 is equipped with an additional input signal which is the plus 5 input signal from the bus 185. The AND gate 404 is equipped with an additional input signal which is the minus 5 input signal from the bus 185. The AND gate 406 is equipped with an additional input signal which is a plus 5 input signal from the bus 185, and the AND gate 408 is equipped with an additional input signal which is the minus 5 input signal from the bus 185. The AND gates 402 through 408 are equipped with a first enabling output signal and a second enabling output signal. The second enabling output signal from each of the AND gates 402 through 408 is applied to a bus 410 for insertion into their positions 282 through 285 of the register 280 by AND gates 411, respectively. The AND gate 411 receives a second enabling input signal from an AND gate 439*a*. The AND gate 439*a* is equipped with a plurality of input signals, the first of which is the 5/6 timing signal from the clock, and the second of which is the output signal from an AND gate 394. The AND gate 394 is equipped with a plurality of input signals, the first of which is the output of the AND gate 346, and the second of which is the output signal of a decode AND circuit 396 shown in FIG. 5*e*.

The first enabling output signal from the AND gate 402 is applied to an OR gate 418, shown in FIG. 5*d*, and the first enabling output signal from the AND gate 404 is applied to an OR gate 420. The first enabling output signal from the AND gate 406 is applied as a gating signal to both the OR gates 418 and 420. The output signals from the OR gates 418 and 420 are applied to the bus 278 for re-insertion into their respective positions 286 and 287 of the register 280.

The hardware adder 274 is additionally equipped with a decode circuit 422 which operates in a manner similar to the decode circuit 390 but having different input signals from the bus 185. The decode circuit 422 is equipped with a plurality of AND gates 424, 425, 426, and the AND gate 362. The AND gate 424 is equipped with a plurality of input signals, the first of which is the minus 6 input signal from the bus 185, the second of which is the 4/5/6 timing signal from the clock, and the third of which is an enabling input signal from the AND gate 414. The AND gate 425 is equipped with a plurality of input signals, the first of which is the plus 6 input signal from the bus 185, the second of which is the 8/9/0 timing signal from the clock, and the third of which is the minus DECREMENT T6/T7 enabling signal from the AND gate 348, shown in FIG. 5*g*. The AND gate 362 is also equipped with a plurality of input signals, the first of which is a minus 6 signal from the bus 185, the second of which is the 8/9/0 timing signal from the clock, and the third of which is an enabling output signal from the AND gate 344. The AND gate 426 is equipped with a plurality of input signals, the first of which is a minus 6 input signal from the bus 185, and the second of which is the 1/2/3 timing signal from the clock.

The appropriate output signals from the AND gates 424, 425, 426, and 362 are applied to an OR gate circuit 428 which generates a first enabling output signal for application to a pair of AND gates 430 and 432 and which generates a second enabling output signal for application to a pair of AND gates 434 and 436. The AND gate 430 is furnished an additional input signal from the plus 7 line of the bus 185 and the AND gate 432 is furnished the minus 7 input signal from the bus 185. The AND gate 434 is furnished the plus 7 input signal from the bus 185. The AND gate 436 is furnished the minus 7 input signal from the bus 185. AND gates 430 through 436 are employed to generate a first enabling output signal and a second enabling output signal for each stage. The second enabling output signal for each stage is applied to a feedback bus 438 for application to the respective stages 282 through 285 of the register 280 by an AND gate 439. The AND gates 439 each receive a second enabling signal from an AND gate 412. The AND gate 412 receives a pair of input signals, the first of which is the 5/6 timing signal from the clock, and the second of which is the output of the AND gate 414. The AND gate 414 is equipped with a plurality of input signals, the first of which is the output of the AND gate 368 and the second of which is the output signal of a decode AND circuit 416 shown in FIG. 5*e*. The AND gate 416 is equipped with a plurality of input signals, the first of which is the plus C0, 3 signal, the second of which is the minus C0, 0 input signal, and the third of which is a NOT MULTIPLEX FORCE input signal. The first enabling output signal of the AND gate 430 is applied to an OR gate 440. The first enabling output signal of the AND gate 432 is applied to an OR gate 442. The first enabling output signal of the AND gate 434 is applied to both the OR gate 440 and the OR gate 442. The output signals from the OR gates 440 and 442 are applied to appropriate portions of the bus 278. The signals on the bus 278 are employed for re-insertion into their respective positions 288 and 289 of the register 280.

A B register input control circuit 450, shown in FIG. 5*d*, is equipped with a plurality of logic circuits, one of which is shown at 452 comprising a plurality of AND gates 453 through 456. Actually, the circuit 452 comprises a total of three copies of the circuits shown in the figure. The input bus 262 to the AND gates 453 applies the minus 0, 1, and 2 signal thereto from the decode circuit 256. The gating signal for these signals is generated by an enabling circuit 456*a*. The input bust to the AND gate 455 is shown carrying the minus 0, minus 1, and minus 2 input signals from the AND gates 430, 432, and 434. Each one of the signals from these last-mentioned AND gates is applied to a separate AND gate 455. The separate AND gate is then gated with an enabling signal from an AND gate 456*b*. Similarly, the AND gate 454 is actually three AND gates, each of which receives a separate input signal from the AND gates 402, 404, and 406 respectively. Each of the AND gates is then gated with an enabling signal from an OR gate 456*c*. The AND gates 456 receive their input signals over the bus 272. The minus 0, 1, and 2 signals from the decode circuit 266 are applied to individual AND gates 456. An enabling signal is applied thereto by an AND gate 456*d*. It can be seen, therefore, that the output signals 0, 1, and 2 from the adders 274 and 276 and the decode circuits 256 and 266 are gated to a plurality of OR gates 459*a*, 459*b*, and 459*c*. The outputs from these various sources are gated into the OR gates 459*a* through 459*c* by a variety of input gating signals. These gating signals include the output from the OR gates 456*a* through 456*c*. The AND gate 456*b* is equipped with a pair of input signals, the first of which is MINUS B INDIRECT enabling signal from the AND gate 368, and the second of which is the 2/3 timing signal from the clock. The OR gate 456*c* is equipped with a pair of input signals from a pair of AND gates 460 and 462. The AND gate 460 is equipped with a plurality of input signals, the first of which is a 4/5 timing signal from the clock, and the second of which is the A SOURCE INDIRECT BYTE addressing enabling signal from the AND gate 346. The AND gate 462 is equipped with a plurality of input signals, the first of which is an A SOURCE INDIRECT BYTE signal from an AND gate 464, shown in FIG. 5*a*. The second input signal is the output of an OR gate 466, and the third of which is the 2/3 timing signals from the clock. The OR gate 466 is equipped with a plurality of input signals, the first of which is an output signal of an AND gate 472, shown in FIG. 3*a*, and the second of which is a branch word decode signal from an AND gate 470. The AND gate 470 is equipped with a plurality of input signals from the control register. The first enabling signal is a plus C0, bit 0, a plus C0, bit 1, a plus C0, bit 2, and a minus bit 3. The AND gate 472 has a plurality of input signals applied thereto from the control register, the first of which is the plus C0, bit 0, the second of which is the plus C0, bit 1, the third of which is the plus C0, bit 2, and the fourth of which is the plus C0, bit 3.

The enabling circuit 456*a* as shown in FIG. 5*d* comprises a pair of AND gates 480 and 482 applying output signals to an OR gate 484. The AND gate 480 is equipped with a plurality of input signals, the first of which is the output of an OR gate 486, the second of which is the plus A INDIRECT BYTE enabling signal from the circuit 464, shown in FIG. 3, and the third of which is the 4/5 timing signal from the clock. The OR gate 486 is equipped with a pair of input signals, the first of which is from the circuit 472 shown in FIG. 3 , and the second of which is the Branch S/R Dec 0 enabling signal on a line 488.

The AND gate 482 is equipped with a plurality of input signals, the first of which is the output of an OR gate 490, the second of which is the plus A INDIRECT BYTE enabling signal from the circuit 464, shown in FIG. 3*a*, and the third of which is the 2/3 timing signal from the clock. The OR gate 490 is equipped with a plurality of input signals, the first of which is the output of the circuit 470, shown in FIG. 5*a*, the second of which is the output of the circuit 472, shown in FIG. 5*a*, and the third of which is the plus ARITHMETIC NOT AK WORD enabling signal on a line 492.

The AND gate **456*d* is equipped with a plurality of input signals, the first of which is the 4/5 timing signal, the second of which is the ARITH WD enabling signal from the circuit 416**, shown in FIG. 5*e*, and the third of whichis the plus A INDIRECT enabling signal from the AND gate 346.

When one of the enabling circuits **456*a* through 456*d* is active, a mask is gated into the OR gates 459*a* through 459*c* in such a way as to gate any of the sub-assemblies 83 through 86 to the sub-assembly 106 of the sub-assembler 14. The sub-assembly 106 forms the input of the B register 23** shown in FIG. 1.

The bus 185 is also connected to a store control circuit 48 whereby the contents of the positions 282 through 285 are gated by an enabling signal from the AND gate 302 for transfer to the main memory storage controls 50 whereby only the bytes specified by the storage mask are returned to the main memory storage location 2.

The circuit 48 comprises a plurality of AND gates 494 through 497 responsive to the positions 282 through 285 respectively of the register 280. Each of the gates 494 through 497 receives its enabling signal from the AND gate 302.

The operation of the circuit 19 is given in greater detail with respect to FIGS. 6*a* and 6*b* and 5*a* through 5*h*. The storage function of the circuit 19 is performed by the register 280 comprising the positions 282 through 289. The high order four positions, 282 through 285, perform a storage mask function. More specifically, this means that prior to operating upon data withdrawn from main memory, for example an arithmetic operation, the upper four positions 282 through 285 are reset to a binary 0 condition. Thereafter, when any sub-unit or byte of information is processed, its byte position is clearly identified by the setting of a binary 1 into the corresponding bit positions 282 and 285. In this manner, only those bytes of information which have been processed are rewritten into main memory. When a message ends or begins on other than a word boundary, it is necessary that the remaining message within the same word is not disturbed in main storage. The masking operation of the positions 282 through 285 accomplishes this result.

The posiitons 286 and 287 are functionally joined together to contain the address of the indiivdual byte of a first operand of an arithmetic operation. The positions 288 and 289 are functionally joined together to represent the byte address of the second operand of an arithmetic operation. Obviously, if a unit or word of information contained more than four bytes, the positions required to identify and address the bytes would be expanded to cover the required number of positions. The output from the positions 286 and 287 are applied to a two-bit adder 276. An output from a selected one, the adders 274 and 276, is directly applied to the storage positions 282 through 285 by a selected one of the AND gates 411 and 439 in each position in such a manner as to indicate the byte address which is presently undergoing an arithmetic operation. At a later time in the same cycle, the output of the positions 286 and 287 are combined with the control information from the increment/decrement control circuit 264 in order to either increment or decrement the address contained in the positions 286 and 287. The altered address information is conveyed by the bus 278 back to the positions 286 and 287 by the AND gate 386. The increment/decrement control signals are a combination of the output from the decode circuits 256 and 266 and the AND gates 346 and 368. The increment/decrement circuit 274 operates in a similar manner with the contents of the positions 288 and 289. The outputs of the OR gates 452, of which there are three such OR gates, select the byte which is gated into the B register. This information can come selectively from the positions 286 and 287, or the pair of positions 288 and 289, or the output of the decode circuit 256, or the output of the decode circuit 260.

Figure 6A:
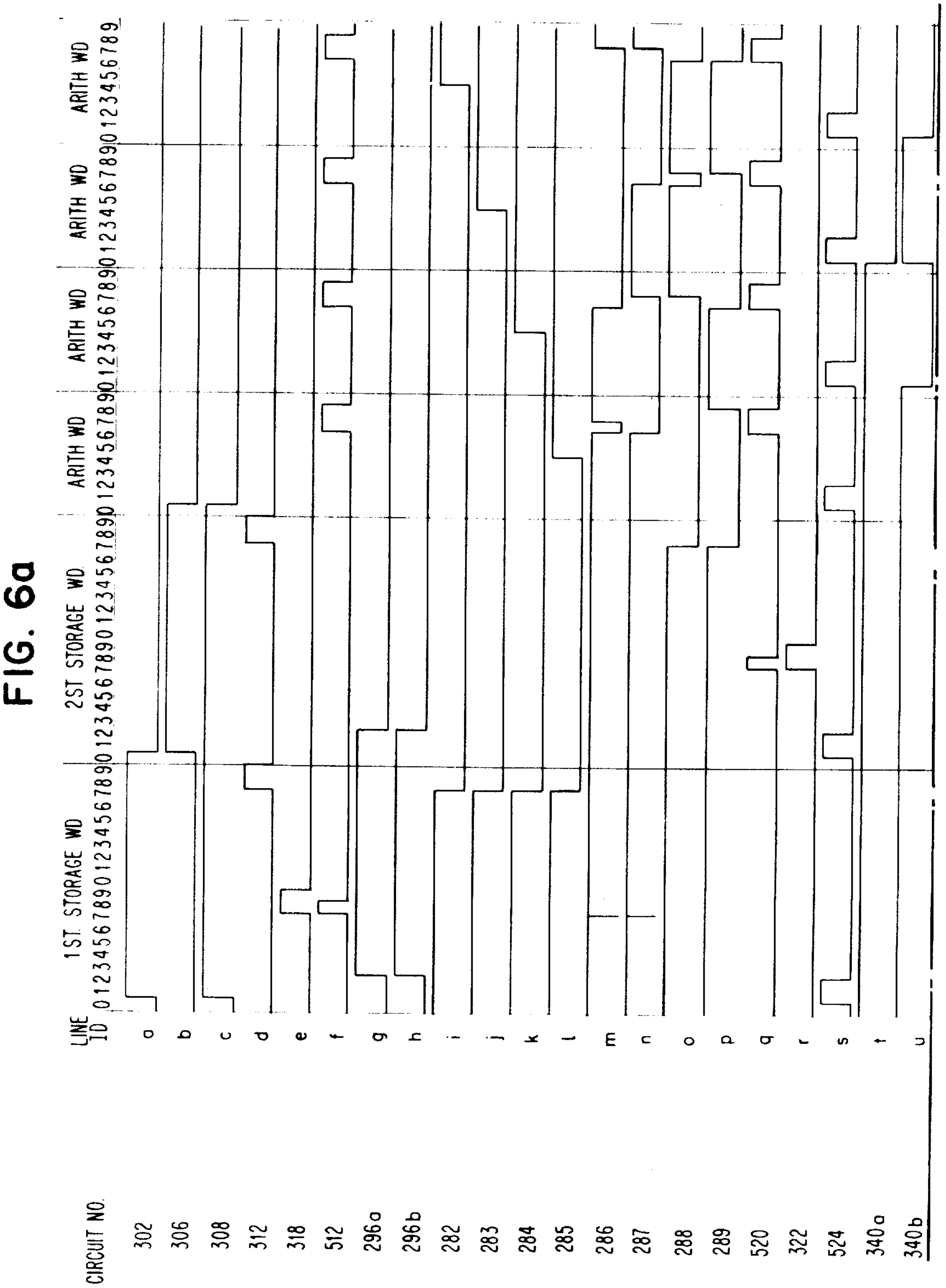
FIGS. 6*a* and 6*b* show timing waveforms associated with FIGS. 5*a* through 5*p*.
Figure 6B:
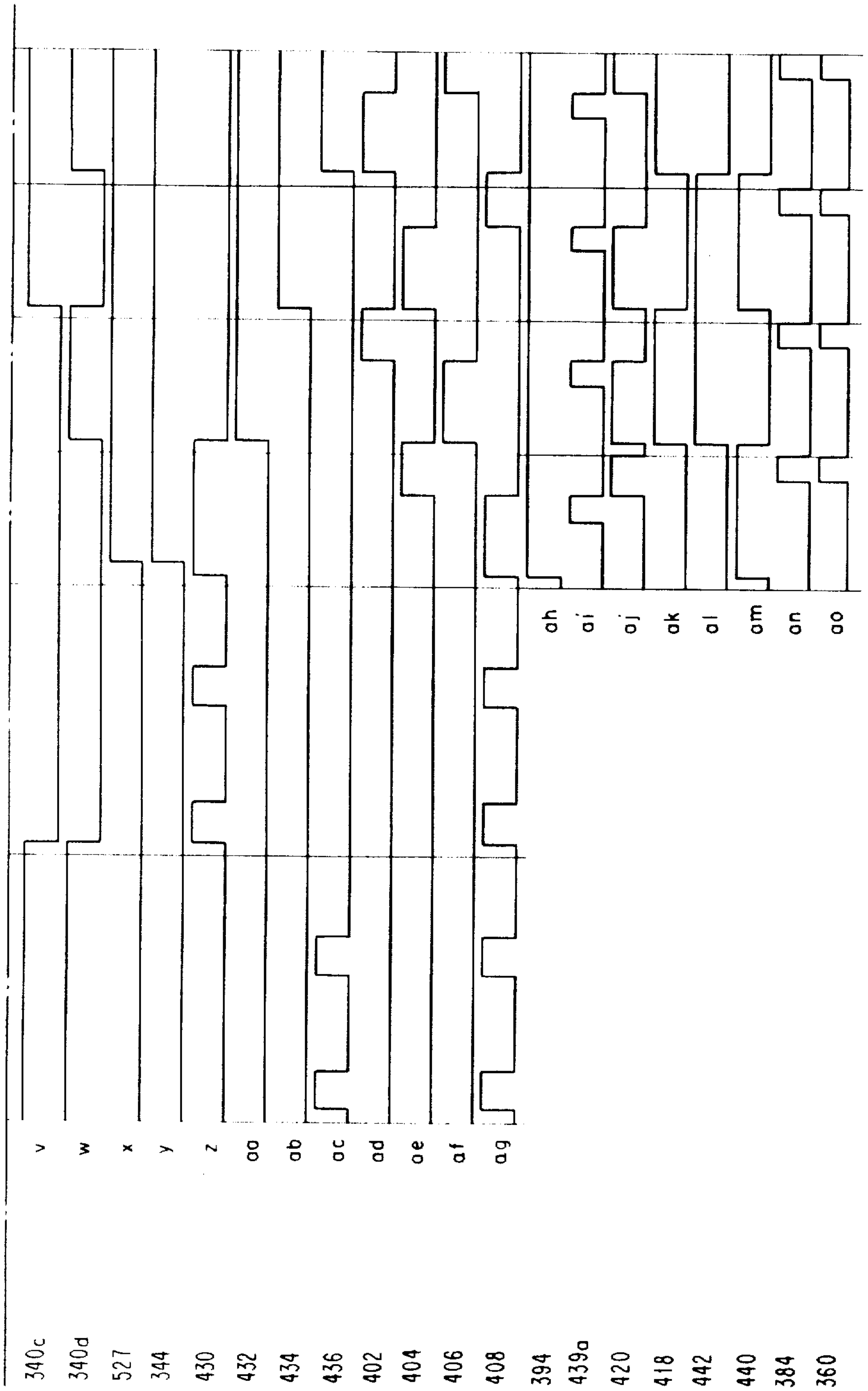

The operation of the circuit 19 will now be more specifically described with reference to the timing diagrams shown in FIGS. 6*a* and 6*b* in combination with FIGS. 5*a* through 5*h*. FIG. 6*a* and 6*b* represent the operating characteristic of the circuits identified in the circuits column. Additionally, each of the circuit columns is further identified as a line A through line AP. The timing diagram is not an operational timing diagram, but it is for illustration and descriptive purposes only.

The operation of the circuit 19 is described basically in relationship with two types of words, namely: a storage word and an arithmetic word. For a complete explanation of the storage addressing modes, reference is made to co-pending W. P. Hanf et al. U.S. patent application Ser. No. 670,917 filed Sept. 27, 1967 entitled, "Storage Addressing Mechanism Having Plural Address Generating Paths" and assigned to the assignee of the present invention. Just sufficient information is included herein for tying the storage word operation into the operation of the circuit 19. The first control word to be executed will be a storage word. This word contains identification indicia therein for activating the AND gate 304 and either of the AND gates 302 or 306. The storage read operation is further identified by the enabling of a pair of AND gates 506 and 508 shown in FIG. 5*e*. The function of the first control word is to reset the positions 282 through 284 to a clear condition represented by binary 0's in each position. This function is performed in the following manner. The output of the AND gate 302, line A, FIG. 6*a*, is applied to the AND gate 312, line D, by the OR gate 308, line C, and the line 310. The remaining inputs to the AND gate 312 are satisfied, thereby applying an enabling output signal to the AND gate 502 in each of the positions 282 through 285. The restart and reset signal is available on a line 510. The next function of the present control word is to reset a pair of positions in the low order half of the register 280. The selected pair comprises positions 286 and 287. The output of the AND gate 302 is applied over a line 320 to an AND gate 318 line E. The output of the AND gate 318 activates a reset circuit 512, line F. The reset circuit 512 comprises a pair of AND gates 514 and 516. The output of the AND gates 514 and 516 is applied to an OR gate 518. The AND gate 514 has a second input signal other than the AND gate 318 comprising the 7/8 time timing signal. The AND gate 516 is equipped with a plurality of input signals, the first of which is the 7/8 time timing signal and the second of which is the output of the OR gate 376. It can be seen with reference to the output of lines F and E that the output from the AND gate 318 continues for a time after the output from the circuit 512 drops. More specifically, this means that the output from the circuit 512 resets positions 286 and 287 to a binary 0 condition or a clear state. The output from the AND gate 318 gates the contents of the lines **296*a* and 296*b* into the positions 286 and 287 respectively. The contents of the lines 296*a* and 296*b*, lines G and H, comprise byte or address indicia from the register 40 shown in FIG. 1. The positions 286 and 287 hold address indicia to select a byte of the first operand. For the purpose of this description, it will be assumed that the line 296*a* and 296*b* both contain a binary 1 at this time. Accordingly, a binary 11 is loaded into positions 286 and 287 respectively of the register 280**. This completes the functioning of the first control word.

The second control word operates similarly to the first control word. The function is to reset to zero the positions 282 through 285 of the register 280 and to load byte address indicia of the second operand into positions 288 and 289. The contents of the lines **296*a* and 296*b* are changed by other machine operations intermediate to the loading of the positions 286 and 287 and the present operation to load the positions 288 and 289. The enabling signals are now generated by the AND gate 306** shown in line B of FIG. 6*a*. The output from AND gate 306 is applied to an AND gate 322, line R, over the line 324. The output of the AND gate 322 is applied to a circuit 520, line Q, which operates to reset the positions 288 and 289. The circuit 520 comprises a pair of AND gates 522 and 524. The output of these AND gates are applied to an OR gate 526. The input signals to the AND gate 522 is the output of the AND gate 322 and the 7/8 time signal. The input signal to the AND gate 524 comprise the 7/8 time signal from the clock and the output of the OR gate 358.

It can be seen that the output from the AND gate 322 persists longer than the output of the circuit 520. Accordingly, the operation of these circuits is as follows. The output from the circuit 520 resets the positions 288 and 289 and the output from the AND gate 322 loads the contents of the lines **296*a* and 296*b* into the positions 288 and 289 respectively. For the purpose of this description, we assume that a binary 0 is present on both lines 296*a* and 296*b*. Accordingly, binary 0's are loaded into positions 288 and 289**. This ends the second storage control word function.

Figure 3E:
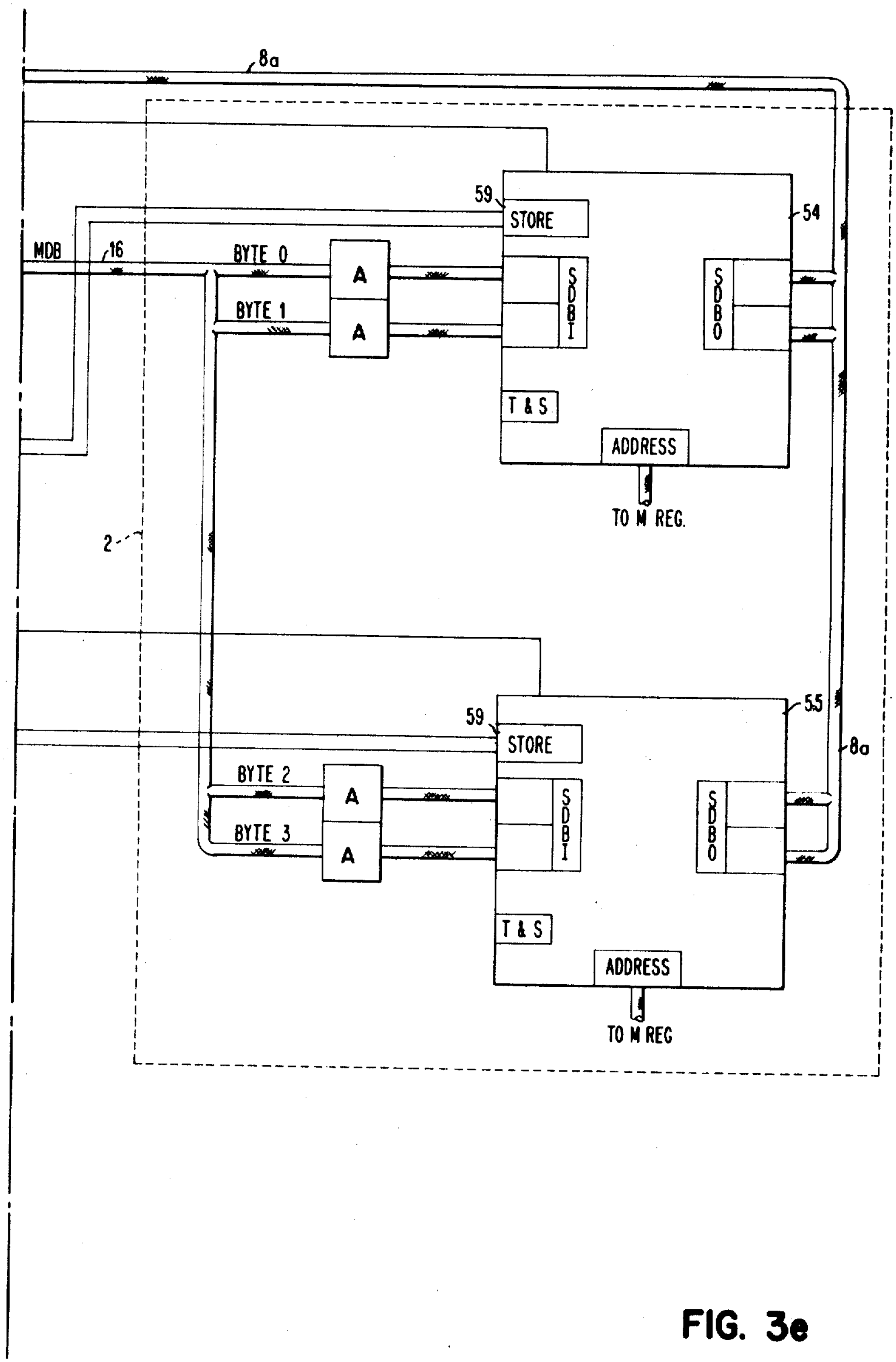

The next significant control word to be executed by the circuit 19 is identified as an arithmetic word. This word has a C1 field containing a hexadecimal value of E4 and a C2 field containing a value of F8. The C0 field in its bit positions 2 and 3 contains a binary 1 and 0 respectively. The identified arithmetic control word operates to generate a plurality of enabling signals. Alternatively, the output of the AND gate 416 or the AND gate 396, shown in FIG. 3*e*, is generated. It is the functioning of the output of these AND gates to determine whether the processed information or result will be placed either in the first operand or second operand location. Accordingly, the storage mask is generated by the two-bit adder 276 or 274 respectively. In the example being described, the output signal from the AND gate 416 is applied by a line 522 to the AND gate 414, shown in FIG. 5*b*. The output of the AND gate 416 indicates that the ARITHMETIC word is an $A=A/B$. This means that the result of the A SOURCE and the B SOURCE arithmetic operation is returned to the A SOURCE storage position. The output of the AND gate 414 is applied to the AND gate 412. The output from the AND gate 412 is applied to the input AND gate 411 to each position 282 through 285. In this manner the contents of the bus 410, which is described hereinafter, is gated into the positions 282 through 285. The $B=A/B$ signal from the AND gate 396 selects the B source as the destination. Accordingly, the storage mask is generated by the adder 274.

The many operating modes of the adder 274 is now described. Generally, the logic employed herein is known as negative AND logic. Whenever one of the AND gates 424, 425, 362, or 426 is furnished all enabling input signals, the OR gate 428 develops a minus enabling signal at its lower output line and a disabling output signal at its upper output line. Whenever none of the AND gates 424, 425 and 362, or 426 is furnished all enabling input signals, the OR gate 400 develops a minus enabling signal at its upper output line and a disabling output signal at its lower output line. Each of the AND gates 430, 432, 434, and 436 generates two enabling signals whenever its input requirements are satisfied.

The special branching signals T67=00 and T67=11 will now be described. A T67=11 condition is characterized by the output from the bus 185 and the minus 6 and minus 7 output signals. At 1/2/3 time, the AND gate 426 is supplied two enabling input signals, namely, minus 6 enabling signal from the bus 185, and the timing signal. Accordingly, the output from the OR gate 428 is an enabling signal from the lower output signal for application to the AND gates 434 and 436. The minus 7 enabling signal from the bus 185 is applied to the AND gate 436. The output from the AND gate 436 is the T67=11 signal on a line 540.

The T67=00 is characterized by the plus 6 and plus 7 signals from the bus 185. The AND gate 426 is the only AND gate furnished the 1/2/3 time signal. Accordingly, at this time the OR gate 428 generates an enabling signal from its upper output line indicating that none of its input AND gates are supplied with all enabling input signals. The enabling output signal from the OR gate 428 is applied to the AND gates 430 and 432. The plus 7 enabling signal from the bus 185 is applied to the AND gate 430. Accordingly, the AND gate 430 is equipped with two enabling signals and the output from this AND gate indicates that T67=00 on a line 542.

At 4/5/6 time it is the function of the adder 274 to generate the storage mask for loading into the upper four positions 282 through 285 of the register 280. At 4/5/6 time, the AND gate 424 is tested to determine if the adder 274 is to be the source of the storage mask. This test is controlled by the output from the AND gate 414. Since the output from the AND gate 414 is a disenabling signal, the AND gate 424 does not provide an output signal. Additionally, the AND gate 412 does not provide an enabling signal to gate the contents of the bus 438 into the positions 282 through 285 by the AND gate 439.

At 8/9/0 time it is the function of the adder 274 to selectively decrement or increment the contents of the positions 228 and 289. This is accomplished in the following manner. The circuit 520 clears the contents of the positions 288 and 289 by resetting these to a zero condition as shown in line Q of FIG. 2*a*. Thereafter, the proper input signals to set these positions to their new value are applied by the T6 or T7 gate over the bus 278. More specifically, the circuit 344, shown in line Y, responds to the output from the decode circuit 256 and the output from the AND gate 368 to indicate a condition where the contents of the positions 288 and 289 are to be incremented. A first enabling output signal from either the AND gate 344 or the AND gate 348 is applied to the OR gate 358 for furnishing an input signal to the AND gate 524 which input signals in conjunction with a 7/8 time timing signal resets the contents of the positions 288 and 289 to zero, line Q. A second enabling output signal on a line 530 is applied to the AND gate 362. At this time and under the assumed conditions that positions 288 and 289 contain a 00, the minus 6 signal is disabled. Accordingly, the OR gate 428 generates an enabling signal on its upper output line for application to the AND gates 430 and 432. Since the plus 7 input signal from the bus 185 is available, the AND gate 430 provides an output signal to the OR gate 440. The contents of the OR gate 440 is applied by the bus 278 to the AND gate 388 in position 289. The AND gate 388 is additionally enabled by the output from the AND gate 360. Accordingly, the T7 gating signal sets a binary 1 into the position 289. The contents of the positions 288 and 289 are a binary 01 or a binary 1. The contents of the positions 288 and 289 are therefore incremented from a binary 0 to a binary 1. This ends the functioning of the adder 274.

The adder 276 is identical with the adder 274. However, as previously mentioned, either the adder 274 or the adder 276 is selected as the source of the storage mask. This storage mask was not generated in the functioning of the adder 274 because of the absence of the enabling signal from the AND gate 414. The adder 276 operates to perform the same functions as the adder 274. During 1/2/3 time it operates to indicate whether the contents of positions 286 and 287 are either 00 or 11 over a pair of lines 544 and 546 respectively. During 4/5/6 time the adder 276 operates as a source of a storage mask and at 8/9/0 time the adder 276 operates to decrement the contents of the positions 286 and 287. The use of the adder 276 is simultaneous with the use of the adder 274. Additionally, each adder can increment its input signal by 1 or can decrement its input signal by 1.

The contents of the positions 286 and 287 have been stated to be a binary 11. Accordingly at 1/2/3 time the AND gate 398 provides an output signal to the OR gate 400. Accordingly a minus enabling signal is available on the lower output line of the OR gate 400. This provides an enabling input signal to the AND gates 406 and 408. The minus 5 input signal from the bus 185 is a second enabling signal for the AND gate 408. In this manner the T45=11 enabling signal on the line 546 is generated by the AND gate 408.

At 4/5/6 time the AND gate 392 is furnished all of its input signals. One input from the AND gate 394, shown on line AH in FIG. 2*b*, selects the adder 276 to furnish the storage mask. Therefore, the OR gate 400 generates an enabling signal on its lower output line for application to the AND gates 406 and 408. The minus 5 signal is available to the AND gate 408 which generates a signal for application to the AND gate 411 in position 285.

At 8/9/0 time the adder 276 operator to selectively decrement or increment the contents of the positions 286 and 287. This is accomplished in the following manner. The circuit 512 clears the contents of the positions 286 and 287 by resetting these to a zero condition as shown in line F of FIG. 6*a*. Thereafter, the proper input signals to set these positions to their new value are applied by the T4 and/or T5 gate over the bus 278.

More specifically, the circuit 527, shown on line X responds to the output for the decode circuit 266 and the output from the AND gate 346 to indicate a condition where the contents of the positions 286 and 287 are to be decremented. A first enabling output signal from the OR gate 378 is applied to the OR gate 376 for furnishing an input signal to the AND gate 516 which input signal in conjunction with a 7/8 timing signal resets the contents of the positions 286 and 287 to zero, line F. A second enabling signal on the line 528 is applied to the AND gate 382. At this time and under the assumed conditions that positions 286 and 287 contain a 11, the plus 4 signal is disabled. Accordingly, the OR gate 400 generates an enabling signal on its upper output line for application to the AND gates 402 and 404. Since the minus 5 signal from the bus 185 is available, the AND gate 404 provides an output signal to the OR gate 420. The resulting signal to the OR gate 420 is applied by the bus 278 to the AND gate 386 in position 286. The AND gate 386 is additionally enabled by the output from the AND gate 384. Accordingly, the T7 gating signal sets a binary 1 into positions 286. The contents of positions 286 and 287 is a binary 10 or a binary 2. The contents of the positions 286 and 287 are therefore decremented from a binary 3 to a binary 2. This ends the functioning of the adder 276.

Referring to lines F and Q of FIG. 6*a*, it can be seen how the contents of the positions 286 through 289 are reset during each arithmetic operation and the incremented or decremented signals are set into the respective positions 286 through 289 as shown on the lines AJ through AM. The signals shown on these lines are indicative of the incrementing of the contents of 288 and 289 from the 00 condition to the 11 condition at the simultaneous decrementing of the contents of the positions 286 and 287 from the 11 condition to a 00 condition. The exact operation is not described in detail since it is well within the skill of the art to continue the operation after an example of incrementing and decrementing has been given.

Figure 5I:
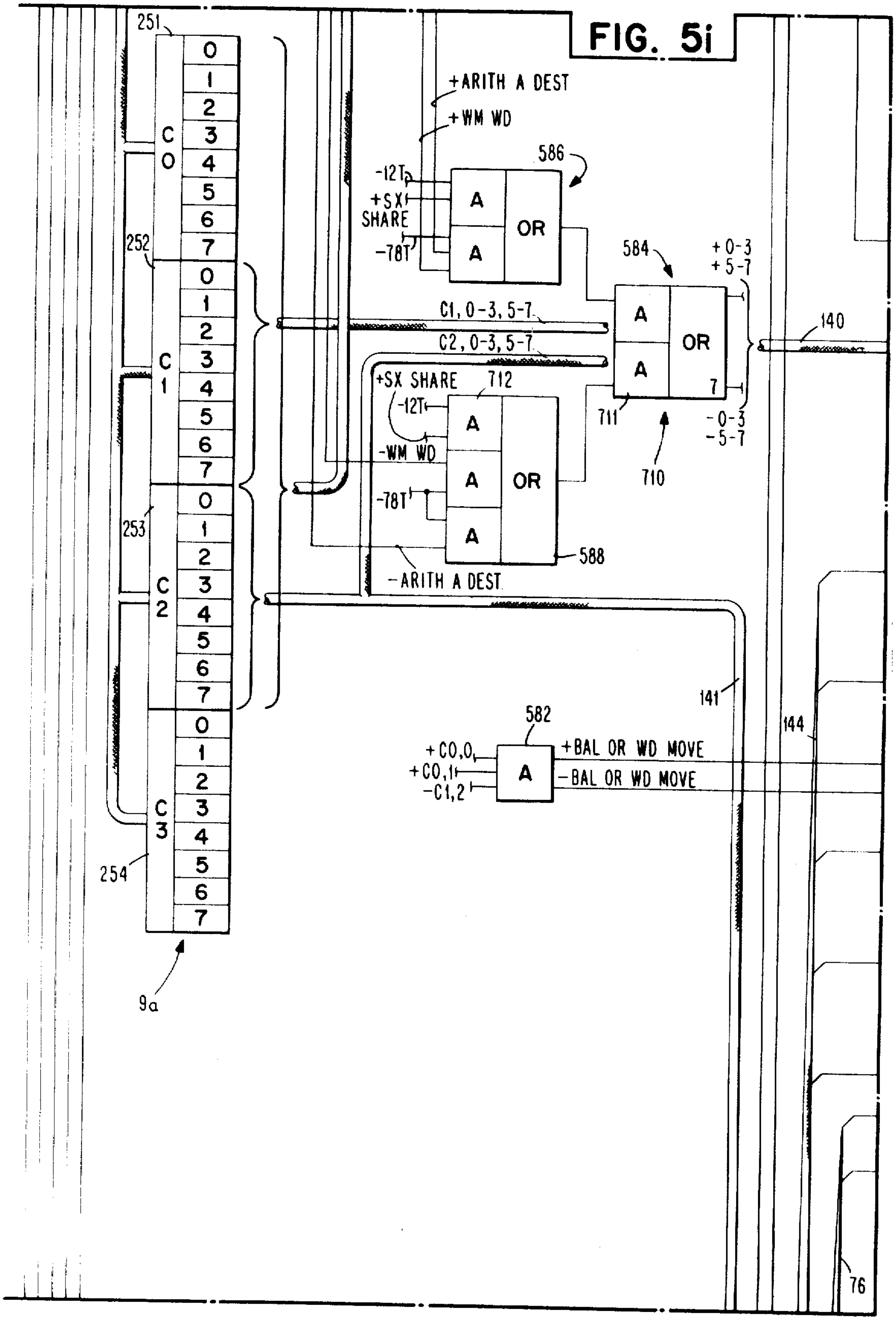
Figure 5J:
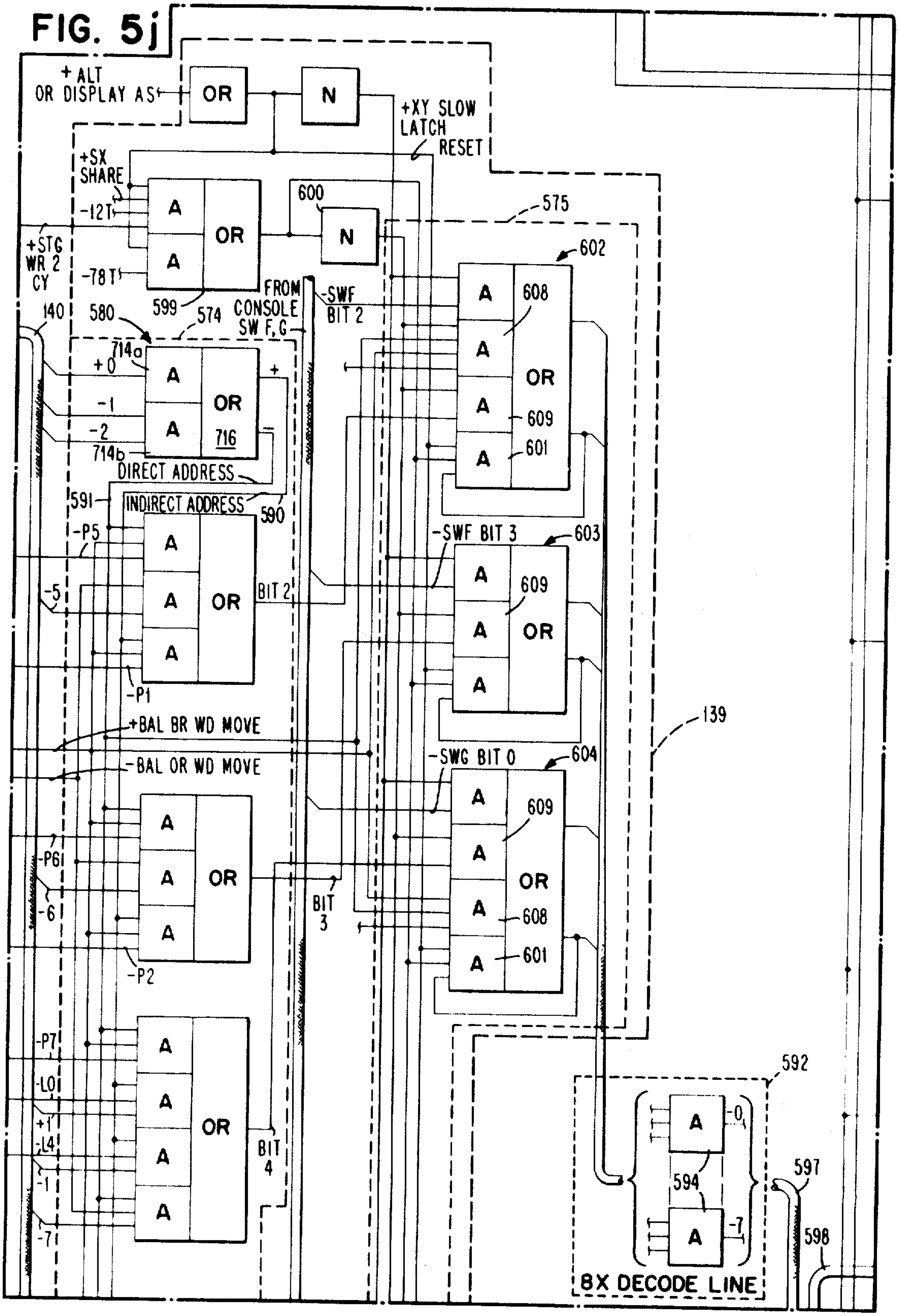
Figure 5K:
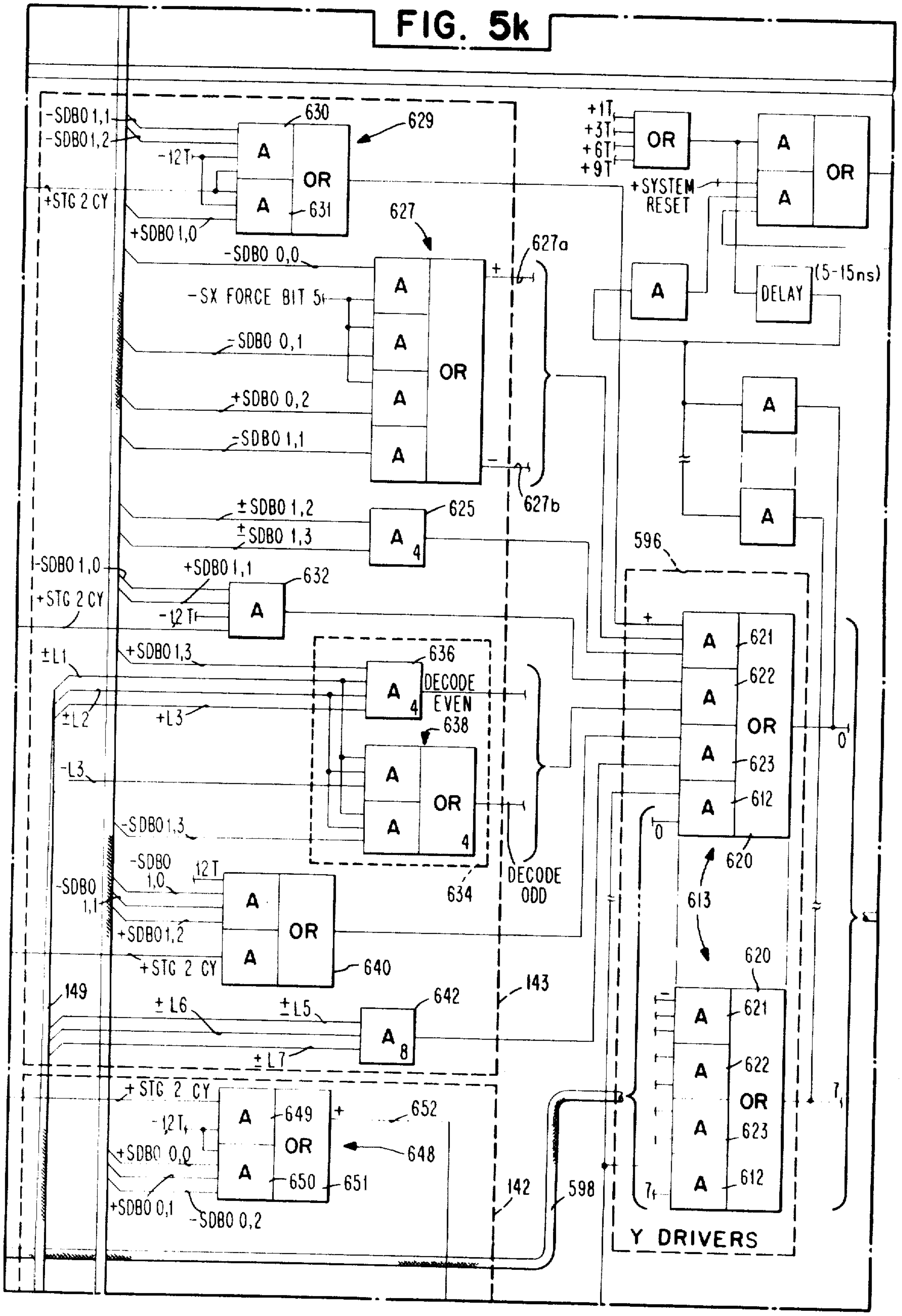
Figure 5M:
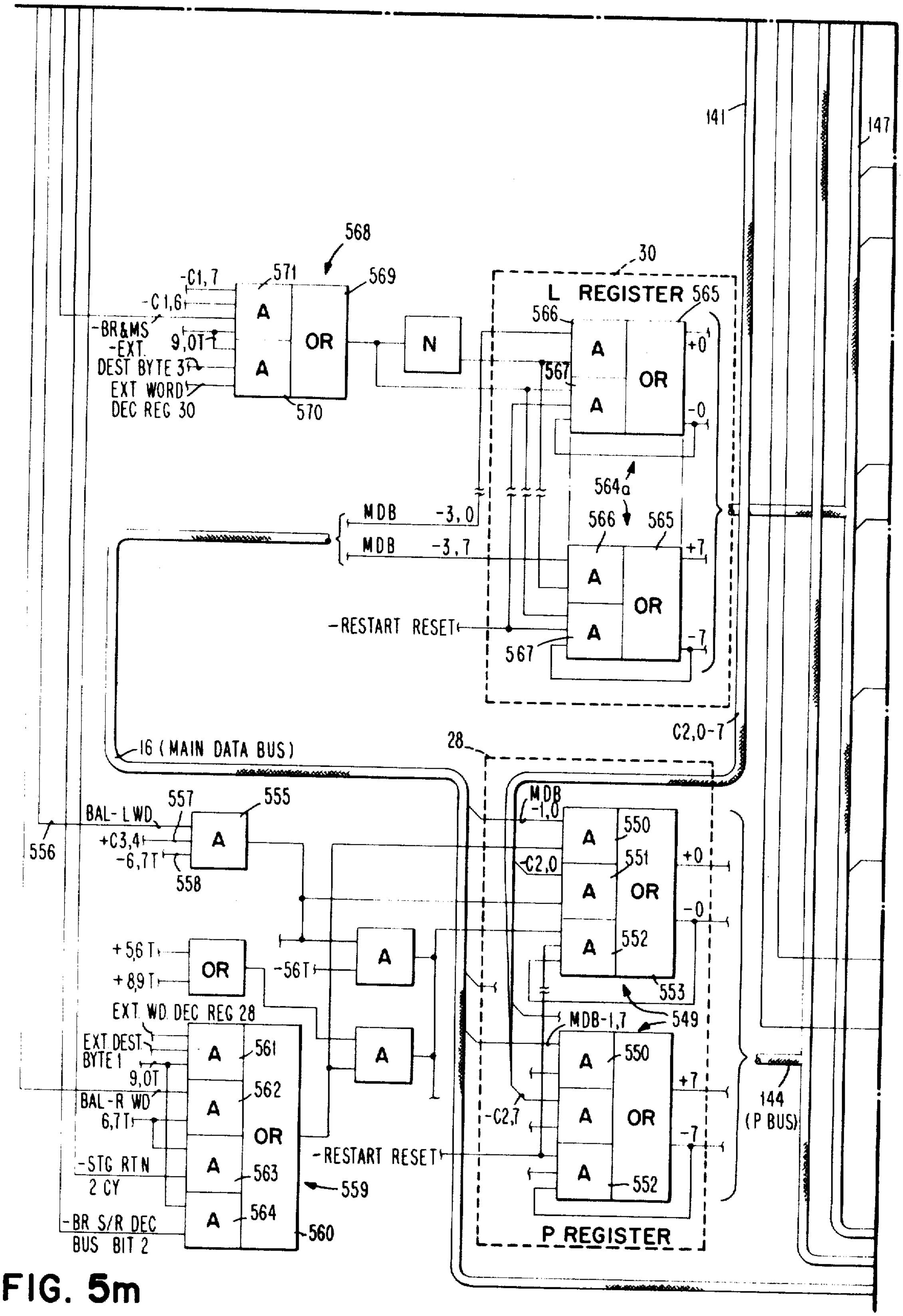

Referring to FIG. 5*m*, there can be seen a detailed diagram of the section select register 28 and the word select register 30. The register 28 furnishes partial address indicia to the address slow path circuit 139 and the fast path circuits 142 and 143.

Input to an individual storage position 549 of the register 28 is obtained by way of a plurality of input AND gates 550, 551 and 552. The storage element of a storage position 549 is a latch-back OR circuit 553. There are as many storage positions 549 in the register 28 as there are bits on the input buses to the register 28. There are eight identical positions 549 in the register 28. Byte 1, bits 0–7 of the main data bus 16 and byte 2, bits 0–7 on the bus 141 of the decode circuit 9*a* are applied to the AND gates 550 and 551, respectively, in each of the positions 549. The remaining AND gates 552 provide entry of a restart-reset signal whenever it is desired to zero out or clear the contents of the register 28. Each of the AND gates 550, 551, and 552 is provided with its own enabling input signal. The AND gate 551 is supplied with an enabling signal from an AND gate 555. The AND gate 555 is provided with a plurality of input signals, the first of which is applied thereto on the line 556 and comprises the decode of a BRANCH AND LINK-LINK enabling signal, the second of which is applied on a line 557 and is the plus C3, 4 output signal from the decode circuit 9*b*, and the third of which is a 6/7 time timing signal from the clock circuit on a line 558. The enabling signal for the AND gate 550 is generated by a gating circuit 559. Gating circuit 559 comprises a single OR gate 560 and a plurality of input AND gates 561 through 564. The AND gate 561 is equipped with a plurality of input signals, the first one of which is an EXTERNAL WORD SELECT REGISTER 28 decode enabling signal, the second one of which is the EXTERNAL DESTINATION BYTE 1, and the third of which is the 9/0 time timing signal from the clock circuit. The AND gate 562 is equipped with a plurality of input signals, the first one of which is the BRANCH AND LINK-RETURN enabling signal, and the second one of which is the 6/7 time timing signal from the clock circuit. The AND gate 563 is equipped with a plurality of input signals, the first one of which is the 6/7 time timing signal, and the second one of which is the STORAGE RETURN SECOND CYCLE enabling signal. The AND gate 564 is equipped with a plurality of input signals, the first one of which is a 9/0 time timing signal, and the second one of which is the BRANCH enabling signal. Whenever it is desired to load the register 28 from the C2 byte of the decode circuit 9*b*, one of the input configurations to the AND gates 561–564 is satisfied. The contents of the bus 141 is gated into section select address register 28.

The register 30 is similarly constructed to the register 28. Each of the storage positions 564*a* of the register 30 comprises a latch-back OR circuit 565 and a plurality of input AND gates 566 and 567. The register 30 is responsive to the contents of byte 3 of the main data bus 16 through the AND gate 566. The AND gate 567 provides a RESTART-RESET capability to the register 30. The enabling signal for the AND gate 566 is generated by a decode circuit 568. The gating circuit 568 comprises an OR gate 569 and a plurality of input AND gates 570 and 571. The AND gate 571 is equipped with a plurality of input signals, the first of which is the minus C1, 7 signal, the second of which is the minus C1, 6 signal, the third of which is the BRANCH AND MODULE SWITCH enabling signal, and the fourth of which is the 9/0 timing signal. The AND gate 570 is equipped with a plurality of input signals, the first of which is the 9/0 timing signal from the clock circuit, the second of which is the EXTERNAL DESTINATION BYTE 3 enabling signal, and the third of which is the EXTERNAL WORD SELECT REG. 30 enabling signal. When the enumerated conditions for either of the AND gates 570 or 571 are satisfied, the output signal from the OR gate 569 causes the contents of the main data bus byte 3 to be loaded into the register 30.

A representative loading mechanism for the registers 28 and 30 uses the AND gates 561 and 570 to load data into these registers. This occurs during an EXTERNAL DESTINATION mode of operation. In each of these conditions, the external destination enabling signal identifies either the register 28 and/or 30 and the external destination byte control signal selects which byte from the main data bus is to be gated into the registers 28 and 30.

Figure 51:
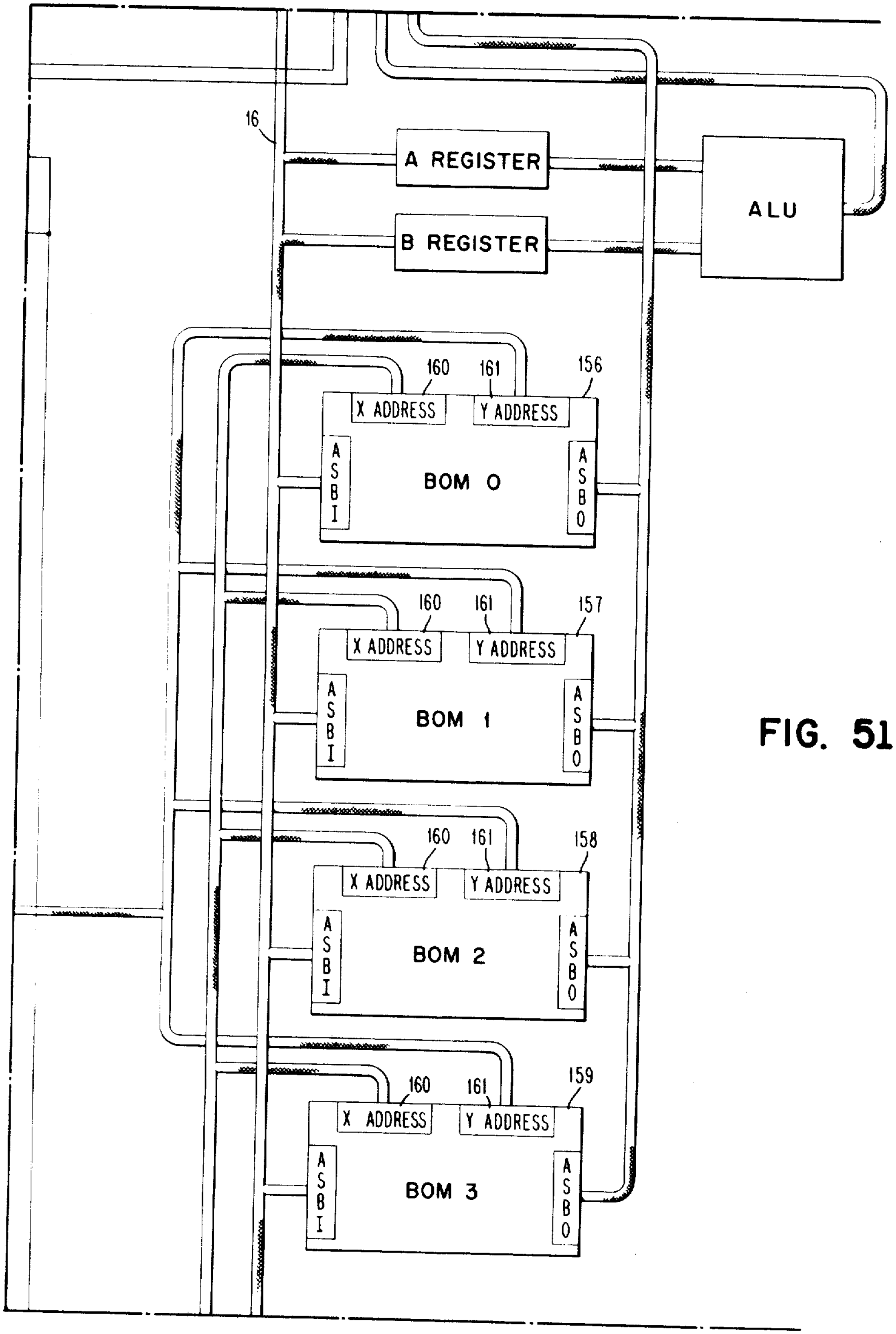

The output from the registers 28 is conveyed by the bus 144 for transfer to the slow path circuit 139 and fast path circuits 142 and 143. The output of the register 30 is conveyed by the buses 147, 148, and 149 to the circuits 139, 142, and 143 respectively. The slow path circuit 139 comprises a first stage 574 and a second stage 575. The enabling signals for gating the address indicia from the bus 144 associated with the register 28, the bus 147 associated with the register 30, and the bus 140 associated with the register 9*a*, into the first stage 574 originate in a first enabling circuit 580, shown in FIG. 5*j*, and a second enabling circuit 582, shown in FIG. 5*i*. The control register indicia input signal to the enabling circuit 580 is applied thereto by an assembler circuit 584. The assembler circuit 584 is equipped with a first series of input signals from the C1 byte, bits 0–3, and 5–7 of the register 252 as gated by an enabling circuit 586. A second series of input signals are applied to the enabling circuit 584 from the C2 byte, bits 0–3 and 5–7 from register 253 as gated by the signal from an enabling circuit 588. The bits 0, 1, and 2 input signals from the output of assembler 584 are applied as the input to the enabling circuit 580. The Zero signal is gated directly through and corresponds to the INDIRECT ADDRESS enabling signal on a line 590. The 1 and 2 bit signals are "anded" together to indicate the DIRECT ADDRESS enabling signals on a line 591.

feeding each of the OR gates. In this manner, more address indicia can be assembled into a final output bus for application to an X address decode circuit 592 and a Y address decode circuit 593. Each of decode circuit 592 and 593 comprise a plurality of individual AND gates 594. The AND gates in the circuit 592 generate a first co-ordinate address selection signal. The AND gates in the circuit 593 generate a second co-ordinate address selection signal. These half-select enabling signals are applied to an X driver circuit 595 and Y driver circuit 596 by the buses 597 and 598 respectively. The output of the X drivers 595 and Y drivers 596 are applied to the X address circuit 160 and Y address circuit 161 shown in FIG. 51.

The enabling signal for gating the information through the second stage 575 of the circuit 139 originates in an enabling circuit 599 shown in FIG. 5*j*. A disabling signal is generated by the circuit 599 whenever the enumerated input conditions are not available. Generally, this occurs at 1, 2 time of the second half of each access to active store 17. The general signal generated at 1, 2 time is applied to an INVERTER circuit 600 and to an AND gate 601 in a plurality of sub-assemblers 602 through 607. The inverter 600 generates an enabling signal for application to an AND gate 608 in sub-assemblers 602 and 603 and an AND gate 609 in sub-assemblers 602 through 607. The AND gate 609 gates the address indicia from the stage 574 into the decode circuits 592 and 593. The X decode signals from the circuit 592 are applied to an AND gate 610 in each of the plurality of driver stages 611 of the X driver circuit 595. The Y decode signals from the circuit 593 are applied to an AND gate

TABLE A

| Mode Identification Signals — Byte C1 or C2: Forms | 0 | 1 | 2 | 3 | P3 | DEFINES | Bits | Local Storage Address — 1 sector, expiration: 0 | 1 | 2 | 3 | 4 | 1 Major S.D.: 5 | 6 | 7 | Minor S.D. Byte: 0 | 1 |
|---|---|---|---|---|---|---|---|---|---|---|---|---|---|---|---|---|---|
| A | 0 | X | X | X | X | Direct local stg. word address | do | 0 | P4 | P5 | P6 | P7 | C1 or C2<br>1 | 2 | 3 | C1 or C2<br>4 | 5 |
| B | 1 | 0 | 0 | X | 0 | Indirect local stg. word address | do | 0 | P0 | P1 | P2 | P0 | L1 | L2 | C1 or C2<br>3 Ω L3 | C1 or C2<br>4 | 5 |
| C | 1 | 0 | 1 | X | 0 | Indirect word, indirect byte | do | 0 | P0 | P1 | P2 | L0 | L1 | L2 | C1 or C2<br>3 Ω L3 | T4 or T5<br>T6 or T7 | |
| D | 1 | 1 | 0 | 0 | X | Special external register set S, P, T, L | do | | | | | | | | | C1 or C2<br>4 | 5 |
| E | 1 | 1 | 0 | 1 | 0 | Indirect local stg. word address | do | 0 | P0 | P1 | P2 | L4 | L5 | L6 | L7 | C1 or C2<br>4 | 5 |
| F | 1 | 1 | 1 | 0 | 0 | Direct word 1, indirect byte | do | 0 | P4 | P5 | P6 | P7 | C1 or C2<br>1 | 2 | 3 | T4 or T5<br>T6 or T7 | |
| G | 1 | 1 | 1 | 1 | 0 | Direct word 2, indirect byte | do | 0 | P4 | P5 | P6 | P7 | C1 or C2 | 2 | 3 | T4 or T5<br>T6 or T7 | |
| H | 1 | X | X | X | 1 | External 8 groups of 7 words | do | | | P0 | P1 | P2 | C1 or C2<br>2 | 2 | 3 | C1 or C2<br>4 | 5 |
| Frame | a | b | c | d | e | | do | f | g | h | i | j | k | l | m | n | o |

By referring to Table A, indirect address forms B, C, and E are identified by the presence of an enabling signal on the line 590. Direct address forms A, F, and G are identified by the presence of the enabling signal on the DIRECT ADDRESS line 591.

The first stage 574 of the circuit 139 comprises a plurality of OR gates and each OR gate is equipped with a plurality of AND gates. The enabling signals from the enabling circuits 580 and 582 gate the various combinations of input signals from the input buses 144, 147, and 140 into the second stage 575 of the circuit 139. The second stage 575 is similar to the first stage and comprises a plurality of OR gates and a plurality of AND gates 612 in each of the plurality of driver stages 613 of the Y driver circuit 596.

Figure 5N:
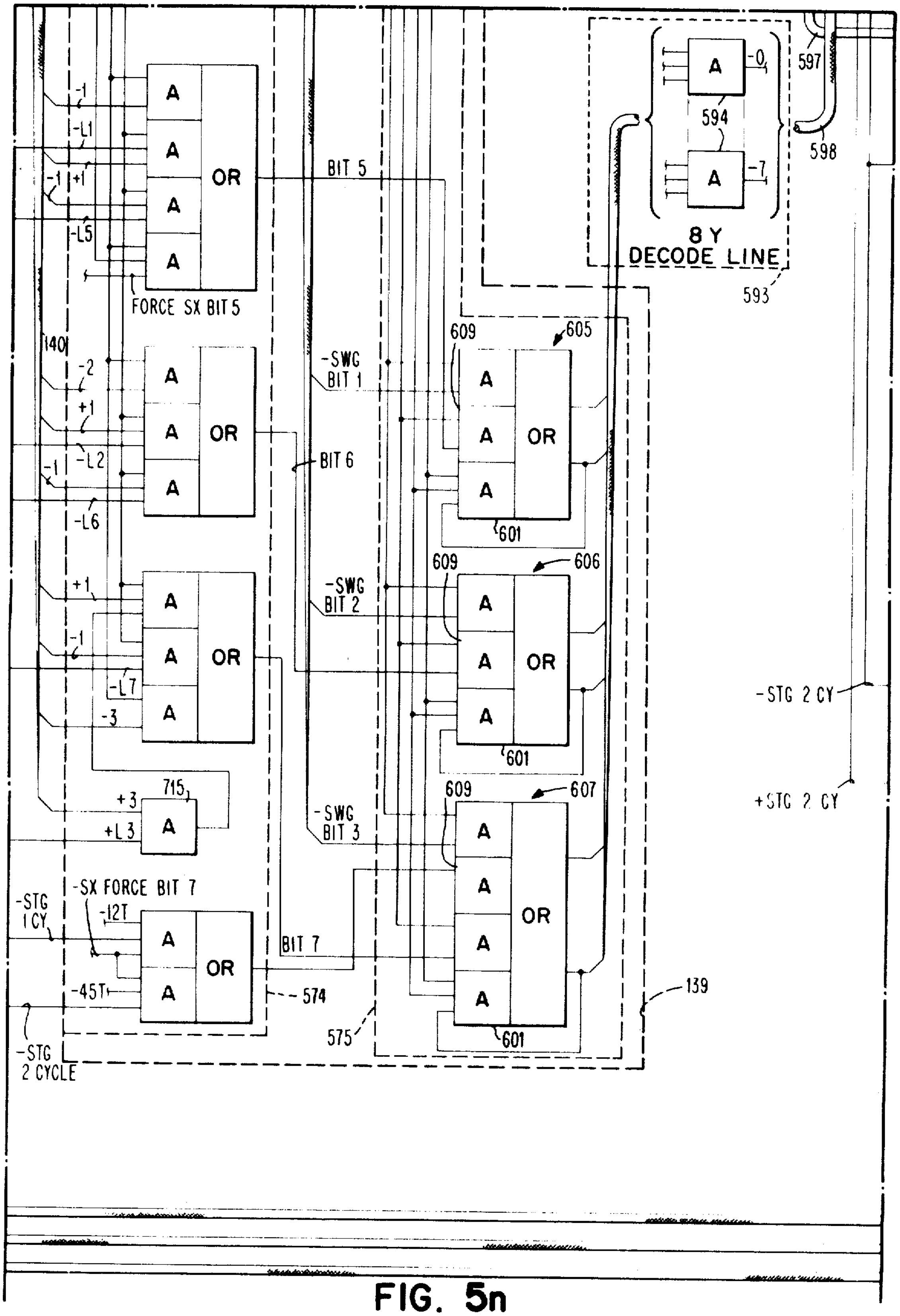
Figure 5O:
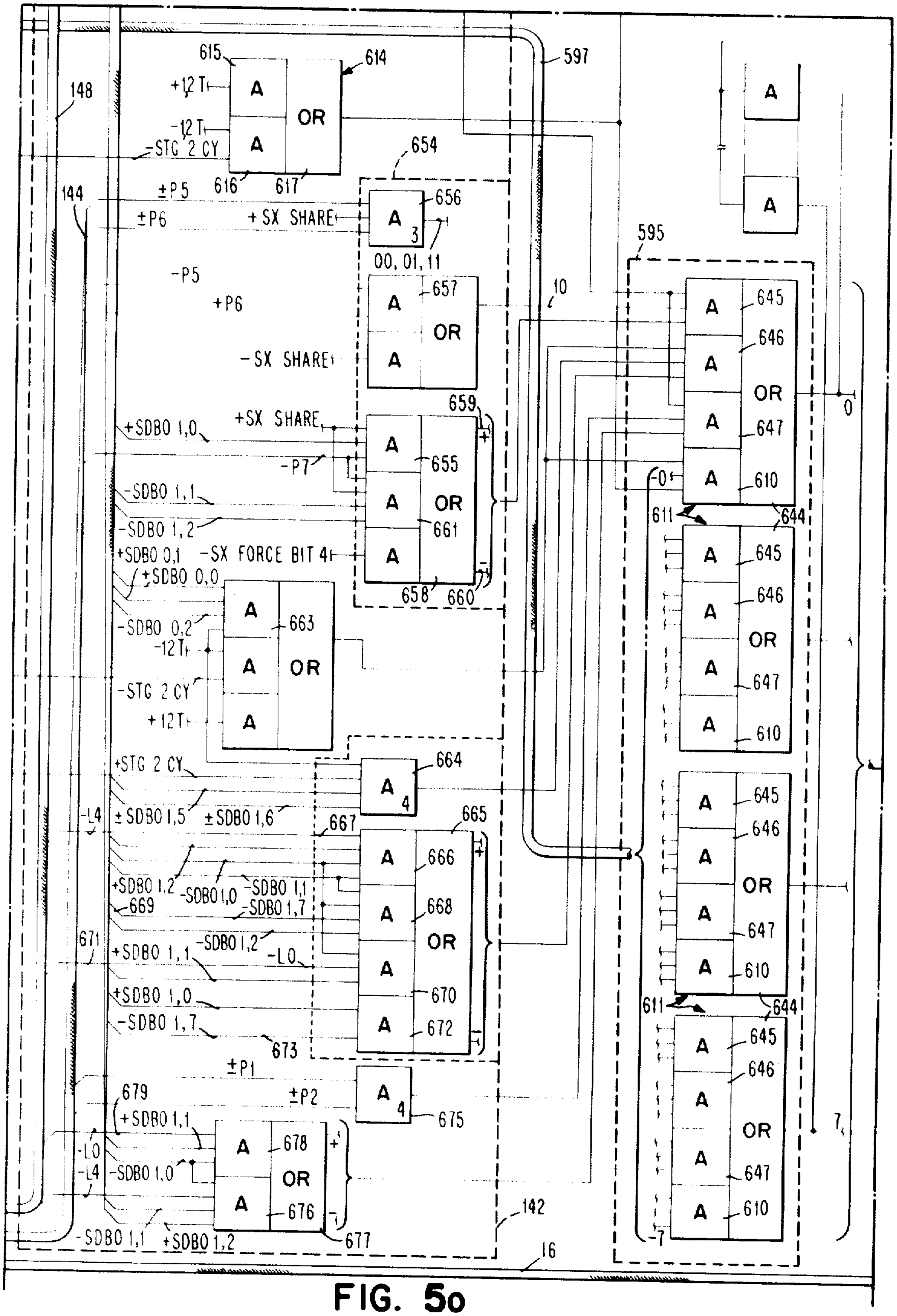

The enabling signal to gate the contents of the buses 597 and 598 through the sub-assembler 611 and 613 originates in a circuit 614, shown in FIG. 5*o*. The circuit 614 comprises a pair of input AND gates 615 and 616 and an output OR gate 617. The not 1–2 timing signal is applied to the AND gate 615. The enabling 1–2 timing signal and STG 2 CY enabling signal are applied to the AND gate 616. Accordingly, at 1, 2 time of the second half of a storage cycle, the circuit 614 generates an enabling signal to gate address drive signals through the AND gates 610 and 612 to each of the address circuits 160 and 161.

The driver circuit 596 comprises a plurality of driver stages 613. Each of these stages comprise a plurality of input AND gates and a single output OR gate 620. The plurality of AND gates include the AND gate 612 and an additional plurality of AND gates 621 through 623 in each stage 613. Each of the AND gates 621 through 623 is the means for selecting a byte address signal for the Y address circuit 161 in each BOM 156 through 159. More specifically, the contents of the drivers 595 and 596 select an identically identified location in each of the BOM's 156 through 159.

The AND gate 621 in each of eight stages 613 is responsive to one of the possible combinations originating from a pair of decode circuits 625 and 627. There are actually four AND gates 625, each decoding one possible combination of the input signals applied thereto. The input signals applied to the AND gates 625 comprise the plus SDBO byte one bit two signal, the minus SDBO byte one bit two signals, the plus SDBO byte one bit three signal, and the minus SDBO byte one bit three signal. These signals are decoded by four AND gates 625. The output of the AND gates 625 are ANDED with the upper output, on a line 627*a*, of the circuit 627 in four AND gates 621. The output of the four AND gates 625 are ANDED with the lower output, on a line 627*b*, of the circuit 627 in the four remaining AND gates 621. The gating signal for the AND gates 621 is developed in a gating circuit 629. The gating circuit 629 identifies direct address forms F and G by a decode AND gate 630. The circuit 629 identifies direct form A by a decode AND gate 631. The AND gate 622 receives its gating signal from a gating circuit 632. The output from the circuit 632 identifies a B address form as shown in Table A. The Address indicia associated with the AND gate 622 is furnished by a decode circuit 634. Four AND gates 636 decode the plus SDBO byte one, bit three signal and the plus bit three of register 30 with the four possible combinations of ±L1 and ±L2, bits 1 and 2 of register 30 respectively. Four circuits 638 provide four additional decodes of the applied input signals. Each possible combination from the eight combinations from the circuit 634 is applied to a separate AND gate 622 and gated therethrough by the enabling signal from the circuit 632.

The AND gate 623 receives its enabling signal from a gating circuit 640. The enabling circuit 640 identifies an E address form, as shown in Table A. The input address indicia is provided by eight AND gates 642 which decode the eight possible combinations of the input signals.

The driver circuit 595 comprises a plurality of driver stages 611. Each of the stages comprises a plurality of input AND gates and an output OR gate 644. The plurality of input AND gates include the AND gate 610 and an additional plurality of AND gates 645, 646, and 647.

While the driver circuit 596 is responsive to the address indicia as listed under the MAJOR SUB-DIVISION portion of Table A, the driver circuit 595 is responsive to the address indicia as listed under the SECTOR portion of TABLE A.

An enabling circuit 648, shown in FIG. 5*k*, provides a gating signal to both the AND gate 645 and the AND gate 647. The circuit 648 comprises a pair of input AND ates 649 and 650 feeding an output OR gate 651. Although the OR gate 651 generates a two-phase output signal, the plus enabling signal on a line 652 is the only signal required for the hereinafter described gating function. The AND gate 649 is furnished a plurality of input signals, the first of which is the 1/2 timing signal and the second of which is the not STORAGE 2 CYCLE enabling signal. The AND gate 650 is furnished a plurality of input signals, the first of which is the 1/2 timing signal, the second of which is the plus SDBO byte 0, bit 0 input signal, the third of which is the plus SDBO byte 0, bit 1 input signal, and the fourth of which is the minus SDBO byte 0, bit 2 input signal. The SDBO signals identify a BRANCH and LINK type control word or a WORD MOVE type control word. When the input conditions to both of the AND gates are satisfied, an enabling signal on the lower (not shown) output line of the OR gate 651 is available. When either of the input conditions to the AND gates is not satisfied, an enabling signal is available on the line 652.

The AND gate 645 receives both its address indicia and form enabling signals from a circuit 654. An AND gate 655 identifies a form A type of indirect addressing by a decode of the plus SDBO byte 1, bit 0 signal. An inspection of form A in Table A indicates that the address indicia originates from the P5, P6, or P7 storage positions of the register 28. A plurality of AND gates 656, only one of which is shown, provides three decodes of the P5 and P6 position. An AND gate 657 provides the remaining possible decode of these positions.

The AND gate 655 applies its output to an OR circuit 658 which generates two phase output signals, one of which is generated on its upper output line 659 and the second of which is generated on a lower output line 660. When the P7 bit is a one, an enabling signal is available on the lower output line 660. The line 660 is connected to four of the eight available AND gates 645. One of the output signals available from the AND gates 656 and 657 is applied to a different one of the same four AND gates. The four remaining AND gates 645 gate the four output signals from the AND gates 656 and 657 with the upper output signal from the OR gate 658 on the line 659.

An AND gate 661 identifies form F and G type indirect address forms by decoding the minus SDBO byte 1, bit 1 input signal and the minus SDBO byte 1, bit 2 input signal. The not selector share signal is an enabling signal indicating that a memory cycle is not being given to the selector channel.

The enabling signals from the OR gate 658 are combined with the decode of the P5 and P6 signals from the AND gates 656 and 657 to provide the SECTOR address indicia. Frames *h*, *i*, and *j* in Table A show the sources of the SECTOR address indicia. Frames *f* and *g* are available for expansion.

The AND gate 646 is used to enter sector address indicia during a WORD move operation or a BRANCH AND LINK operation. An AND gate 663 identifies these modes of operation as well as form A of the indirect address forms. An AND gate 664 provides a portion of the sector address indicia from the SDBO byte 1, plus and minus bits 5 and 6. There are four AND gates 664. The remaining third sector address bit indicia is combined with its form enabling signal to generate either of two phase output signals from an OR gate 665. Each output from the OR gate 665 is gated with the four outputs from the AND gates 664 to give the eight address bits.

An AND gate 666 identifies form E and also gates the L4 signal on a line 667. An AND gate 668 identifies forms F and G and gates the SDBO byte 1, bit 7 signal on a line 669. An AND gate 670 identifies the forms B and C and gates the L0 bit on a line 671. An AND gate 672 identifies form A and gates the SDBO byte 1, bit 7 signal on a line 673.

The AND gate 647 is the entry means for forms B, C, and E of the indirect address forms. A first enabling signal is generated by the circuit 648. The address indicia is principally furnished by four AND gates 675 which generate a decode of the plus and minus P1 and P2 bits. An AND gate 676 identifies form E and gates the L4 signal to an OR gate 677. Again, this OR gate 677 generates a pair of output enabling signals, each of which is gated with the four output signals from the AND gates 675. An AND gate 678 identifies forms B and C and gates the L0 signal, on a line 679, to the OR gate 677.

Figure 7:
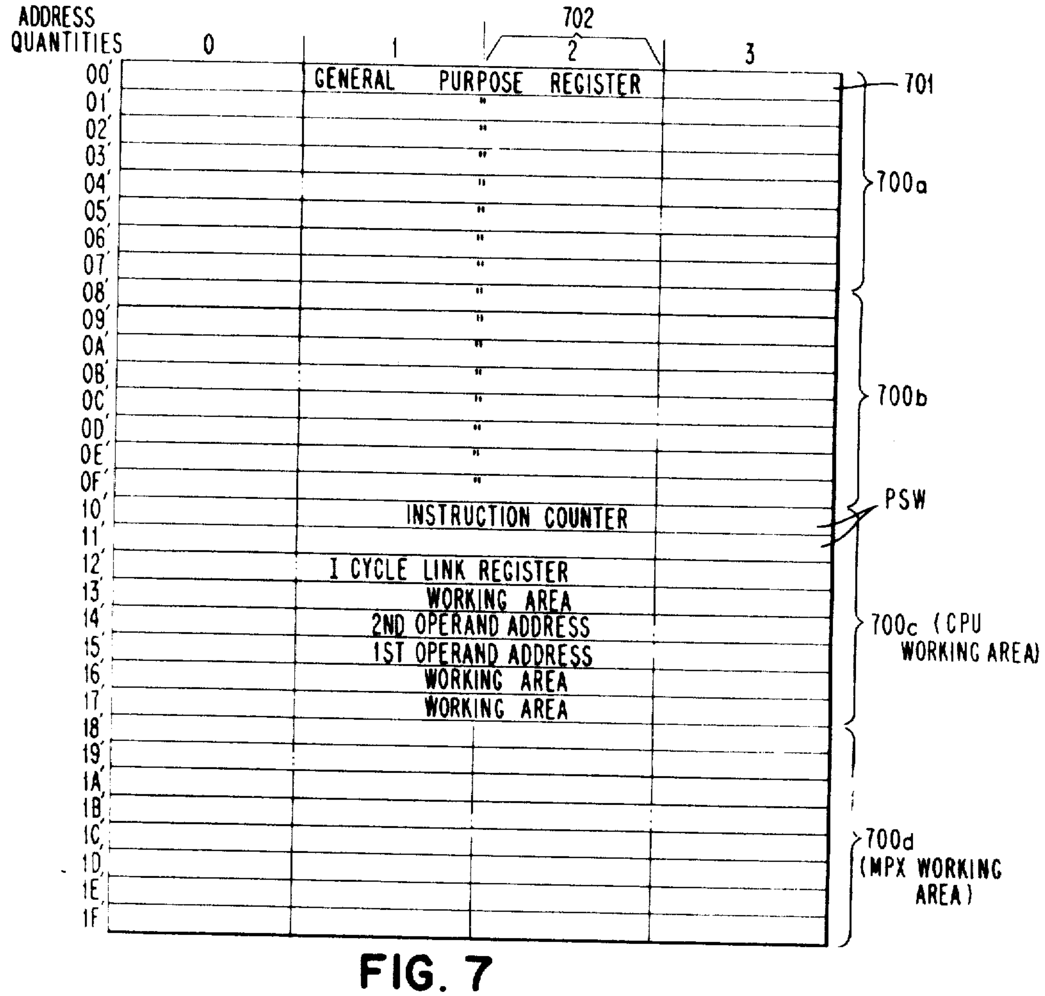
FIG. 7 shows certain function assignments for the active storage device shown in FIG. 1.

The indirect byte operating mode begins under a plurality of assumed conditions. The first such condition is that the machine has completed instruction cycles during which the instruction address has been updated and placed into its corresponding instruction register at address location 10' in the active storage circuit 17. A storage map of the active storage circuit 17 is shown in FIG. 7. Address locations in the active storage area 17 are identified by numbers raised to the prime to prevent confusion with similarly numbered circuits. The first operand address and the second operand address have been similarly constructed and placed into their respective locations 15' and 14' in local storage. Obviously, this is an op code which uses a first and a second operand. For purposes of this discussion, it is assumed that the present op code is an EXCLUSIVE OR op code and that the results are placed into the B SOURCE or first operand working area 16'.

Referring again to FIG. 7 there is shown a layout of the active storage circuit 17. Each of the addressable locations is given a permanently assigned storage function. This function may be absolutely permanent as to the information stored therein. For example, addressable location 14' always contains address information. In other locations such as 13', 16', or 17', the function may be permanent insofar as these locations are used as working areas, yet the information held therein is constantly changing as to format and appearance.

Figure 3F:
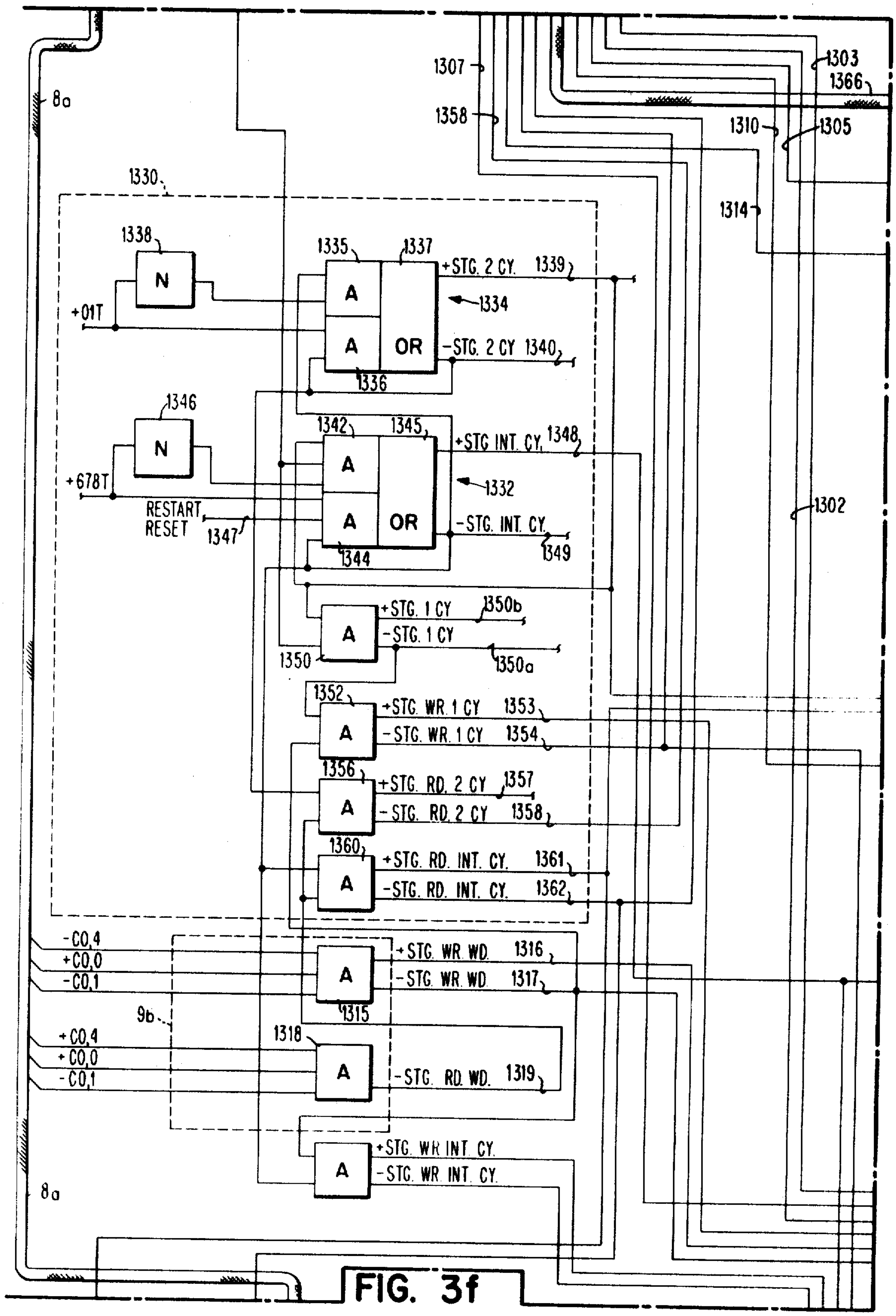
Figure 3G:
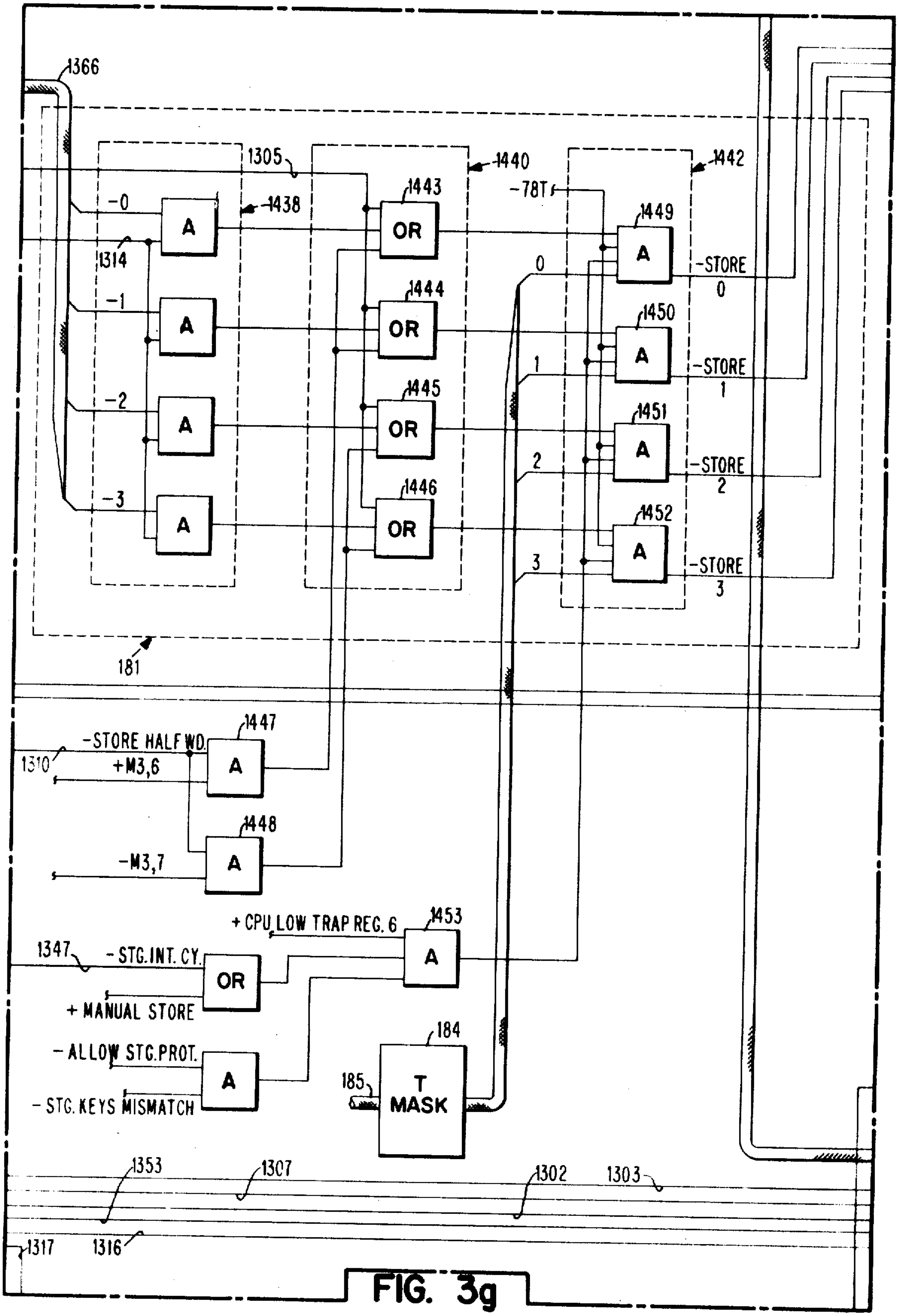
Figure 3H:
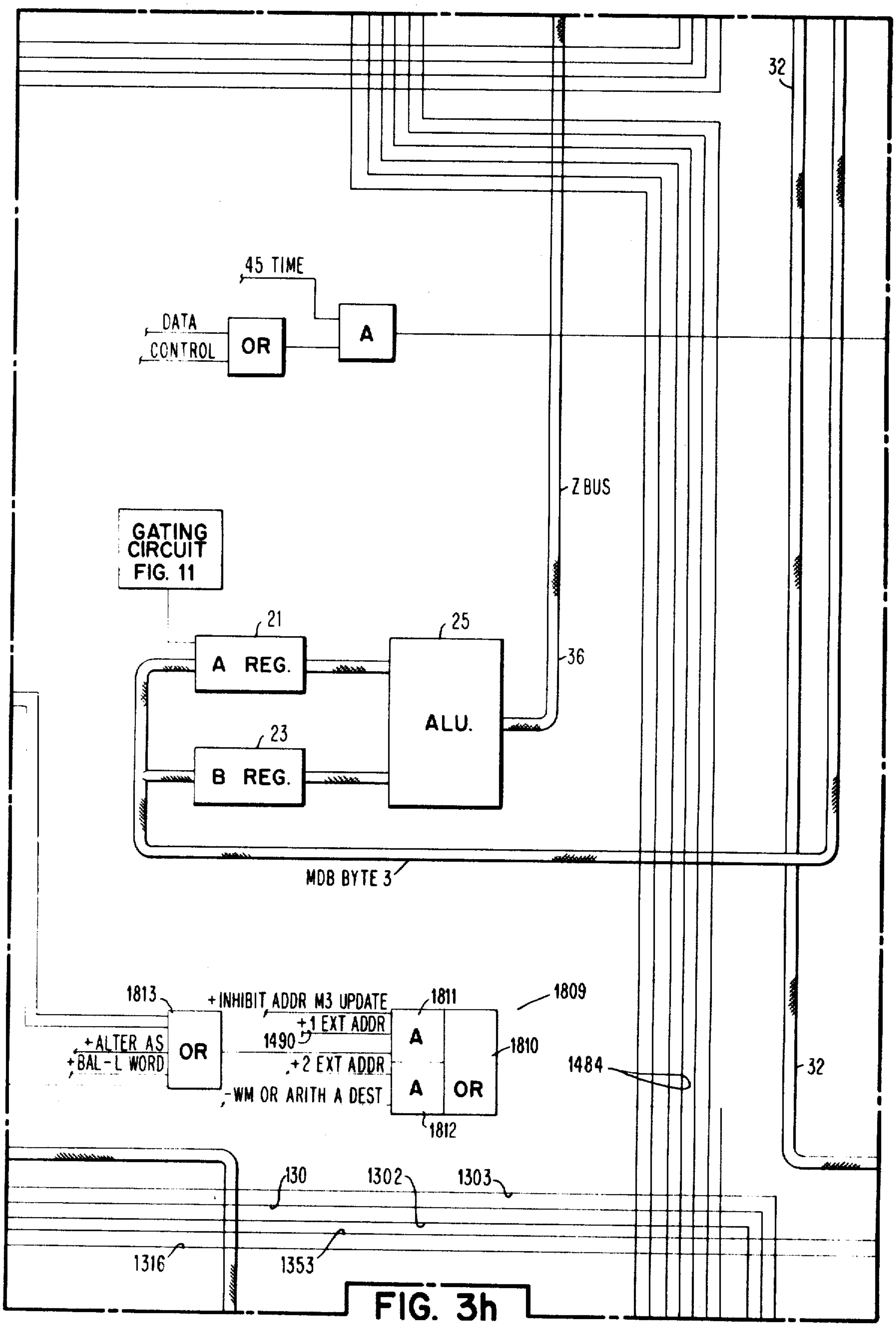
Figure 3J:
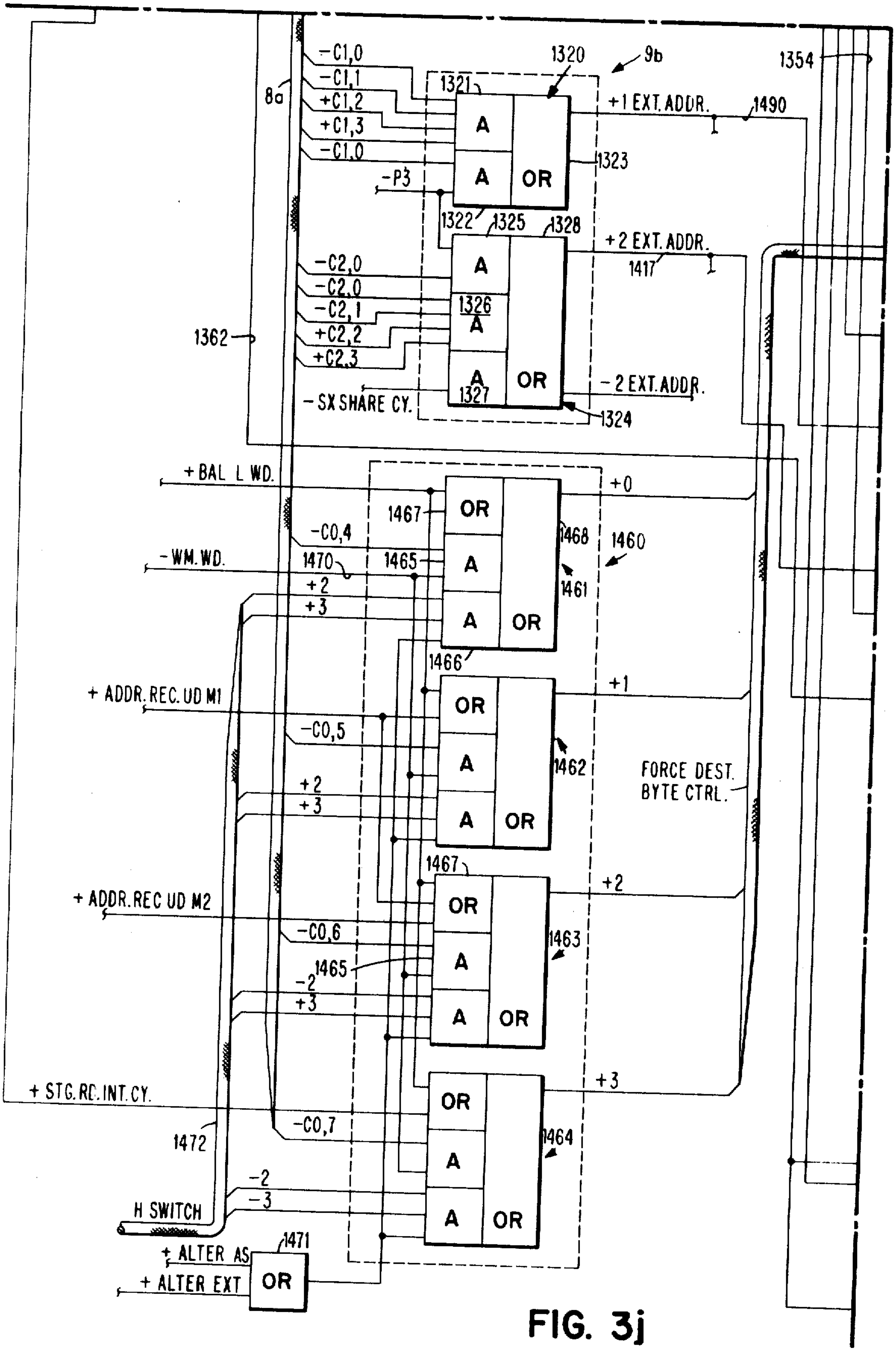
Figure 3K:
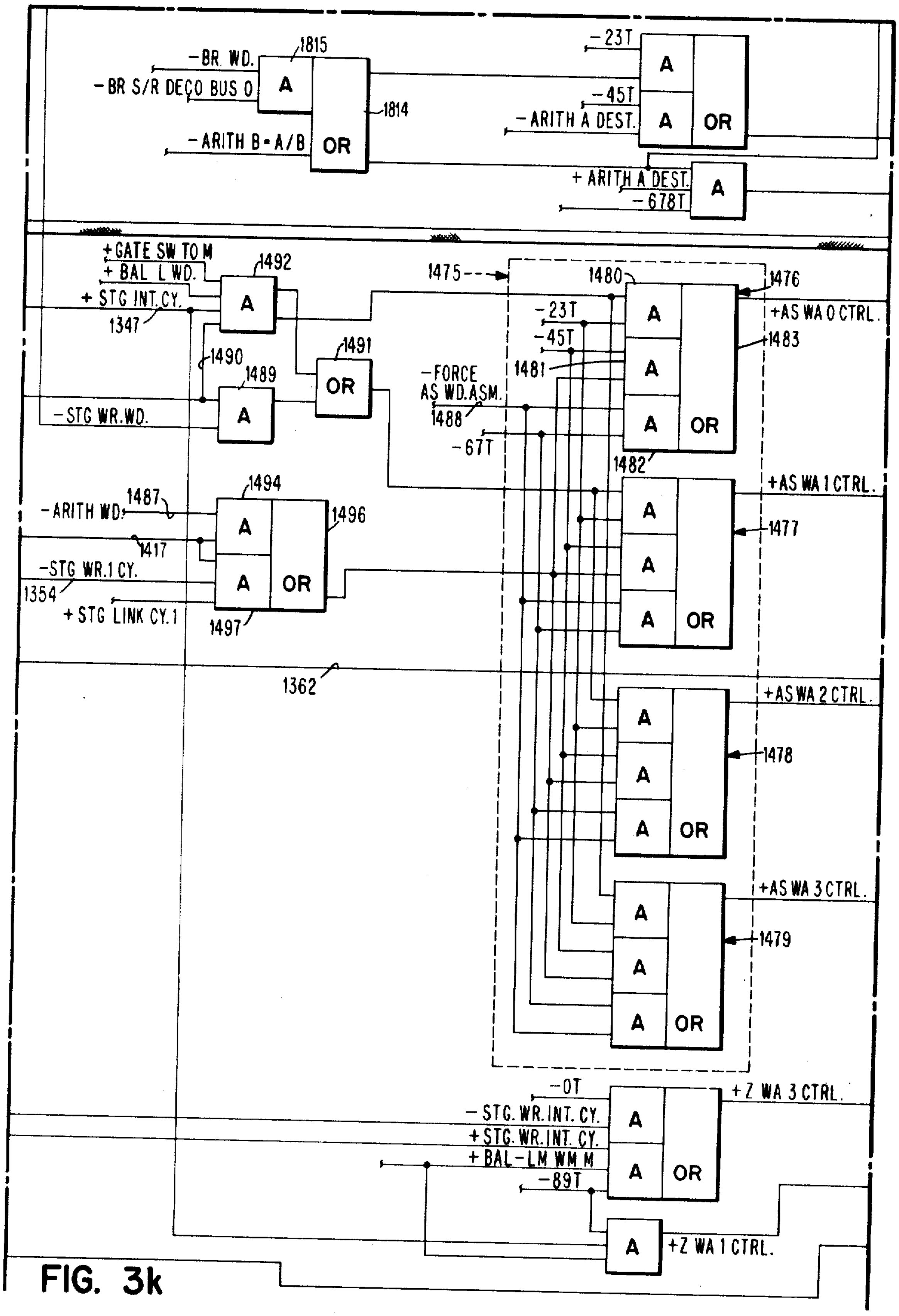
Figure 3M:
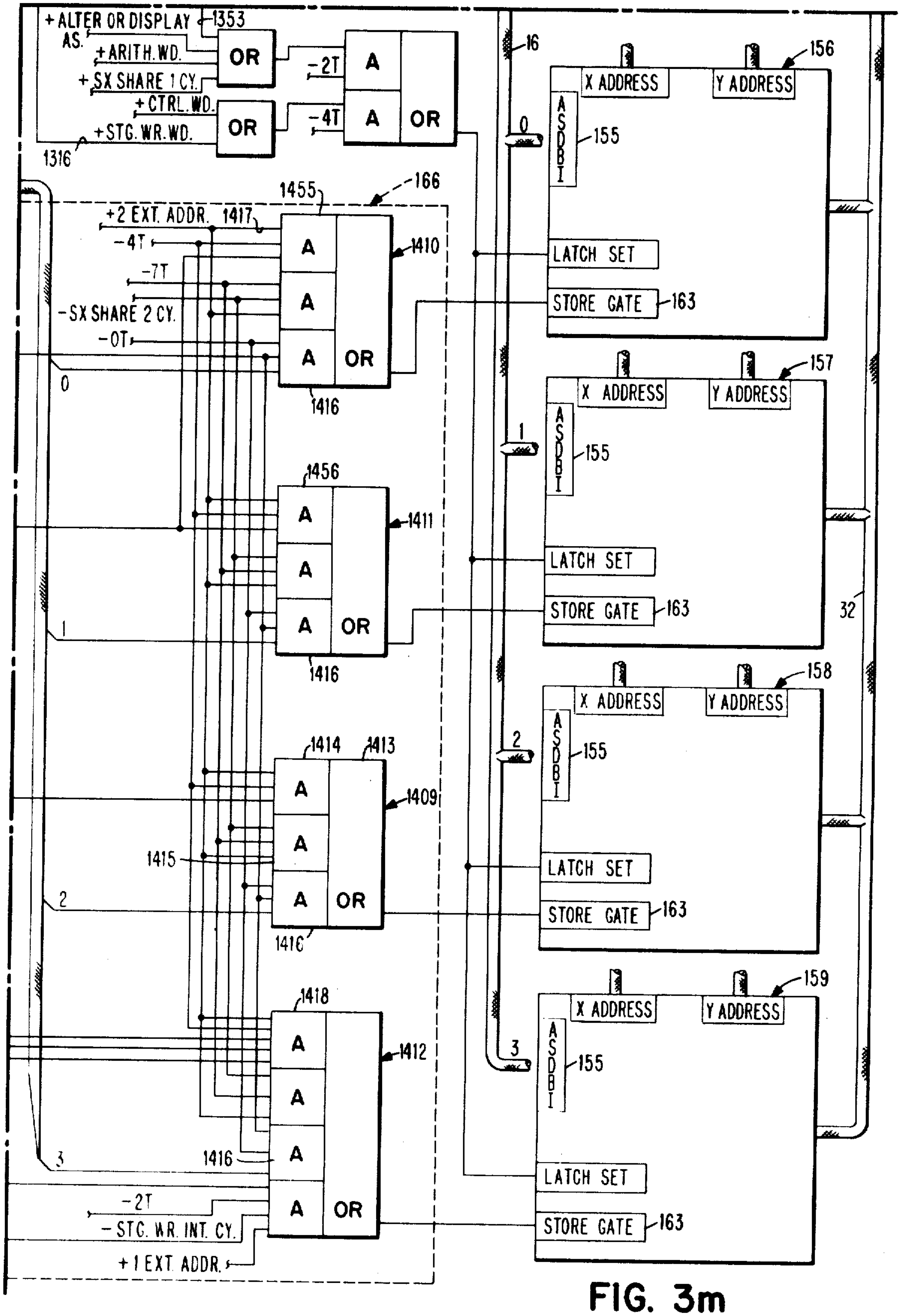

In response to the decoding of each op code and more specifically the decoding of the EXCLUSIVE OR op code, an address quantity is loaded into the register 28 by a control word over a bus 141 or by the MDB 16, as shown in FIG. 3*m*. This address quantity can in fact be divided into portions and each portion identifies a separate sector 700 of the active storage unit 17. The active storage unit employed in the instant invention comprises sixty-four major sub-divisions or words 701 and each major sub-division comprises four minor sub-divisions or bytes 702. The major sub-divisions are joined together to form a plurality of sectors, only four of which are shown, 700*a* through 700*d*, and it is this sector identifying indicia which is loaded into portions of the register 28.

The second register 30 is also loaded with address quantities by the MDB 16 which identify major sub-divisions within a sector. Minor sub-division address indicia is available from the immediate control word or from suitable portions of the circuit 19. A selection mechanism, 142 and 143, shown in FIGS. 5*k* and 5*o*, responsive to the immediate control word operates to select among the various sources of address indicia. A further variable which selects between available address indicia is the timing signals which identify the A SOURCE address indicia and the B SOURCE address indicia. More specifically, the further selection by the timing signals is directed to the simultaneous availability of distinct groups of address signals and the selection among the groups by a timing signal. Table A is a concise representation of the various address forms which address the active storage circuit 17.

Returning to a first mode of operation of the instant invention, the first task is to load address information into the registers 28 and 30. These registers are shown divided into equal portions, but this is not a limitation on the operation of the invention. Any other manner of division can be assigned. Although the immediate following example only employs the register 28, the loading paths for both registers are described.

Referring to line A of Table A, there is shown the first address form. The register 28 comprises eight binary bit positions and each position is identified as P0 through P7 respectively. Positions P4 through P7 are loaded with address indicia equal to a hexadecimal two 0010 to point to the sector 700*c* of addresses 1–0 through 1–7. Simultaneously, the high order portion of the register 28 can be loaded to hold separate address information. Referring to line B of Table A, positions P0 through P2 can be loaded with a binary zero (000) to point to the sectors 700*a* and 700*b* having addresses 0–0 through 0–7 and 0–8 through 0–F respectively. In those situations where less than a full hexadecimal address is generated, the high order portion is reset to a zero because of the set/reset of the address register stages occurring just prior to the addressing of active storage 17. The P3 bit is used as an enabling signal which identifies, along with portions of the registers 252 and 253 which mode of indirect addressing is to be executed.

Referring to lines C and E of Table A, the use of the register 30 is demonstrated. The register 30 comprises eight binary bit positions identified as L0 through L7. The use of the high order three P bits to select two contiguous sectors has been explained. The L bits are employed to identify a major sub-division within the selected sector. Again the register 30 is loaded with a pair of hexadecimal digits, a first digit including L0, L1, L2, and L3 identify a first major sub-division while a second digit including L4, L5, L6, and L7 identify a second major sub-division. A further variation can be seen in lines B and C wherein the L3 bit is further modified by "ORing" or combining it with a further bit from the decode register 9*a*.

The register 19 comprises eight binary bit positions identified as T0 through T7. Only a portion of this register participates in the addressing modes. More specifically, bits T4 and T5 together are used in one type of addressing and this type is further identified as concerned with A SOURCE addressing. Bits T6 and T7 together are used in a second type of addressing and this type is further identified as concerned with B SOURCE addressing.

Figure 8A:
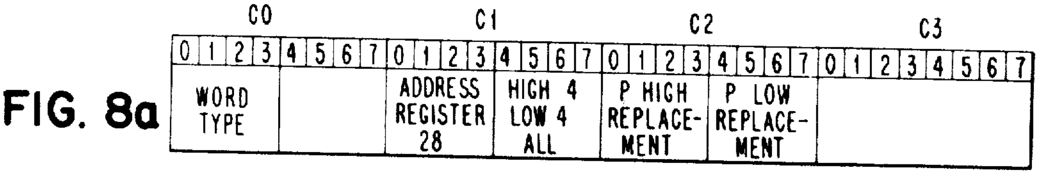
FIGS. 8*a* through 8*c* show certain control word formats suitable for use in the instant invention.

The register 28 is loaded by the constant (K) field of a CONTROL WORD appearing on the bus 141. More specifically, this CONTROL WORD is of the type known as a BRANCH AND LINK word and the format of this word is shown in FIG. 8*a*. The contents of this K field are loaded one bit per AND gate 551, shown in FIG. 5*m*, into the latched OR circuits 553 by an enabling signal originating in a gating circuit 555. The register 30 is loaded from the MDB 16, byte three, bits 0–7, through the AND gates 566 and the enabling signal originating from a gating circuit 568. The actual input signals to the circuits 555 and 568 are not a limitation on the present invention since they, as well as most other identification signals, would differ and be dictated by the design of the system. It should be sufficient, that in response to the decoding of an op code by the decode circuit 9*b*, a predetermined storage word is read from the control storage portion 4 of main memory 2 from which a K field portion is loaded into the registers 28 and 30 as the op code requires. Normally, separate control words load the registers 28 and 30 because the K field is only eight bits in capacity, equalling the storage capacity of one of the registers 28 or 30.

Figure 8B:
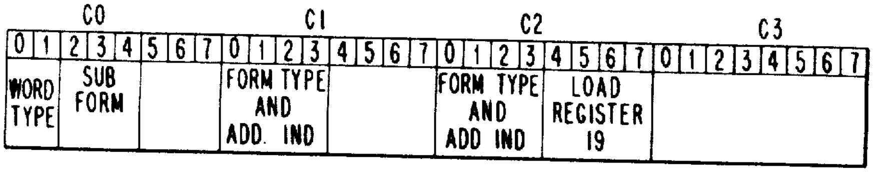

The contents of location 14' in the active storage circuit 17 are transferred to the register 40 over the following path shown in FIG. 2. The ASBO 164 provides the exit from active storage 17. The address then proceeds over the bus 91, through the assemblers 12 and 14 onto the MDB 16. The MDB 16 is an input to the sub-assemblers 130 and 131 which in turn form an input to the register 40. A suitable storage control word is shown in FIG. 8*b* for controlling this operation. This storage word is identified by the bit 0 and 1 positions of the CO byte. The sub-form of the word is identified by the bits 2, 3, and 4 of the same byte. The next significant data is located in the C1 byte bit positions 0 through 3. By inspection of Table A, form A, frame *a*, the bit located therein must be a zero to gate the address of frames *f* through *o* to their respective circuits. The gating is performed by the AND gates 631 and 655 in the fast path assemblers 142 and 143 shown in FIG. 5*k* and 5*o*. These AND gates gate the P5, P6, P7 bits and the C1 byte, bits 1, 2, and 3 to the driver circuits 595 and 596 respectively.

During the first portion of a Storage Word Cycle, two important functions are performed. Means are provided for immediately decoding by the fast path circuits 142 and 143 control word read from the control storage circuit 4. This is accomplished by decoding from the output of the assembler 8 rather than waiting until the same information is latched up in the decode circuit 9*b*. Means are provided for decoding the relative address indicia for accessing the predetermined location 15′ in the active storage circuit 17 and transferring the first operand address indicia to the register 40.

Means are provided for using the contents of the register 40 to address main store and interrogate the word located therein and place it into the assembler 8.

Means are also provided for taking the contents of the storage data bus out of the assembler on the bus 67 and placing it into an active storage location 16′ as directed by the contents of the P4, P5, P6 bits and the C2 byte, bits 1, 2, and 3.

The identification of the address type as form A from Table A and its resulting gating of the P4, P5, and P6 bits and the C1 byte, bits 1, 2, and 3 is performed by decode circuits 142 and 143 shown in FIGS. 3*k* and 3*o*. A plurality of standard decoding techniques can be employed for using the P4, P5, and P6 bits to identify a sector 700*c* and for using the C1 byte, bits 1, 2, and 3 of the current Storage Control Word to identify a major sub-division in that sector.

Each byte is read from a respective BOM 156 through 159 and placed on the bus 91. Suitable gating is accomplished in the assemblers 12 and 14 to route bytes 1, 2, and 3, of the second operand address into units 125, 126, and 127 of the register 40. The units 125, 136, and 127 together comprise a plurality of address bits.

A predetermined group of low order bits are not employed for accessing main memory. The remaining address bits are sufficient for accessing a unit of information while the low order bits are transferred to respective locations in the register 19 for use subsequently for addressing sub-units of the information read from main memory. In the present embodiment, the two low order address bits are transferred to storage units 288 and 289 over bus 296 and AND gates 298 and 300. The unit or word of information addressed by the remaining portion of the register is transferred to the first operand working area 16′ in storage 17.

During the second half of the storage control cycle, two major functions are performed. Means are provided for storing the data just interrogated from the main storage device 2 into a predetermined location 16′ in the active storage circuit 17. Secondly, the two low order bits, 6 and 7, of unit 127 of the register 40 are set into their respective locations 288 and 289 of the register 19. The selection and storage into location 16′ is controlled by the C2 byte, bits 0–3 of the current STORAGE word. The selection of the C2 byte information is made by a circuit 710, shown in FIG. 5*i*, having an input AND gate 711 active. An AND gate 712 is now equipped with an enabling 1/2 time timing signal and an enabling not selector share signal. The AND gate 712 being active provides an input to the OR gate 588 for gating the C2 byte onto the bus 140. The output of the assembler 710 acts to apply bit 0 to an AND gate 714*a* to generate a further gating signal and the bits 1 and 2 to an AND gate 714*b*. Bit 3 is applied to an AND gate 715 shown in FIG. 5*n*. These bits identify the selected form as well as provide the major sub-division address as shown in forms A, F, G, and H. The AND gates 714*a* and 714*b* form inputs to an OR gate 716. The OR gate has an enabling signal on its upper output line 590 when neither of its input conditions are satisfied. The OR gate generates an enabling signal on its lower output line 591 when either of its input conditions are satisfied. The enabling signal on the line 591 provides the gating signal to identify indirect address forms A, F, and G. The enabling signal on the line 590 provides the gating signal to identify indirect address forms B, C, and E. The logic in the first stage 574 operates in a similar manner described for the fast paths 142 and 143 to decode the various input signals from the registers 28, 30, and 9*a*.

The address thus formed in the first stage 574 is decoded by the decode circuits 592 and 593 and selects location 16′ in the active storage circuit 17. The word available on the MDB 16 is stored in the location specified by the decode circuits 592 and 593.

The loading of positions 288 and 289 is controlled by the C2 byte, bits 4–7. The AND gate 306 shown in FIG. 3*a* decodes the corresponding field C2, bits 4, 6, and 7 and generates an enabling signal for activating the AND gate 322, which in turn enables the AND gates 298 and 300 in the storage positions 288 and 289 to gate the low order address bits in these storage locations. Simultaneously, the OR gate 308, and AND gate 312 produces a disabling input signal at the AND gates 502 in each position 282 through 285 thereby causing a reset to the binary zero condition of these positions.

The next sequential Storage Control Word again employes form A in the C1 and C2 byte positions in the manner as previously described with reference to the handling of the retrieving of the field of the first operand. The operation of the current control word is identical with that just described. More specifically, a current control word accesses the second operand location 14′ in the active storage 17, reads out the address indicia located therein for transfer to the register 40. Using the contents of the register 40, the main storage circuit 2 is accessed and the first field of the second operand is placed on the main data bus 16 after gating through the various assemblers. Now using the C2 byte, bits 0–3, the active store is accessed and the contents of the main data bus are written into working area 17′. Simultaneously with the storing of the data bus contents into active storage location 17′, the control indicia located in C2 byte, bits 4–7 now load the information from the bit 6 and 7 storage positions of the register 40 into storage locations 286 and 287 of the register 19. The AND gate 302 decodes the corresponding field of the C2 byte, bits 4, 6, and 7, and generates an enabling signal on the line 320 for application to the AND gate 318. The output of the AND gate 318 gates the contents of the AND gates 298 and 300 into the positions 286 and 287 of the register 19.

In review, the two fields which enter into the exclusive OR operation are now set up in working areas 16′ and 17′ of the active storage circuit 17. When these fields are retrieved from main storage, they are retrieved a unit at a time. No distinction is made between the beginning of one field and the ending of a contiguous field. More specifically, the data in either or both of the fields which participates in the present or both of the fields which participates in the present exclusive OR operation may begin at any subunit of the unit of information transferred from main storage 2. The contents of the register 19 specifies the subunit of information at which the exclusive OR operation is to be performed on both the first operand and the second operand words. This information is generated during instruction cycles and placed into the first operand and second operand locations 15′ and 14′ respectively and is transferred to the register 19 from the register 40. Accordingly, the arithmetic operation performing the exclusive OR operation indirectly addresses the sub-unit of each operand which participates in the exclusive OR function.

Referring to Table A, forms F and G, there is shown direct word indirect byte address form advantageously employed for use with working areas 16′ and 17′ specifically. Address form F corresponds to location 16′ and address form G corresponds to location 17′. Referring to frames *n* and *o* of forms F and G, it is observed that T4, T5, or T6, and T7 perform the sub-unit or byte selection of the fields participating in the exclusive OR function.

Figure 8C:
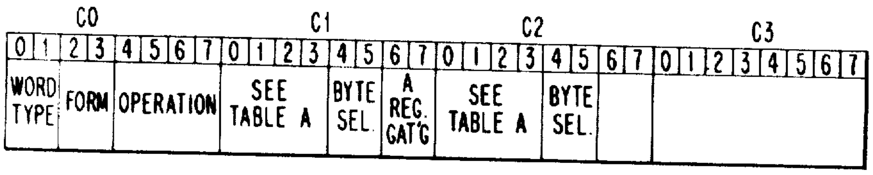

The arithmetic control word is of the type shown in FIG. 8*c*. The access of the active storage location 16′ is begun by a decode of the byte C1 position of the arithmetic word and the identification of the form F address form. The first access and the loading of the B register 23 is accomplished by the fast path gating circuits 142 and 143 previously described wherein the P5, P6, P7 positions of the P register and the C1 byte, bits 1, 2, and 3 address local store, read out the full word contained in location 16'. This word is transferred by the bus 91 to the unit assembler 12. Appropriate gating signals are available on the bus 98 for gating the selected sub-unit or byte of information to the B register 23. During the second half of the arithmetic cycle the slow path gating circuit is used to develop the address of the location 17'.

A second often-encountered machine operation is now employed to illustrate additional combinations of the instant invention for addressing major sub-divisions and minor sub-divisions in the active storage circuit 17. A MOVE OP is commonly encountered in a data processing system wherein the contents of one register is moved into another register. The registers participating in the transfer are identified. One is interrogated and its contents are transferred to the remaining register. The transfer path is immaterial to the present invention as it is primarily concerned with an improved mechanism for addressing the two registers.

During INSTRUCTION CYCLES concerning a MOVE OP, operand addresses are not generated since there is no access to the main storage circuit 2. In substitution thereof, the addresses or other identifying indicia of the two registers involved in the MOVE OP are placed in the register 30 by the main data bus 16. As an alternative to address indicia for identifying the participating registers, register numbers can be employed. More specifically, most data processing systems employ a plurality of general-purpose registers. For example, in a data processing system employing sixteen general-purpose registers, these registers are number zero to F (0000 to 1111) in hexadecimal notation. These registers are shown in sections **700*a* and 700*b* in FIG. 7. Using a BRANCH and LINK control word as mentioned earlier, the register 28 is loaded with a 000 in positions P0, P1, and P2 over the bus 141 and the AND gates 551**.

The next control word is an arithmetic control word of the type shown in FIG. 8*c*. The C1 byte of this arithmetic control word is decoded into a FORM E address form as shown in Table A. As in all other control words which occur, the first access to active storage circuit 17 is made through the fast path circuits 142 and 143. A decoding of the C1 byte by circuits 640 and 676 shown in FIGS. 5*k* and 5*o* provide the enabling inputs to the Y drivers 596 and the X drivers 595. An inspection of form E in Table A indicates that the first group comprising P1, P2, and L4 select the sector while the second group L5, L6, and L7 select the major sub-division within that sector. The first group is decoded by the circuit 675 and the AND/OR circuit 676 and 677. The second group is decoded by the AND gates 642.

In the selected MOVE OP code, the contents of the register addressed by the fast path circuits 142 and 143 are moved one sub-unit at a time. This step is followed since the transfer path includes the ALU 25 which is only one sub-unit in capacity. Byte selection is completely described in the previously mentioned K. A. Bell application.

In the second half of the arithmetic timing cycle indirect address, form B identifying indicia is contained in the C2 byte. The enabling or form recognition signals are generated by the AND gates 632 and 678. The L1, L2, and L3 address indicia are decoded by the circuits 636 and 638. The P1, P2, and L0 address indicia are decoded by the AND gates 675 and 678.

This last-mentioned address indicia select the register into which the data is to be moved. The ALU is activated to ADD zero to the contents of B. The output of the ALU is placed on the bus 36. Byte selection is employed to move one byte to its selection destination. An additional three arithmetic control words are performed to move the remaining three bytes of data into the desired register.

Referring to FIG. 3*a*, there can be seen the amplification of the decode circuit **9*b*** shown with reference to FIG. 1. The pertinent decode circuits, specifically those which operate in conjunction with the remaining circuitry to perform the claimed functions, are shown in FIG. 3*a* as **9*b*. The decode circuits shown in 9*b* receive their input signals directly from the storage assembler 8 over the storage assembler bus out 8*a*. The signals contained on the bus out 8*a* are described with reference to a single control word being currently read out from control memory 5 on the 32 bit bus 8*a*. The bytes are identified as the C0, C1, C2, and C3 bytes and each byte comprises eight data bits, bit 0 through bit 7. Accordingly, the third bit in byte 0 is identified as C0, 3. If the output bit is at a negative level as an enabling signal, it is represented as a minus C0 signal. If it is at a positive level as an enabling signal, it is shown as a plus C0. Accordingly, a first decode circuit 1300 is shown having a plurality of input signals, the first of which is the minus C0, bit 1 input signal, and the second of which is the plus C0, bit 0 input signal. The output from the decode circuit 1300** indicates that the current control word being executed is a storage word. This enabling signal is employed to gate the remaining decode circuits to respond to their respective signals.

An AND gate 1301 is shown equipped with a plurality of input signals, the first of which is the output from the decode circuit 1300, the second of which is the plus C0, bit 2 input signal, the third of which is the plus C0, bit 3 input signal, and the fourth of which is the plus C0, bit 4 input signal. The output signals from the AND gate 1301 are of two phases. The plus READ FULL WORD output signal on a line 1302 indicates that the input decode conditions are not available and accordingly, this is not a read full word condition. The enabling signal on a line 1303 is a minus READ FULL WORD signal and indicates that the input conditions to the AND gate 1301 are satisfied and this is a read full word condition. An AND gate 1304 is shown having a plurality of input signals, the first of which is the output from the decode circuit 1300, the second of which is the plus C0, bit 2 input signal, the third of which is the plus C0, bit 3 input signal, and the fourth of which is the minus C0, bit 4 input signal. The output from the AND gate 1304 on a line 1305 indicates that this is a STORE FULL WORD situation whereby four bytes from one of the plurality of input sources is stored into the designated location in the main memory 2.

An additional decode circuit 1306 is shown having a plurality of input signals, the first of which is the output of the decode circuit 1300, the second of which is the plus C0, bit 2 signal, the third of which is the minus C0, bit 3 input signal, and the fourth of which is the plus C0, bit 4 input signal. The output signals from the AND gate 1306 are a two-phase output signal. The NOT READ HALF WORD condition is indicated by an enabling signal on a line 1307 and a READ HALF WORD enabling situation is indicated by an enabling signal on a line 1308. The enabling signal on the line 1308 indicates that a half word of information within the main transfer circuit 11 is selectively switched so that the half word of information is available to the main data bus 16 for storage into a pre-designated location. An additional decode circuit 1309 is shown having a plurality of input signals, the first of which is the output of the decode circuit 1300, the second of which is the plus C0, bit 2 input signal, the third of which is the minus C0, bit 3 input signal, and the fourth of which is the minus C0, bit 4 input signal. The output from the circuit 1309 is the STORE HALF WORD enabling signal and it is available on a line 1310. This signal indicates that a half word of information is stored into the main memory location 2. A further decode circuit 1311 is shown with a plurality of input signals, the first of which is the output from the AND gate 1300, the second of which is the minus C0, bit 2 input signal, the third of which is the plus C0, bit 3 input signal, and the fourth of which is a plus C0, bit 4 input signal. The output from the decode circuit 1311 is the READ BYTE enabling signal and it is available on a line 1312. This signal indicates that one byte of information from the identified address source is to be selectively switched through the transfer circuit 11 and made available on bus 16. A further decode circuit 1313 is shown having a plurality of input signals, the first of which is the output from the decode circuit 1300, the second of which is the minus C0, bit 2 input signal, the third of which is the plus C0, bit 3 input signal, and the fourth of which is a minus C0, bit 4 input signal. The output from the circuit 1313 is the STORE BYTE enabling signal and it is available on a line 1314. This signal indicates that the identified byte of information is stored in its addressed location in one of the available data storage areas.

A further decode circuit 1315, shown in FIG. 3*f*, is shown equipped with a plurality of input signals, the first of which is the minus C0, bit 4 input signal, the second of which is the plus C0, bit 0 input signal, and the third of which is the minus C0, bit 1 input signal. The output from the decode circuit 1315 is a two-phase output signal. The first signal is a not STORAGE WRITE enabling signal and it is available on a line 1316. The STORAGE WRITE enabling signal is available on a line 1317. An enabling signal on the line 1316 indicates that the input conditions to the decode circuit 1315 are not available and that the current word is not a storage write word. An enabling signal on the line 1317 indicates that the input conditions to the decode circuit 1315 are satisfied and that it is a storage write word. A further decode circuit 1318 is equipped with a plurality of input signals, the first of which is the plus C0, bit 4 input signal, the second of which is a plus C0, bit 0 input signal, and the third of which is the minus C0, bit 1 input signal. The output signal from the decode circuit 1318 is the STORAGE READ enabling signal and it is available on a line 1319. This signal indicates that the current control word is a storage read word. A further decode circuit 1320, shown in FIG. 3*j*, comprises a pair of input AND gates 1321 and 1322 and an OR gate 1323 responsive to the input AND gates. The AND gate 1321 is equipped with a plurality of input signals, the first of which is the minus C1, bit 0 input signal, the second of which is a minus C1, bit 1 input signal, the third of which is a plus C1, bit 2 input signal, and the fourth of which is the plus C1, bit 3 input signal. The AND gate 1322 has a plurality of input signals, the first of which is the minus C1, bit 0 input signal, and the second of which is the minus P3 input signal. The P3 input signal originates in FIG. 5*m*. The output from the decode circuit 1320 indicates that the word address being decoded from the byte C1 of the current control word on bus 8*a* is not the word address of an external register and therefore must be the word address of a word in active storage 17.

An additional decode circuit 1324 comprises a plurality of input AND gates 1325, 1326, and 1327. The outputs from the immediately before-mentioned AND gates are applied to an OR gate 1328. The AND gate 1325 is equipped with a plurality of input signals, the first of which is the minus P3 input signal, and the second of which is the minus C2, bit 0 input signal. The AND gate 1326 is equipped with a plurality of input signals, the first of which is the minus C2, bit 0 input signal, the second of which is the minus C2, bit 1 input signal, the third of which is the plus C2, bit 2 input signal, and the fourth of which is the plus C2, bit 3 input signal. The AND gate 1327 is equipped with a single input signal; namely, the minus SELECTOR SHARE enabling signal. The output signals from the OR gate 1328 are of two phases. The plus 2 EXTERNAL ADDRESS signal which indicates that the word address being decoded from byte C2 of the current control word on bus 8*a* is not the word address of an external register and therefore must be the word address of a word in active storage 17. The minus 2 EXTERNAL ADDRESS signal indicates that the word address being decoded from byte C2 is an external register address.

A cycle timing circuit 1330, shown in FIG. 3*f*, is employed to divide up a storage cycle into a plurality of portions during which the pertinent operations are performed. The circuit 1330 comprises an interlock latch 1332 and a storage latch 1334. The storage latch 1334 comprises a pair of input AND gates 1335 and 1336 and an output OR gate 1337. The AND gate 1335 is equipped with a plurality of input signals, the first of which is the output of an inverter 1338 and the second of which is the minus STORAGE INTERLOCK CYCLE signal from the interlock latch 1332. The AND gate 1336 is equipped with a plurality of input signals, the first of which is the 0/1 time timing signal from the clock circuit and the second of which is the latch back output minus STORAGE TWO CYCLE of the OR gate 1337. The 0/1 time timing signal is also applied as the input to the inverter 1338. The output of the storage latch 1334 comprises a plus STORAGE TWO CYCLE signal on a line 1339 and a minus STORAGE TWO CYCLE signal on a line 1340. The OR gate 1337 is a two-phase output device which generates two output signals of opposite phase. The plus enabling signal on the line 1339 indicates that the input requirements to latch 1334 are not available and that it is not a storage 2 cycle portion of a storage word operation. The minus enabling signal on the line 1340 indicates that it is a storage 2 cycle portion of the storage word operation.

Figure 9:
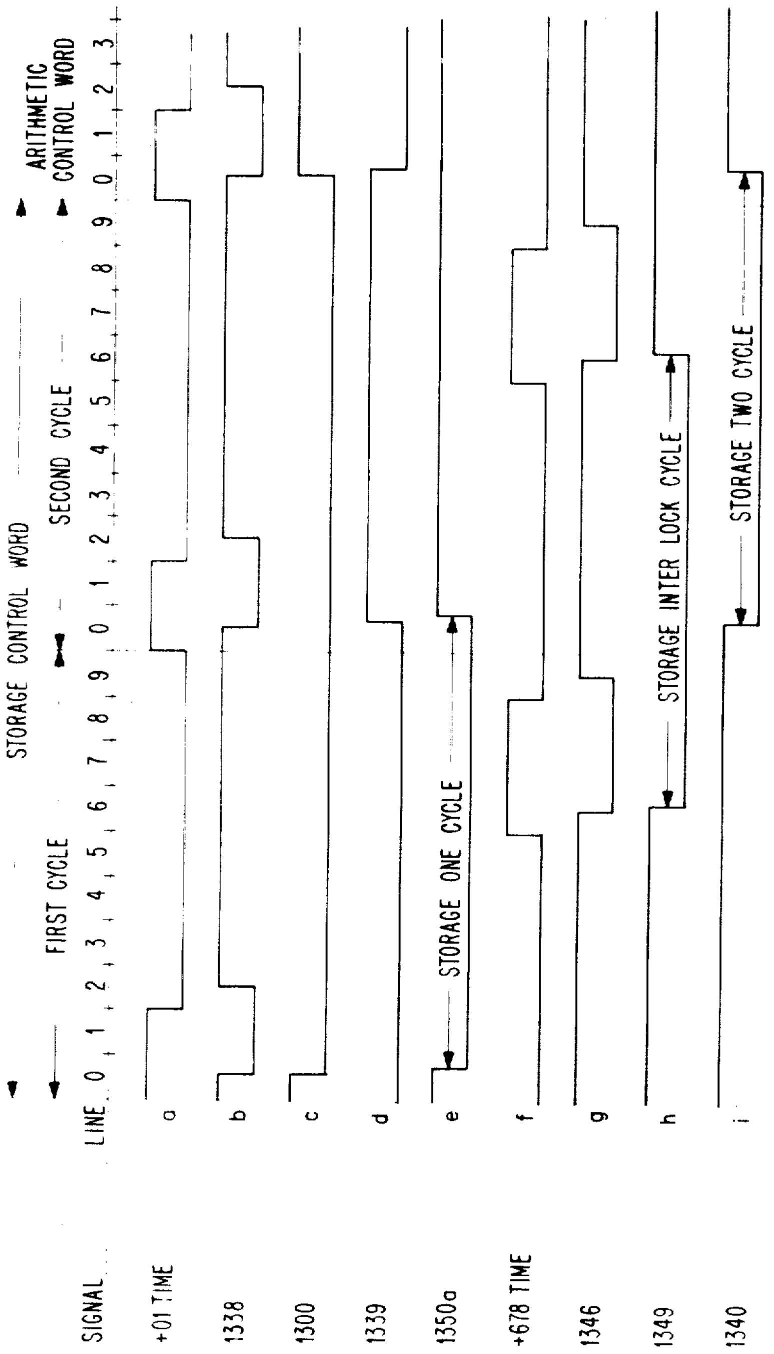
FIGS. 9 shows a storage word timing diagram.

The interlock latch 1332 comprises a plurality of input AND gates 1342 and 1344. The output from the AND gates 1342 and 1344 is applied to an OR gate 1345. The AND gate 1342 is equipped with a plurality of input signals, the first of which is the plus STORAGE TWO CYCLE signal on the line 1339, the second of which is the output of the decode circuit 1300, and the third of which is the output from an inverter 1346. The AND gate 1344 is equipped with a plurality of input signals, the first of which is the 6/7/8 time timing signal from the clock and the second of which is the latch back minus STORAGE INTERLOCK CYCLE signal of the OR gate 1345. The RESTART-RESET enabling signal is applied to the AND gate 1344 by the line 1347. The 6/7/8 time timing signal is also applied as an input to the inverter 1346. The OR gate 1345 is also a two-phase output device. The plus STORAGE INTERLOCK CYCLE signal is available on a line 1348 and the minus STORAGE INTERLOCK CYCLE signal is available on a line 1349. The enabling signal on the line 1348 indicates that it is not a storage interlock cycle portion and the enabling signal on the line 1349 indicates that it is a storage interlock cycle portion of the current storage word. FIG. 9 shows a breakdown of the various portions of a storage word. It shows the storage one cycle signal and the storage 2 cycle signal and the storage interlock portion overlapping both of the storage 1 and storage 2 portions of the storage word. An AND gate 1350 is the means for generating the storage 1 cycle portion. The AND gate 1350 is equipped with a plurality of input signals, the first of which is the plus STORAGE TWO CYCLE enabling signal on a line 1339, and the second of which is the output from the decode circuit 1300. The minus STORAGE ONE CYCLE enabling output signal from the AND gate 1350 is applied to an AND gate 1352. A second input signal to the AND gate 1352 is the minus STORAGE WRITE WORD enabling signal on the line 1317. The AND gate 1352 is a two-phase output device. A plus STORAGE WRITE ONE CYCLE signal is available on a line 1353 and a minus STORAGE WRITE ONE CYCLE enabling signal is available on a line 1354. A further decode circuit 1356 is shown having a plurality of input signals, the first of which is the minus STORAGE TWO CYCLE enabling signal on the line 1340, and the second of which is the minus STORAGE READ WORD enabling signal on the line 1319. The AND gate 1356 is employed to indicate the second portion of a storage read word. The plus STORAGE READ TWO CYCLE enabling signal is available on a line 1357 and the minus STORAGE READ TWO CYCLE enabling signal is available on a line 1358. A further decode circuit 1360 is shown having a plurality of input signals, the first of which is the minus STORAGE INTERLOCK CYCLE signal on the line 1349 from the interlock circuit 1332, and the second of which is the minus STORAGE READ WORD enabling signal output from the AND gate 1318. The AND gate 1360 is equipped with a two-phase output signal. A plus STORAGE READ INTERLOCK CYCLE enabling signal is available on a line 1361 and the minus STORAGE READ INTERLOCK CYCLE signal is available on a line 1362.

The operation of the latches 1332 and 1334 will now be described.

The transistorized logic circuits used in the present invention may be described by referring to FIG. 10. FIG. 10*a* shows a typical AND gate circuit representation. The line designated —in phase output is at a negative voltage level indicated by the minus sign when input 1 and input 2 and input 3 and input 4 are all at a negative voltage level as indicated by the minus signs in front of these various input signals. The term "in phase" means that the output signal is of the same voltage level as the input signals when the specified logical function is satisfied. The in phase output signal is usually drawn from the lower right hand side of the box representing the circuit. An output of phase signal may also be obtained from the circuits used in the present invention and this is usually drawn from the upper right hand side of the box representing the circuit. The term "out of phase" means that the output signal is of the opposite voltage level to that of the input signals when the specified logical function is satisfied. This is indicated by a plus sign in FIG. 10*b* to show that the out of phase output signal is at a positive voltage level when the AND gate is satisfied.

Figure 10A:
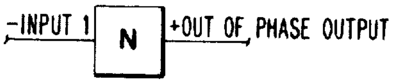
FIGS. 10*a* through 10*d* show various logic blocks used throughout the remaining figures.

This ability to obtain an out of phase output makes it possible to obtain an inversion of a signal by reducing the number of input signals to one on the AND gate circuit. This special case of the AND gate is usually drawn as shown in FIG. 10*a* where the symbol N is used to indicate inversion of the voltage level.

Figure 10B:
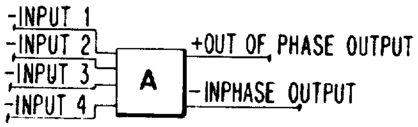
Figure 10C:
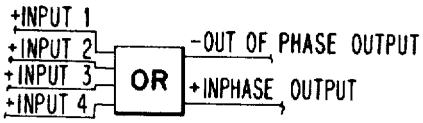

It is well known that a circuit designed to perform a logical AND function with negative input signals will also perform a logical OR function with positive input signals. In the present invention this alternate use of the circuit of FIG. 10*b* is usually drawn as shown in FIG. 10*c*. The +in phase output signal is at a positive voltage level when either input 1 or input 2 or input 3 or input 4 is at a positive voltage level. If the in phase output is at a positive voltage level, the —out of phase output is at a negative voltage level.

Figure 10D:
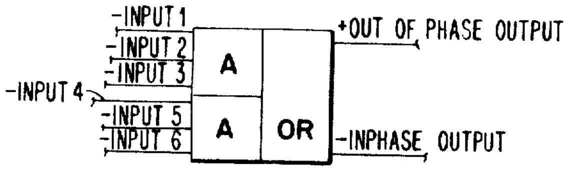

A circuit drawn as shown in FIG. 10*d* with two or more AND gates going directly to an OR gate will have the in phase output at a negative level if either the AND gate with inputs 1, 2 and 3 is satisfied or the AND gate with inputs 4, 5 and 6 is satisfied.

The various enabling signals generated in the decode circuit **9*b* and the circuit 1330 are now employed by the remaining logic circuit to perform the various selection possibilities available within the transfer circuit 11**.

BYTE SELECTION OPERATION

The basic size of the data handled in the system is a sub-unit of information or a byte. The byte comprises eight binary bits. There are several sources from which the btye selection indicia can be obtained. One source of these byte select signals is from the M3 register 127 shown in FIG. 2*n* available on a bus 1364, shown in FIG. 3*a*. The bus 1364 carries the bits 6 and 7 address indicia from the register 127 to a plurality of AND gates 1365 which operate to decode the four possible binary conditions from the bit 6 and bit 7 address lines. These conditions decode to one of a zero, one, two or three signal combination. The zero, one, two and three decode signals are applied to an output bus 1366 for transfer to the store control circuit 181 and to a gating stage 1367. The gating stage 1367 contains a plurality of AND gates. Each of the AND gates **1367*a*, and 1367*b* and 1367*c* receives a separate output signal zero, one and two respectively from the decode circuit 1365. Each of the AND gates in the gating circuit 1367 receives an enabling signal from a decode circuit 1368. The decode circuit 1368 is equipped with a plurality of input signals, the first of which is the not UPDATE ONLY signal, the second of which is the minus STORAGE READ INTERLOCK CYCLE signal on a line 1362, the third of which is the 2/3/4 timing signal from the clock circuit, and the fourth of which is the minus READ BYTE enabling signal on the line 1312. An output from the decode circuit 1368 gates the contents of the decode circuit 1365 through the gating circuit 1367 to a gating circuit 1369 in general and to the OR gate 1370 in particular. The one output signal from the gating circuit 1367 is applied to the OR gate 1370 by an intermediate OR gate 1371. The OR gate 1371 has an additional input signal from an AND gate 1372. The OR gate 1370 has a plurality of additional input signals from a plurality of AND gates 453′, 454′, 455′, and 456′. Although the gating circuit 1369 comprising the OR gate 1370 and input AND gates 453′–456′** is represented by a single OR and AND configuration in FIG. 3*b*, the circuit 1369 is actually a plurality of individual AND gates feeding a plurality of individual OR gates. More specifically, a corresponding decode signal from each of the input decode circuits and gating circuits is fed to an individual OR gate whereby one of the available input signals from a selected set is gated through the OR gate 1370. The gating circuit 1369 is employed to select one of the four available bytes for reading or writing. This selection is made by the decode of a plurality of available bit significant signals. One source of the byte selection signals is the decode circuit 1365.

A C1 decode circuit 256 shown in a copending application entitled, "Multi-Purpose Incrementing and Decrementing Marker Register Having Some Simultaneous Operations," filed Sept. 27, 1967, Ser. No. 671,028, assigned to the assignee of the present invention, forms a byte selection input to the gating circuit 1369. This input is applied to the AND gate 453′ by the bus 262′. The prime number will be employed here to identify the same element described in the above-mentioned application. A T45 decode circuit 402′ etc. applies its output signals to the gating circuit 1369 on a bus 410′. A T67 decode circuit 430′ etc. applies its output signals to the gating circuit 1369 by a bus 438′. A C2 decode circuit 266 shown in the above-mentioned application applies its output signals to the gating circuit 456′ by a bus 272′. The gating signals are developed in detail in the above-mentioned application.

The gating signal for the contents of the buses 262′, 410′, 438′ and 272′ are generated by the decode circuits **456*a*′, 456*c*′, 456*b*′, and 456*d*′ respectively. As previously mentioned, the gating for the decode of M6 and M7 is performed by the AND gate 1368. Since only three decoded signals are applied to the OR gate 1370 and there are four bytes in every word, the fourth byte select signal is generated by an AND gate 1373 which has as its input signals the gated, 0, 1 and 2** decoded signals from the selected set.

The output from the OR gate 1370 is applied to the sub-assembler 106 in the sub-unit assembler 14. The sub-unit assembler 106 comprises a plurality of stations, only one of which is shown in the accompanying figure. This representative station comprises a single OR gate 1400 and a plurality of input AND gates 1401 through 1404. Each of the AND gates in a single station receives an input data signal and a gating signal. Corresponding bits from a plurality of sources are applied to the AND gate in a single station. In this manner, the output signal from the OR gate 1400 represents one of the possible input signals in a corresponding bit position. The AND gate 1401 receives the corresponding bit signal from the sub-assembler 83. The gating signal for the AND gate 1401 is the 0 output signal from the OR gate 1370. The AND gate 1402 receives the corresponding bit position from the sub-assembler 84 and its gating signal is the 1 output signal from the OR gate 1370. The AND gate 1403 receives the corresponding bit signal from the sub-assembler 85 and its gating signal is the 2 output signal from the OR gate 1370. The AND gate 1404 receives the corresponding bit signal from the sub-assembler 86 and its corresponding signal is the 3 output signal from the AND gate 1373. The remaining sub-assemblers 103, 104, and 105 within the sub-unit assembler 14 are similar in design to the just described sub-assembler 106. Similar to the sub-assembler 106, only one station for the sub-assembler 103, 104, and 105 is shown. Each of the AND gates shown receives a corresponding bit signal from an identified portion of the unit assembler sub-assembly positions 83 to 86. The gating signals for each of the sub-unit assemblies 103 through 106 differ in origin and these enabling signals are hereinafter described in complete detail. The bytes of information selected by the gating circuit 1370 and gated through the sub-assembler 106 is gated into the A register 21 or the B register 23, depending upon the A and B register gating signal.

Figure 11:
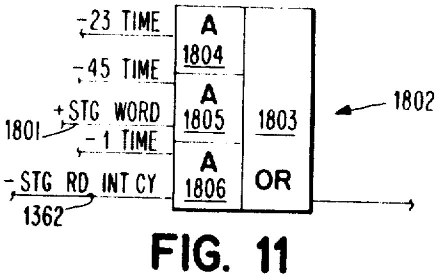
FIG. 11 shows the A register gating circuit.

The B register 23 gating signal is the 2/3 time signal from the clock. The A register 21 gating signal is the output signal from a circuit 1802 shown in FIG. 11. The circuit 1802 is made up of an OR gate 1803 which has three AND gates 1804–1806 as inputs. The AND gate 1804 has as an input signal the 2/3 time signal from the clock. The AND gate 1805 has a plurality of input signals, the first of which is the 4/5 time signal from the clock and the second of which is the NOT STORAGE WORD signal on a line 1801 from AND gate 1300 on FIG. 3*a*. The AND gate 1806 has a plurality of input signals, the first of which is the 1 time signal from the clock and the second of which is the STORAGE READ INTERLOCK CYCLE signal on a line 1362 from AND gate 1360 on FIG. 3*f*.

READ HALF WORD OPERATION

In a read operation it is the function of the apparatus to transfer a selected portion of data from the main storage area 2 to the active storage area 17. The current storage word operates to furnish an address destination to the active storage addressing circuit 27 shown in FIG. 1 and the source address information is placed into the memory address register 40. The selection is controlled by the AND gate 1372, shown in FIG. 3*a*. The AND gate 1372 is equipped with a plurality of input signals, the first of which is the read half word enabling signal available on the line 1308, the second of which is the not M3 bit 6 output signal from the bus 1364, the third of which is the storage read two-cycle output signal on the line 1358, and the fourth of which is the 2/3/4 time timing signal from the clock circuit. The not plus 3 bit 6 signal applied to the AND gate 1372 indicates that the decode circuit 1365 generates either an output signal on its 0 or 1 lines. More specifically, this means that the address in the register 40 is addressing the 0 or 1 bytes of the unit of information to be transferred. The output signal from the AND gate 1372 is applied to an OR gate 1405 and to the OR gate 1371. The output from the OR gate 1371 generates the enabling signal for gating the output of the assembler 84 through the group of AND gates 1402 of the sub-unit assembler 106 as previously described. This transfer is onto Byte 3 of the MDB16. The output from the OR gate 1405 on a line 1405*a* is employed to gate the output of the sub-assembler 83 through the sub-unit assembler 105. The output from the sub-unit assembler 105 is byte 2 of the main data bus 16. The output from the sub-assembler 106 is byte 3 of the main data bus 16. The contents of the byte 2 and 3 positions of the main data bus 16 are transferred to the Active Storage Bus In (ASBI) circuit 155 associated with the active storage modules 158 and 159.

Figure 31:
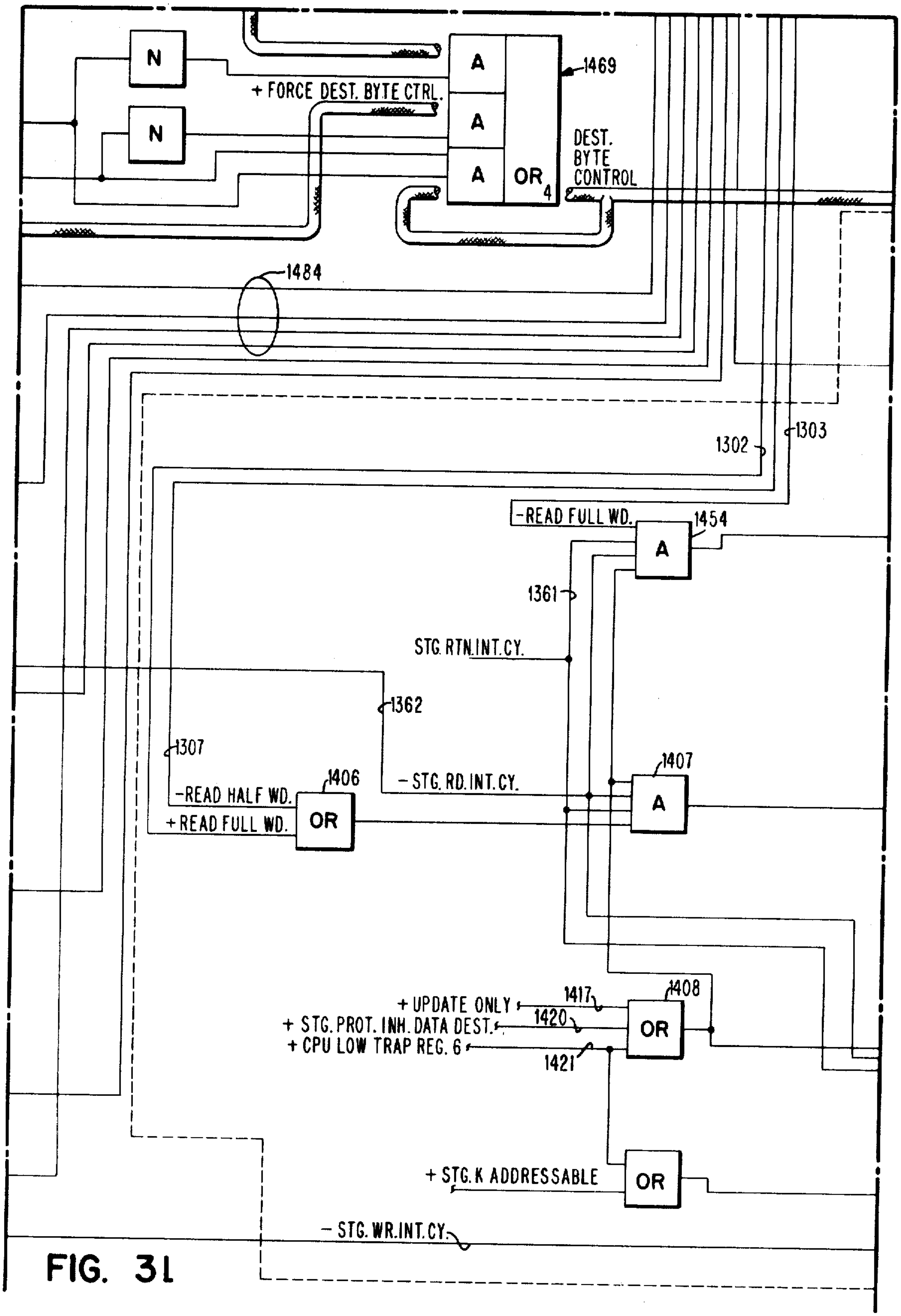

Simultaneous with the gating of the correct half word of information to the ASBI circuit 155, the active storage control circuit 166, shown in FIG. 3*m*, develops the enabling signals for gating the information from the ASBI in circuit 155 into the correct storage location. The read half word enabling signal on the line 1308 is applied to an OR gate 1406, shown in FIG. 31. The output from the OR gate 1406 is applied as one enabling input signal to an AND GATE 1407. The AND gate 1407 is equipped with an additional plurality of input signals, the first of which is the output from an OR gate 1408, the second of which is the STORAGE READ INTERLOCK CYCLE enabling signal from the AND gate 1360 on a line 1362, the third of which is the NOT STORAGE RETURN INTERLOCK signal which may be assumed to always be enabled for the present description. The output from the AND gate 1407 is applied to a storage sub-assembler 1409 within the store control circuit 166. In addition to the sub-assembler 1409, the store control circuit 166 comprises additional store sub-assembler circuits 1410, 1411, and 1412. Each of these sub-assemblers 1409 through 1412 is identical in design. The function of one of the sub-assemblers 1409 through 1412 is to gate from a plurality of sources enabling signals whereby the storage gate circuit 163 in each of the basic operating memories 156 through 159 is selectively enabled to gate the correct signals to be stored from the main data bus 16 into the respective basic operating module.

The sub-assembler 1409 comprises an OR gate 1413 having a plurality of input AND gates 1414, 1415, and 1416. The output from the AND gate 1407 is applied to the AND gate 1414. The AND gate 1414 is equipped with additional plurality of input signals, the first of which is a NOT 2 EXTERNAL ADDRESS signal on a line 1417, and the second of which is the 4 time signal from the clock circuit. The not 2 external address signal originates from the circuit 1324 shown in FIG. 3*j*. The AND gate 1414 is furnished its complement of input signals for energizing the store gate 163 in the module 158. The store gate 163 in the module 159 is active for the read half word operations if it is enabled in response to its input AND gate 1418. The AND gate 1418 is equipped with a plurality of input signals, the first of which is the NOT 2 EXTERNAL ADDRESS enabling signal on the line 1417, the second of which is the 4 time signal from the clock circuit, the third of which is the output of the OR gate 1408, the fourth of which is the NOT STORAGE RETURN INTERLOCK CYCLE enabling signal, and the fifth of which is the STORAGE READ INTERLOCK CYCLE signal on the line 1362. The OR gate 1408 is equipped with a plurality of enabling signals. These signals are of the security type to insure that the contents of the active storage device 17 are not made acceptable to a non-allowed user. These signals comprise the NOT UPDATE ONLY enabling signal on a line 1419, a NOT STORAGE PROTECT INHIBIT DATA destination enabling signal on a line 1420, and a NOT CPU LOW TRAP REGISTER REQUEST signal on a line 1421. The output signals from the sub-assemblers 1409 and 1412 operate to gate the data available on the main data bus 16 into the basic operating modules 158 and 159 at the address location designated by the contents of the active storage address assembler 27.

STORE HALF WORD OPERATION

In a store half word operation, it is the function of the apparatus to transfer a portion of a unit of information from the active storage device 17 into the designated location of the main memory 2. The store half word cycle is initiated by an AND gate 1425, shown in FIG. 3*a*. The AND gate 1425 is equipped with a plurality of input signals, the first of which is the STORE HALF WORD enabling signal on the line 1310, the second of which is the STORAGE WRITE ONE CYCLE enabling signal on a line 1354, and the third of which is the 6/7/8/9 timing signal from the clock circuit. The output from the AND gate 1425 is applied to an OR gate 1426 and to an OR gate 1427. The out of phase output signal GATE WA2 to BAϕ from the OR gate 1426 is applied to an AND gate 1428 in the sub-assembler 103. The AND gate 1428 operates to gate the contents of the sub-assembler 85 onto byte position 0 of the main data bus 16. The out of phase output signal GATE WA3 to BAϕ from the OR gate 1427 is applied to an AND gate 1430 in the sub-assembler 104. It is the function of the AND gate 1430 to gate the contents of the assembler 86 into the byte 1 position of the main data bus 16. The OR gate 1429 OR's the in phase output signals from OR gates 1431 and 1427 and produces an out of phase output signal GATE WA1 to BA1 which is used to gate the assembler 84 through the AND gate 1430 on assembler 104. The OR gate 1429 is not active for the store half word operation. The mechanism just described gates the contents of the sub-assemblers 85 and 86 into the byte positions 0 and 1 of the main data bus 16 by the sub-assembler 103 and 104. This is an example of the half unit selection process. This selection process can be easily expanded to gate other half word source informatiton into additional half word destination locations.

STORE BYTE OPERATION

The store byte operation is a transfer of a single byte of information from the active storage device 17, through the unit assembler 12, and into a predetermined location of the main storage device 2. This operation is signalled by the availability of an enabling signal on the line 1314 which is applied to an AND gate 1432 and to a first stage 1438 of the store control circuit 181. The first stage 1438 of the store control circuit 181 comprises a plurality of AND gates, one of which is responsive to a single output signal from the decode circuit 1365. The second input signal to each of the AND gates is the enabling signal on the line 1314. Accordingly, the store byte enabling signal 1 on the line 1314 gates the address decode of the byte to be stored through the stage 1438, 1440 and 1442 to the store circuits 59 associated with the BOM 54 and 5. The AND gate 1432 has an additional plurality of input signals, the first of which is the 6/7/8/9 timing signal from the clock and the second of which is the STORGE WRITE ONE CYCLE enabling signal. The output signal from the AND gate 1432 is applied to the OR gate 1427 and to a pair of OR gates 1433 and 1434. The GATE WA3 to BA0 output signal of the OR gate 1433 is applied to an AND gate 1435, shown in FIG. 3*d*, which gates the contents from the assembler 86 to byte 0 of the main data bus 16. The NOT GATE WA3 to BA0 signal is applied to an OR gate 1433*a*. A second input to the OR gate 1433*a* is the NOT GATE WA2 to BA0 signal. The out-of-phase output from the OR gate 1427 is applied to the AND gate 1800 which gates the contents from the assembler 86 to byte 1 of the main data bus 16. The GATE WA3 to BA2 output signal of the OR gate 1434 gates the contents of the sub-assembler 86 to byte 2 of the main data bus 16 by the AND gate 1436. The contents of the assembler 86 are gated by the sub-assembler 106 onto byte 3 of the main data bus 16 if AND gate 1373 is active. Accordingly, in the aforementioned byte select operation, the contents of sub-assembler 86 are gated to byte 3 of the main data bus 16 and to each of the remaining byte positions 0, 1, and 2. Simultaneous with the above gating onto the main data bus 16, the store byte enabling signal on the line 1314 is applied to a first stage gating circuit 1438 in the store control circuit 181. The gating station 1438 comprises a plurality of AND gates, each individual AND gate being responsive to one output signal from the decode circuit 1365 in addition to the gating signal on the line 1314. The store control circuit 181 comprises an additional plurality of gating stations 1440 and 1442. These stations operate to provide additional selection control signals to activate certain of the store circuits 59 shown in FIG. 3*e*.

The station 1440 comprises a plurality of OR gates 1443 through 1446. A corresponding OR gate is responsive to an input signal from the individual AND gate of the gating stage 1438. Additionally, each of the OR gates is responsive to an enabling signal available on the line 1305. The OR gates 1443 and 1444 are responsive to the output of an AND gate 1447. The OR gates 1445 and 1446 are responsive to the output from an AND gate 1448. In the present situation, the selected AND gates in the stage 1438 pass the gated information through the corresponding OR gate in the gating station 1440 for application to the third gating station 1442. This station 1442 comprises a plurality of AND gates 1449 through 1452. Each of the AND gates 1449 through 1452 is responsive to a respective input signal from the plurality of OR gates 1443 through 1446 respectively. Additionally, each of the AND gates is responsive to the 7/8 timing signal from the clock circuit. An additional gating input to each of the AND gates 1449 through 1452 originates from an AND gate 1453. Finally, the T mask circuit 184 represents the contents of byte positions 0 through 3 of the T register wherein the storage mask is built during the indirect byte operating procedure of the present mechanism. This mask is fully described in the copending application B. Without repeating the complete details of operation, the T mask circuit 184′ generates a plurality of output signals, 0, 1, 2, and 3 for application to the AND gates 1449 through 1452 respectively. The output signals from the AND gates 1449 through 1452 indicate the byte position of a unit of information in the main memory 2 into which the contents of the main data bus 16 are gated. The output from the final gating circuit 1442 is applied to the store gates 59 of the basic operating modules 54 and 55. For example, when the contents of the main data bus 16 are gated through the sub-unit assembler 14 and the corresponding output signal from the AND gate 1451 is available, the contents of the main data bus byte 2 is stored into byte position 2 of the main memory 2.

A READ FULL WORD OPERATION

In a full word read operation, a unit of information from the main storage device 2 is transferred into the designated location in the active storage device 17. In this condition the enabling signal on the line 1303 is applied to an AND gate 1454, shown in FIG. 3*l*. The AND gate 1454 operates to energize the store gate control 163 in the BOM's 156 and 157 by an AND 1455 and 1456 in the stations 1410 and 1411. The enabling signal NOT READ FULL WORD is applied to the AND gate 1407 as an enabling signal by the OR gate 1406. The output signal from the AND gate 1407 operates to energize the store gate circuit 163 in the BOM 158 by the AND gate 1414, and the OR gate 1413 of the stage 1409. The store gate 163 of the final module 159 is automatically energized by the AND gate 1418.

The sub-unit assembler 14 is designed such that bytes are gated onto main data bus 16 bytes ϕ, 1, 2 and 3 respectively by AND gates 1807, 1430, 1808 and 1404 in stations 103–106 respectively. The gating circuits are designed such that this type of transfer of a unit of information on bus 107 directly to the main data bus 16 occurs at any time that none of the other gates are present. An example of this is AND gate 1373 in FIG. 3*b*, which produces an output to AND gate 1404 when none of the gating signals 0, 1 or 2 from the OR gates 1370 are present. Therefore, in the full word read operation a full unit of information may be transferred from the bus 8$a$ through the external assembler stage 10, through the unit assembler 12 and through the sub-unit assembler 14 without providing and gating circuits unique to the full word operation.

A force destination byte control circuit 1460 comprises a plurality of stages 1461 through 1464. Each of the stages comprises a pair of input AND gates 1465 and 1466, an input OR gate 1467, and a second OR gate 1468. The OR gate 1467 is used in a branch and link word forcing to the active condition all outputs 0 through 3 for application to a destination byte control circuit 1469. The output from the destination byte control circuit 1469 provides an individual input to the store gate 163 in the modules 156 through 159 by the stages 1409 through 1412. The AND gate 1416, in each of the stages 1409 through 1412, transmits the forcing store signals to the store gates 163. The AND gates 1416 are equipped with a plurality of additional input signals, the first of which is a 0 time timing from the clock circuit, and the second of which is the output signal of circuit 1809 in FIG. 3$h$. Circuit 1809 consists of an OR gate 1810 which has as inputs the outputs of two AND gates 1811 and 1812. The AND gate 1811 has a plurality of input signals, the first of which is the output signal from an OR gate 1813, the second of which is the NOT ONE EXTERNAL ADDRESS signal on a line 1490 from OR gate 1320 on FIG. 3$j$, and the third of which is the NOT INHIBIT ADDRESS M3 UPDATE signal. The AND gate 1812 has a plurality of input signals, the first of which is the NOT TWO EXTERNAL ADDRESS signal on a line 1417 from OR gate 1328 on FIG. 3$j$, and the second of which is the WORD MOVE OR ARITHMETIC A DESTINATION signal from the control register decode circuit 9$b$. The OR gate 1813 has a plurality of input signals, the first of which is the NOT STORAGE INTERLOCK CYCLE signal on a line 1348, the second of which is the NOT STORAGE READ INTERLOCK CYCLE signal on a line 1361, the third of which is the NOT ALTER ACTIVE STORAGE signal, the fourth of which is the NOT BRANCH AND LINK-LINK WORD decode signal from circuit 9$b$, and the fifth of which is the output of an OR gate 1814 shown in FIG. 3$k$. The OR gate 1814 has a plurality of input signals, the first of which is the ouput of the AND gate 1815 and the second of which is the ARITHMETIC $B=A1B$ decode signal from decode circuit 9$b$. The AND gate 1815 has a plurality of input signals, the first of which is the BRANCH WORD decode signal from decode circuit 9$b$ and the second of which is the BRANCH S/R DECODE BUS O decode signal from decode circuit 9$b$. A WORD MOVE WORD enabling signal on a line 1470 is applied to the AND gates 1465 in the stages 1461 through 1464, shown in FIG. 3$j$. This is an enabling signal for indicating that the contents of the active storage byte location will be filled from the main data bus 16 according to the mask control contained in the byte 0 of the instant control word. The additional input signal through the AND gate 1465 is the bit position identification indicia from the byte 0, bits 4, 5, 6, and 7 of the current control word. The AND gate 1466 in the stages 1461 through 1464 is equipped with a plurality of input signals, the first of which is the output of an OR gate 1471, and the second of which is the output of a switch bus 1472. The bus 1472 is connected to a console switch whereby it is possible to dial an address for identifying one of the four possible byte positions in the active storage device 17. The active bit positions of the switch are the 2 and 3 positions. The AND gates 1466 in the stages 1461 through 1464 are employed to decode the four possible binary combinations of the bit 2 and 3 positions of the H switch. The OR gate 1471 is equipped with a plurality of input signals, the first of which is the enabling ALTER ACTIVE STORAGE signal, and the second of which is the ALTER EXTERNAL STORAGE signal. Accordingly, the byte selected by the H switch is gated by the output of the OR gate 1471.

A unit assembler gating circuit 1475, shown in FIG. 3$k$, is equipped with a plurality of stations 1476 through 1479. Each of the stations comprises a plurality of input AND gates 1480 through 1482 supplying output signals to an OR gate 1483. The output signals from the stations 1476 through 1479 are applied by a bus 1484 to respective AND gate portions of the assembler 12. The assembler 12 is similar in design to the completely described sub-unit assembler 14. More specifically, this means that the particular stage 83 in the assembler 12 contains a plurality of input AND gates and single OR gate. The enabling signals generated by the circuit 1475 are applied to a respective AND gate in each of the assembler stations 83 through 86 respectively. The output signal from the stage 1476 gates the contents of byte 0 of the bus 32 into the byte 0 of the bus 107. The output from the station 1477 gates the contents of byte 2 of the bus 32 onto byte 2 of the bus 107. The output from the station 1478 gates the contents of byte 2 of the bus 32 onto byte 2 of the bus 107. The output from the station 1479 gates the contents of byte 3 of the bus 32 onto byte 3 of the bus 107. It is the functioning of the circuit 1475 to gate the contents of the acive store bus out 32 into the bus 107 during several conditions determined by the enabling signals applied to the AND gates 1480–1482 respectively. The AND gates 1480 in the assemblers 1476 and 1479 are equipped with a plurality of input enabling signals, the first of which is the in-phase output signal of AND gate 1492 and the second of which is the 2/3 time signal from the clock. The AND gate 1492 is equipped with a plurality of input enabling signals, the first of which is the NOT GATE SWITCH TO M enabling signal, the second of which is the NOT BRANCH AND LINK WORD identifying enabling signal, the third of which is the NOT ONE EXTERNAL ADDRESS signal from circuit 1320, and the fourth of which is the NOT STORAGE INTERLOCK signal on a line 1347. The out-of-phase output of AND gate 1492 is applied as one of the enabling signals to an OR gate 1491. An additional enabling signal is applied to OR gate 1491 from AND gate 1489. The AND gate 1489 is equipped with a plurality of input signals, the first of which is the NOT ONE EXTERNAL ADDRESS signal and the second of which is the STORAGE WRITE WORD enabling signal on a line 1317. The output signal from the OR gate 1491 is applied as one of the enabling signals to the AND gates 1480 in the assemblers 1477 and 1478. The AND gates 1480 in assemblers 1477 and 1478 have an additional enabling signal which is the 2/3 time signal from the clock. The AND gates 1481 in assemblers 1476–1479 are equipped with a plurality of enabling signals, the first of which is the 4/5 time signal from the clock and the second of which is the output signal of OR gate 1496. The OR gate 1496 has two AND gates 1494 and 1497 applpying input signals to it. The AND gate 1494 has a plurality of input signals applied to it, the first of which is the ARITHMETIC WORD enabling signal on a line 1487 and the second of which is the NOT TWO EXTERNAL ADDRESS signal on a line 1417. Line 1417 is also applied as an enabling signal to AND gate 1497. The AND gate 1497 has a plurality of additional enabling signals, the first of which is the STORAGE WRITE ONE CYCLE signal on a line 1354 and the second of which is the NOT STORAGE LINK CYCLE ONE signal. The AND gates 1482 in assemblers 1476–1479 have a plurality of enabling signals applied, the first of which is the 6/7 time signal from the clock and the second of which is a FORCE ACTIVE STORAGE WORD ASSEMBLER signal on a line 1488.

Figures 4, 4I:
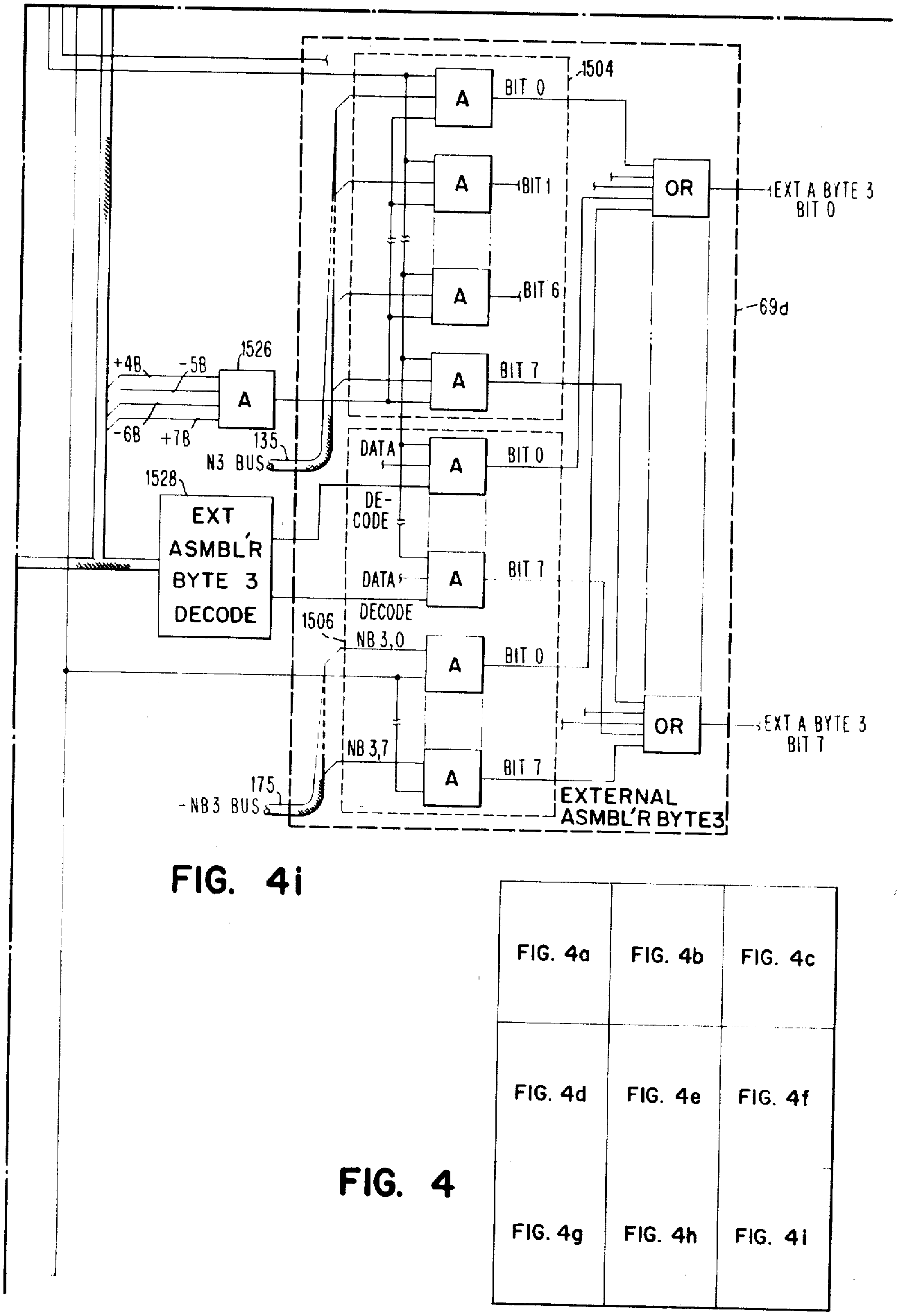
FIG. 4 shows the layout of FIGS. 4*a* through 4i.
FIGS. 4*a* through 4*i* show representative portions of the external register transfer circuits.
Figure 4A:
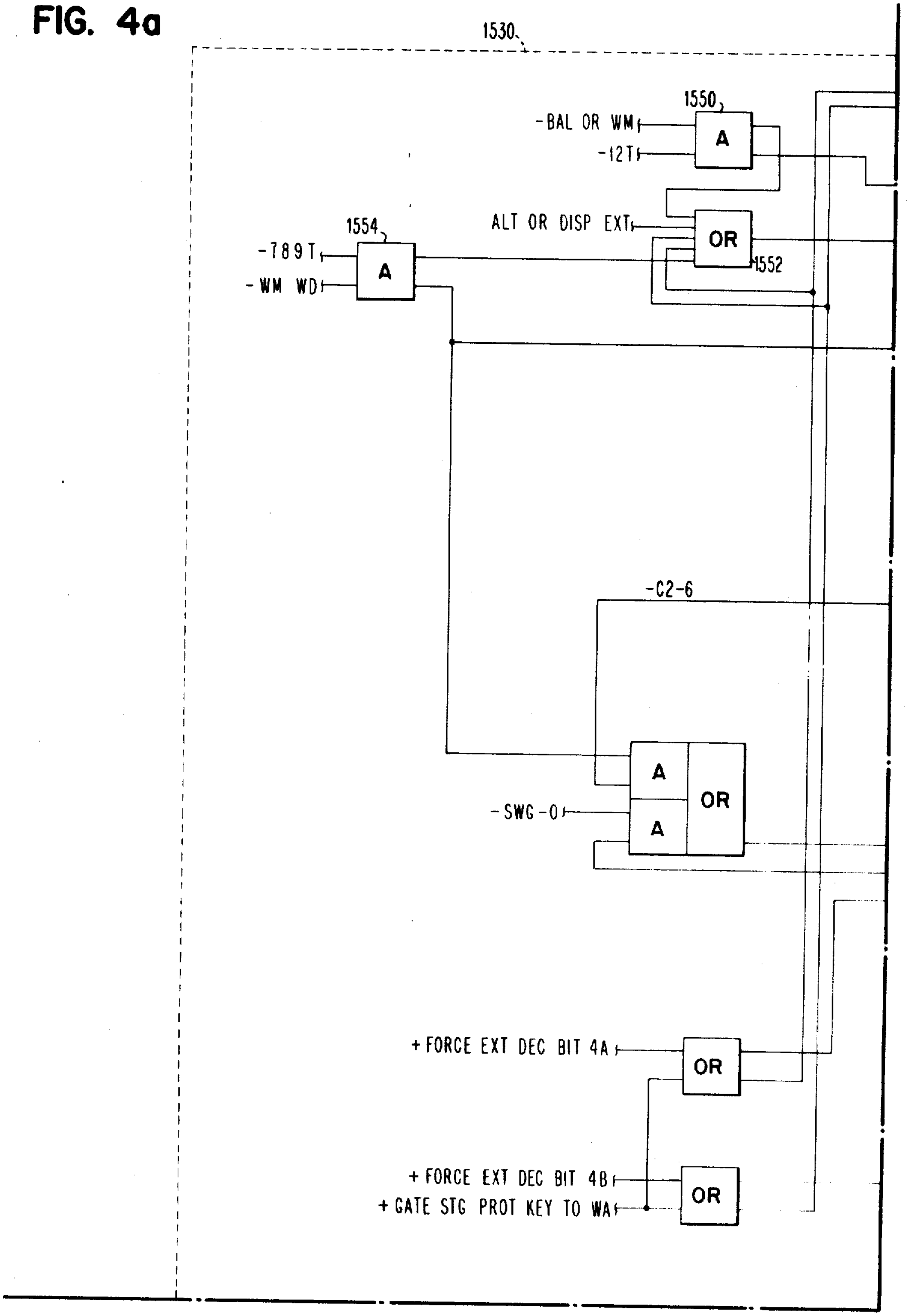
Figure 4B:
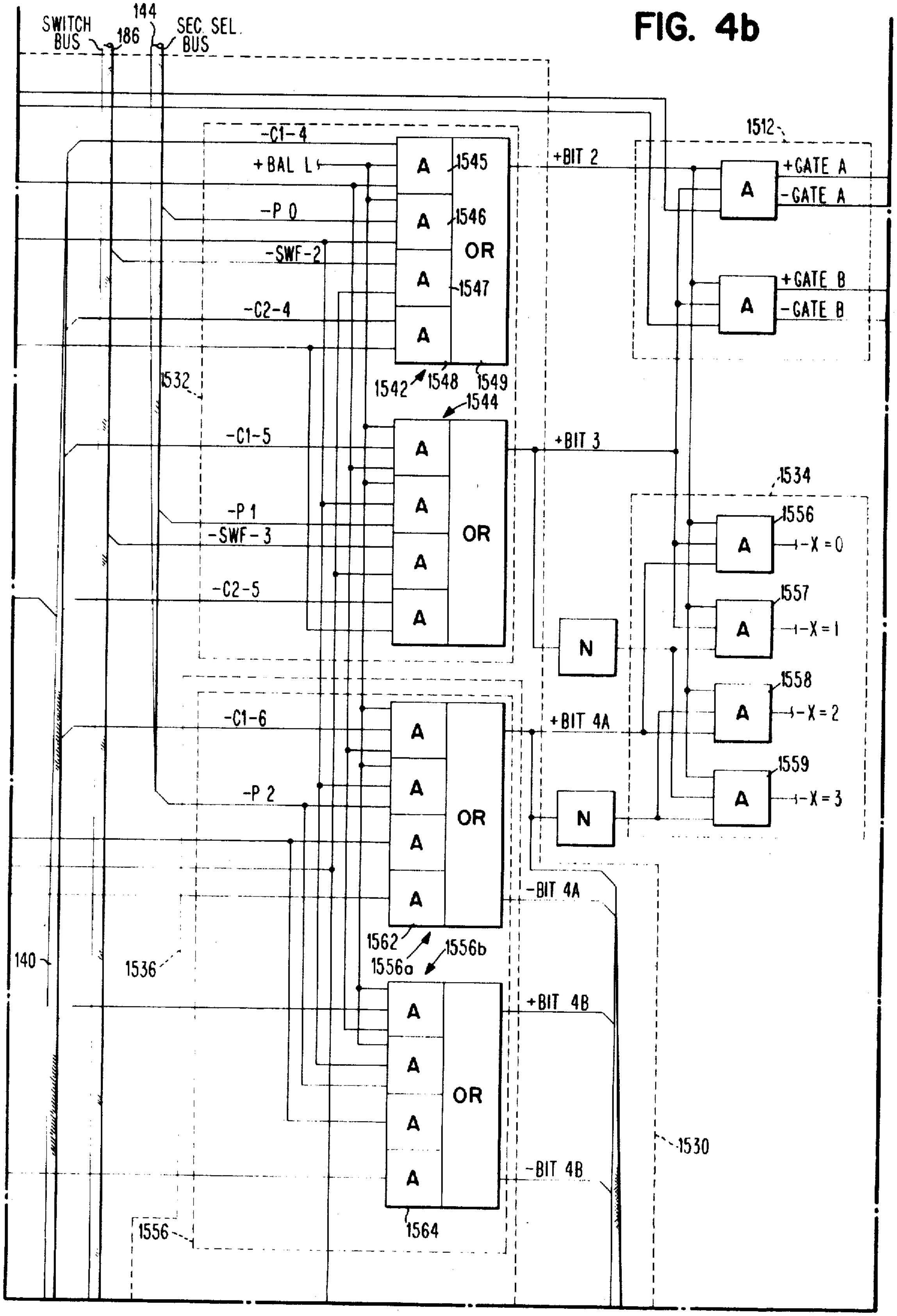
Figure 4C:
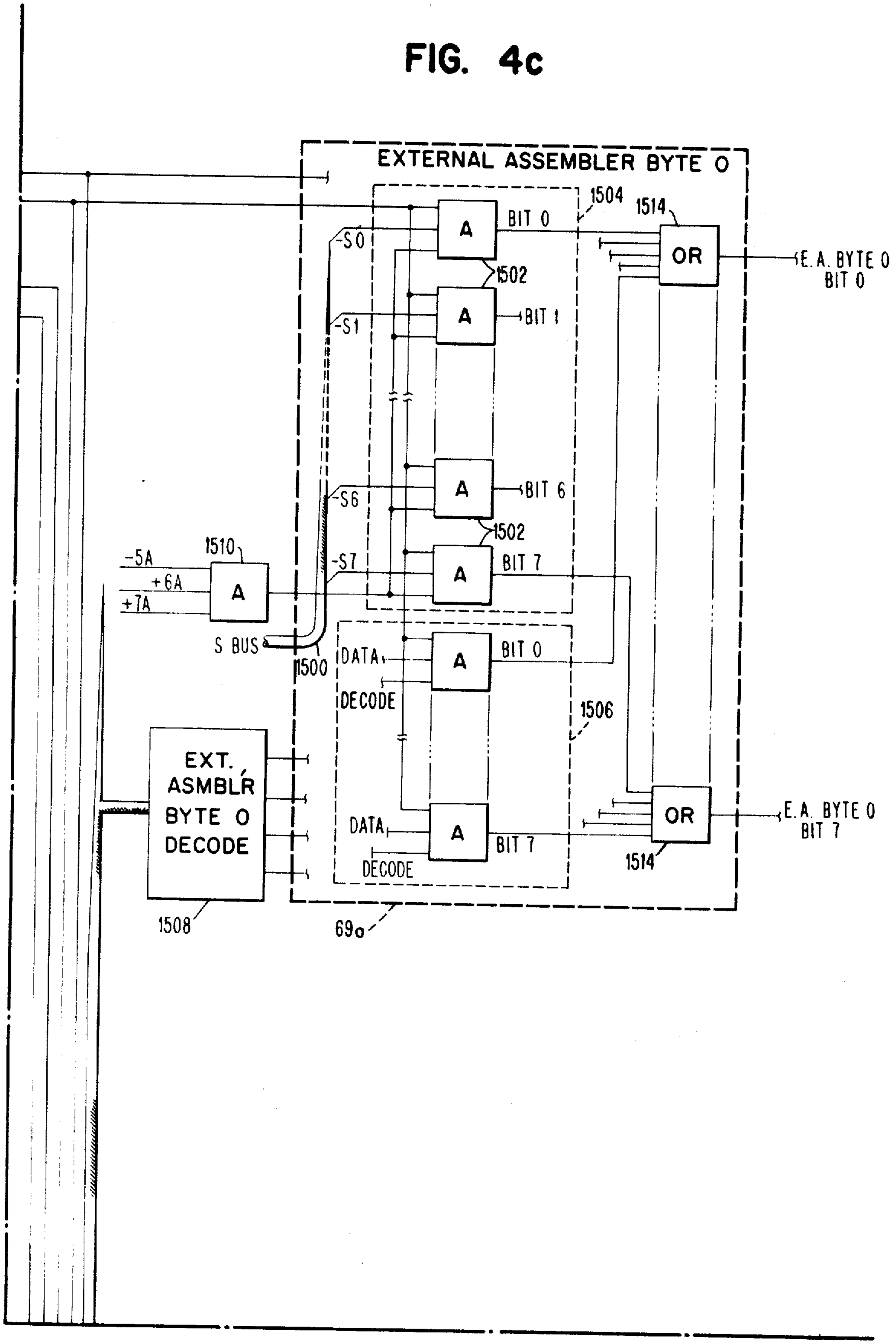
Figure 4D:
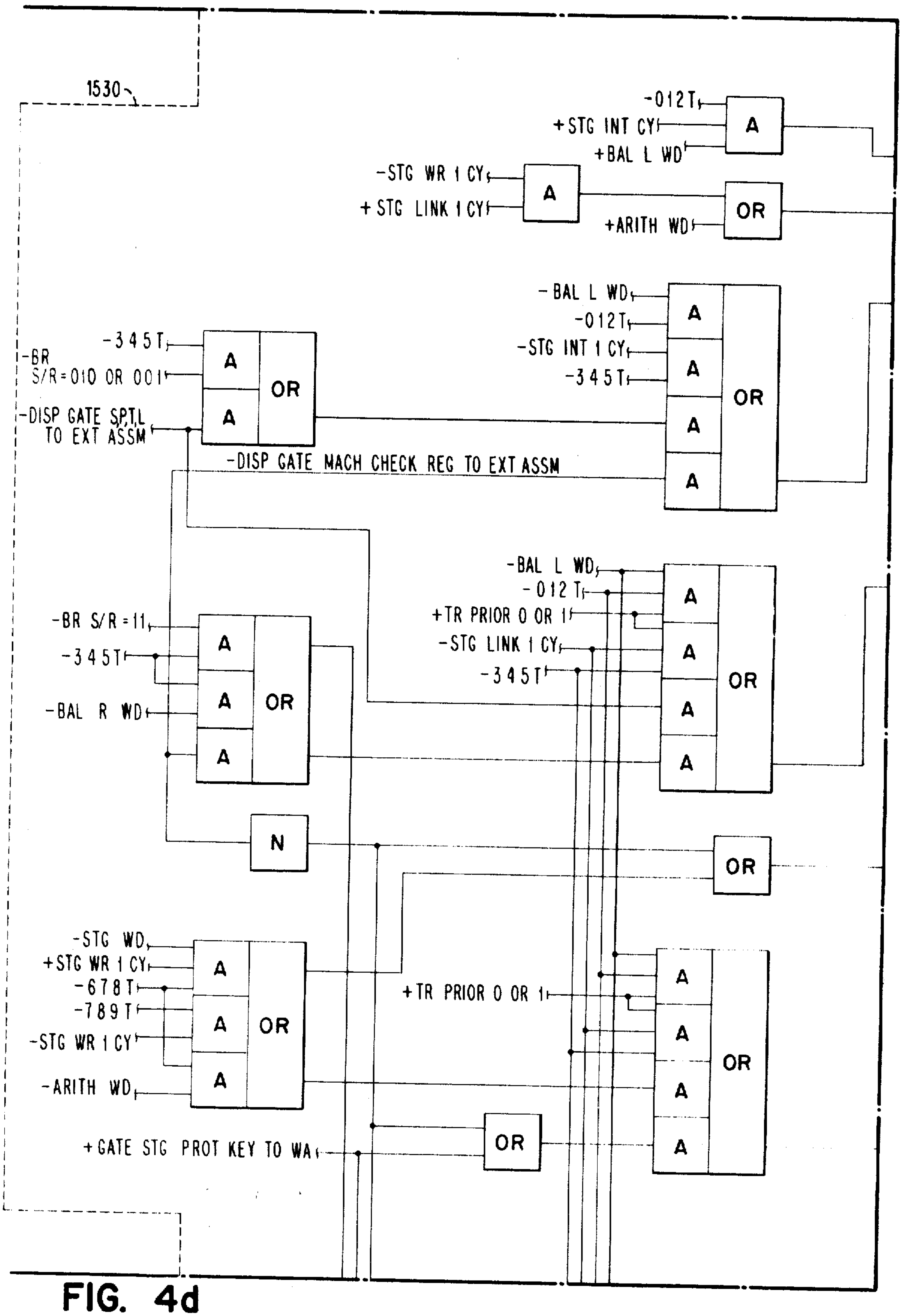
Figure 4E:
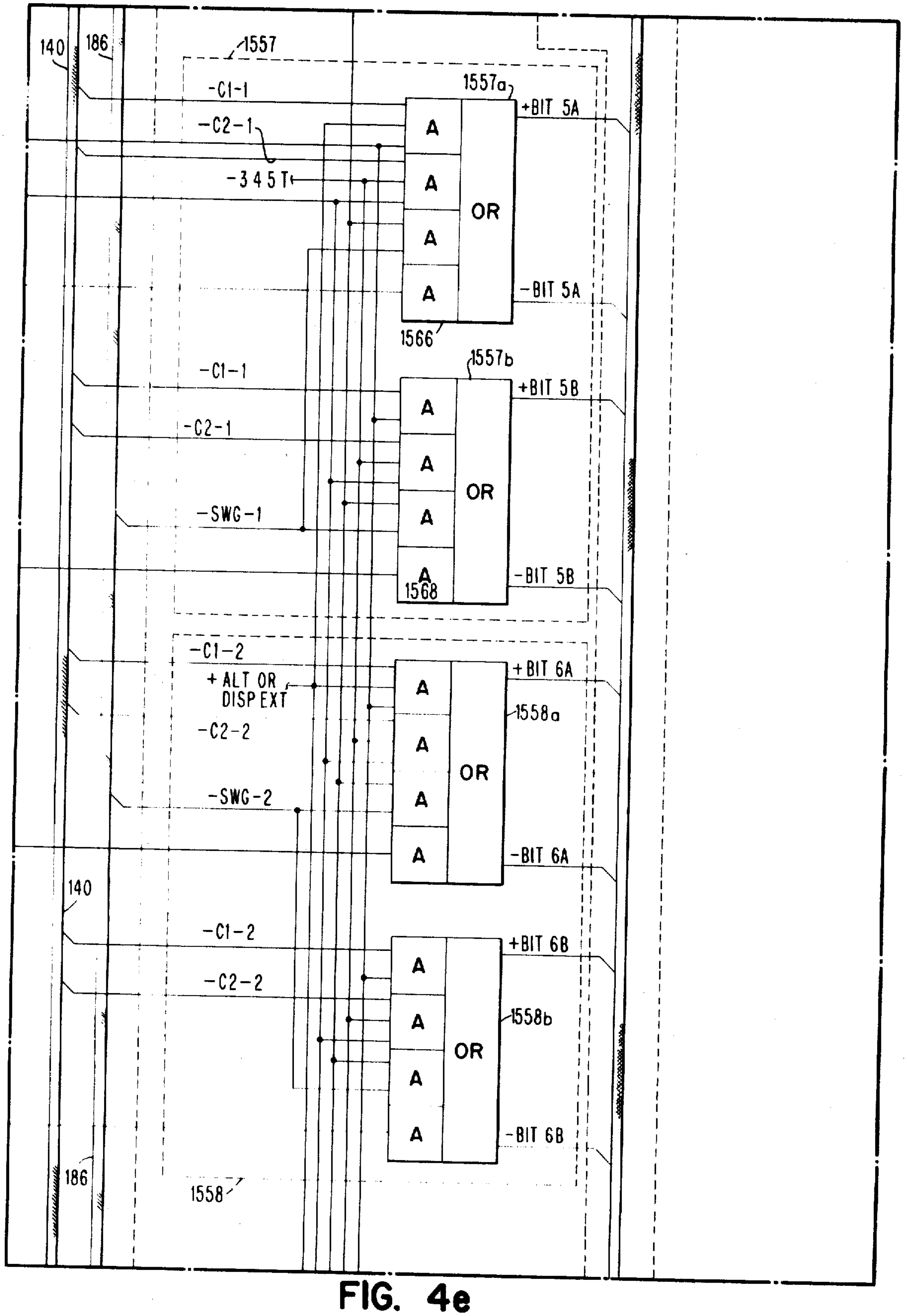
Figure 4F:
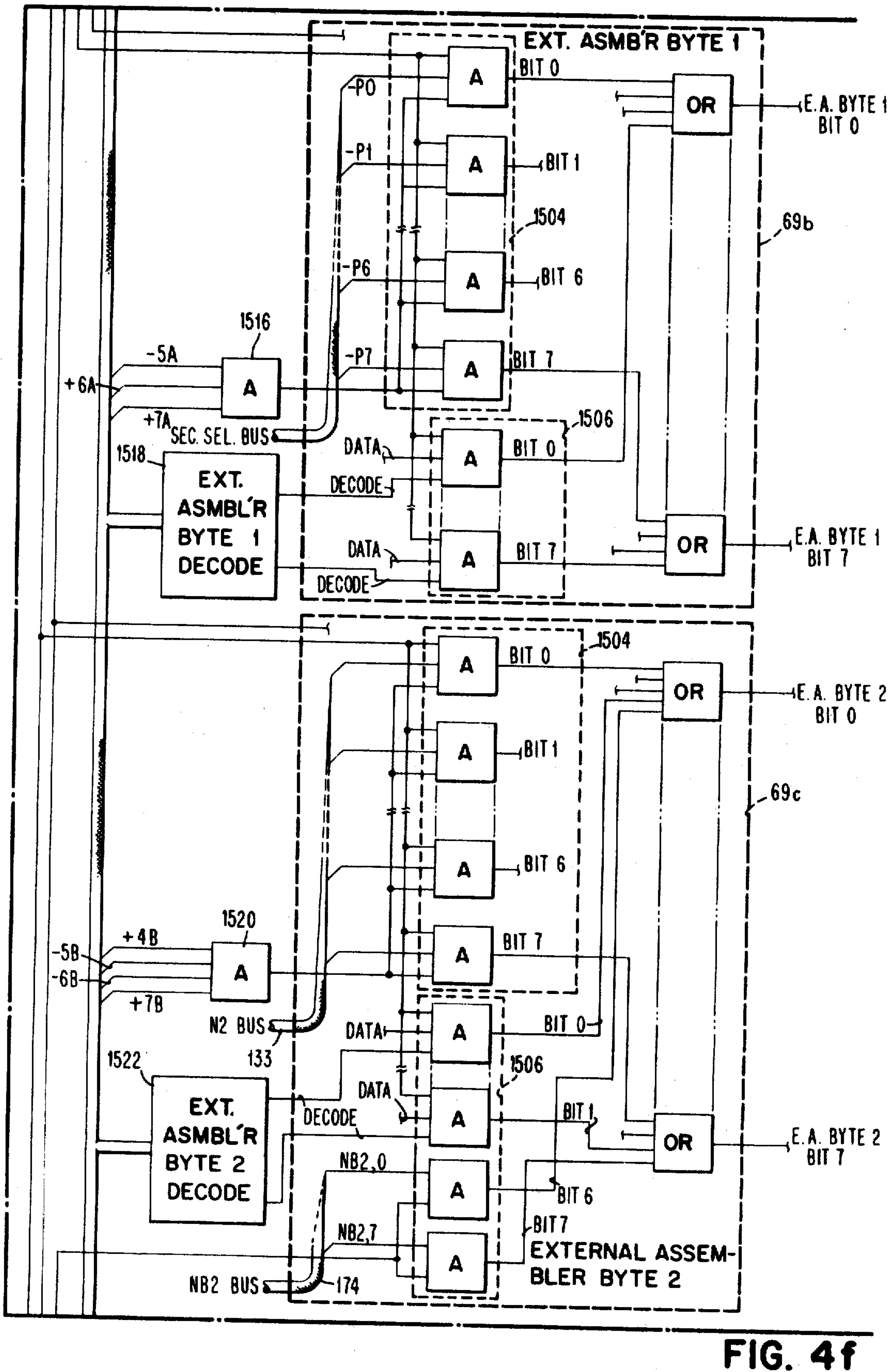
Figure 4G:
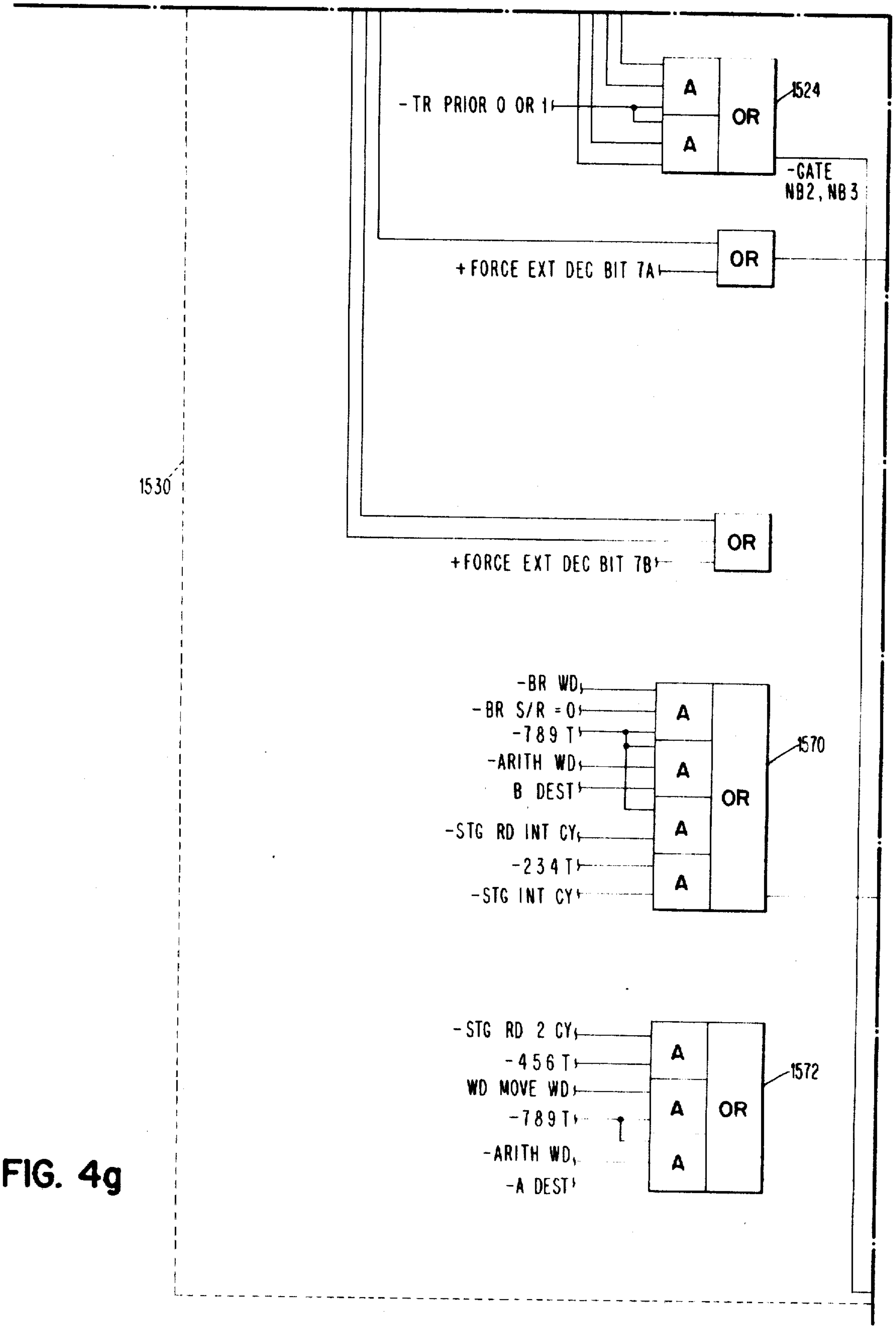

Referring to FIGS. 4$a$ through 4$i$, there can be seen the detail circuits employed in each of the external assemblers 69$a$ through 69$d$. A first selected source of information originating from the status register 18 is shown obtaining entry at FIG. 4$c$ into the external assembler 10, subassembly 69$a$, by a bus 1500. The sub-assembler 69$a$ comprises a plurality of AND gate 1502 in a data entry sub-assemblers 1504. A remaining plurality of sub-assemblers 1504 associated with other data sources are represented generally as 1506. More specifically, a plurality of sources similar to the status register 18 find entry into the byte 0 portion of the external assembler 10 by similar sub-assemblies 1504. Each AND gate 1502 within the sub-assemblies 1504 has a data entry, a decode entry, and a gate entry. The data entry comes from a data source similar to the status register 18; the decode enabling signal comes from an external assembler byte 0 decode circuit 1508. The details of one decode circuit are shown in the separate decode 1510 specifically associated with the status register 18. The gating signals are generated by a gate decode circuit 1512. The output of the sub-assembler **69*a* comprises 8 bit lines labeled bit 0 through bit 7. Entry onto these lines is achieved by a plurality of OR gates 1514. There is one OR gate 1514 for each bit line. The corresponding bit output signals from the sub-assemblies 1504 are applied to a corresponding OR gate 1514. Accordingly, bit 0 from each data source is applied to the bit 0 output line of the byte assembly 69*a* by an OR gate 1514. The remaining assemblers 69*b* through 69*d* are similar in design except that different data sources are specified for each specific sub-assembler 1504 and for the general sub-assemblers 1506. The specific source input for the sub-assembly 1504 shown in sub-assembly 69*b* is the section select register 28 as applied thereto over a bus 144. The external assembler byte decode enabling signal associated with the section select register 28 originates in a decode circuit 1516. Again, the external assembler byte 1 decode circuit 1518 supplies the remaining decode circuits for the remaining data sources finding input to byte 1 of the sub-assembler 69*b*. The sub-assembler 69*c* has as its specific input the N2 register 128 as applied thereto over a bus 133. The decode circuit associated with the N2 bus 133 is generated by a decode circuit 1520. The remaining decode enabling signals are generated by an external assembler byte two decode circuit 1522. The replacement register data source 172 finds input to the general sub-assembler 1506 of the sub-assembler 69*c* by the bus 174. The replacement register data input is a special case. The gating circuit associated therewith is generated by a gating circuit 1524** shown in FIG. 4*g*. The remaining data inputs are represented by the data input to the sub-assemblies 1506 associated with the sub-assembler **69*c*. The sub-assembler 69*d* has a first specific input shown originating from the N3 register 129 over the bus 135. The external assembler byte three decode specifically associated with the N3 register 129 is generated by a decode circuit 1526. A second specific data input originates with the replacement register 173 as applied over a bus 175. Similar to the replacement register 172, the decode circuit associated with the replacement register 173 originates in the decode circuit 1524. The remaining general data input is associated with the sub-assembler 506. The remaining external assembler byte three decode circuit associated with the general data input is generated in an external assembler byte three decode circuit 1528**.

The gate circuit 1512 generates a pair of gating signals called Gate A and Gate B. Each of the gating signals has a first phase plus and a second phase minus. Since the use of negative logic is empolyed throughout the present embodiment, the negative Gate A is an enabling signal when it generates a negative signal. This negative signal, Gate A, is associated only with external assembler bytes 0 and 1 as represented by the sub-assemblies **69*a* and 69*b*. The Gate B outputs from the circuit 512 is only associated with the sub-assemblers 69*c* and 69*d*. One phase of the Gate A signal is employed to gate certain data sources while the remaining phase is employed to gate other data sources. Which sources are associated with which phase is a matter of choice. The same use of the phases of Gate B is similar to that described for Gate A. The use of two phases extends the range of the number of data sources that can be gated into the external assembler 10** without expanding the decode of the signals available.

A source address assembler 1530 is shown on pages 4*a*, 4*b*, 4*d*, 4*e*, 4*g*, and 4*h*. The address assembler is shown comprising a first portion 1532 having the function of assembling signals for generating input signals for application to the gate circuit 1512 and for application to a destination decode circuit 1534. The source addressing assembler 1530 contains a second section 1536 for assembling signals for application to the external assembler decode circuits 1508, 1518, 1522, and 1528. A third section 1538 of the source address assembler 1530 has the function of assembling signals to identify a second set of destination signals in a Y destination decode circuit 1540. The remaining circuits shown on the enumerated figures are sources of enabling signals for selecting from a plurality of sources for gating signals through various stages of the source address assembler 1530.

The section select bus 144 supplies address indicia to both the section 1532 and the section 1536. The C bus 140 supplies address indicia to all sections 1532, 1536, and 1538. The switch bus 186 originating in the switch assembly 74 shown in FIG. 2*a* finds entry into all the sections 1532, 1536, and 1538. The address indicia has many diverse functions. The contents of the switch bus can be used during an alter and display operation signalled by the output from an inverter **1540*a*** shown in FIG. 4*h*. During the alter and display mode of operation of the host processor, the contents of the switches are empolyed to dial in the address of an external data source from which it is desired to display the contents of the external data source. Using various switches including Switch F and Switch G, it is possible to identify any one of the sixty-four available external data sources.

Figure 4H:
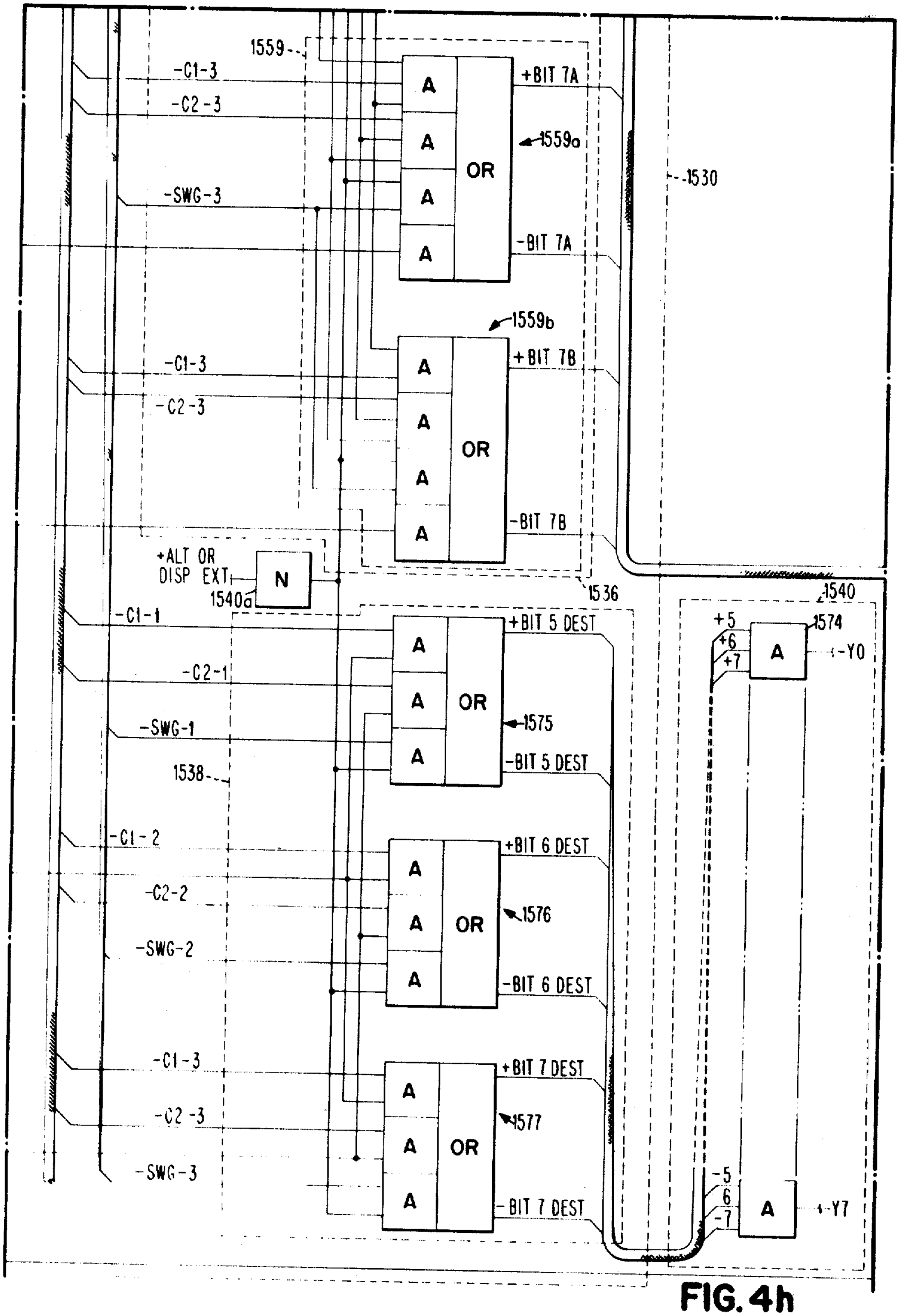

The sub-assembly 1532 comprises individual stages 1542 and 1544. The stage 1542 comprises a plurality of input AND gates 1545 through 1548 and a single output OR gate 1549. The stage 1544 is of identical construction. The AND gate 1547 in the stages 1542 and 1544 is selected as the input means for the address indicia originating in Switch F. Accordingly, the output of the inverter 1540 shown in FIG. 4*h* is applied as the enabling signal to the AND gate 1547 in the stages 1542 and 1544. The AND gate 1545 in the stages 1542 and 1544 is selected as the input mechanism whenever a branch and link-link operation is to be performed by the host processor. The branch and link-link enabling signal is generated by the control register decode circuit **9*b*** shown in FIG. 2*f*. An additional input signal to the AND gate 1545 is the C1 bit 4 signal from the control register **9*a* which specifies that the address to be decoded is that of an external register rather than an address in active storage 17. The remaining input enabling signal to the AND gate 1545 arises in an AND gate 1550. The AND gate 1550 has a plurality of input signals, the first of which is the 1/2 time signal from the clock and the second of which is a decode signal BRANCH AND LINK OR WORD MOVE arising in the control register decode circuit 9*b*. The AND gate 1546 is employed for gating the contents of the section select bus 144 into the stage 1542 and stage 1544. The gating signal for the AND gate 1546 originates from the branch and link information line source and the output from the OR gate 1552. Obviously, the outputs from the OR gates 1550, 1552, and inverter 1540*a* are mutually exclusive. A further enabling gating circuit associated with the AND gate 1548 originates from the AND gate 1554. The output from this circuit is also mutually exclusive with the herebefore mentioned circuits 1540, 1550, and 1552. The AND gate 1548 is employed for gating bits 4 and 5 of the control register 9*a* byte C2 into the stages 1542 and 1544** respectively.

In a first mode of operation the output signals from the stages 1542 and 1544 are employed in a circuit 1512 to generate the Gate A and B signals previously mentioned. The output signals from the stages 1542 and 1544 are also employed in an X decode circuit 1534 for generating data destination signals X0 through X3. The X0 through X3 signals are a decode from the stages 1552 and 1554. They are decoded by a plurality of AND gates 1556 through 1559. The portion 1536 comprises a plurality of matched stages 1556, 1557, 1558, and 1559. Each of the matched stages conprises an A stage **1556*a* and a B stage 1556*b*. The use of the alternate stages A and B is employed as a means for simultaneously generating two addresses within the portion 1536. More specifically, a particular alternate section 1556*a* differs only from its alternate section 1556*b* as to the forced input to its respective AND gate 1562 in stage 1556*a* and its AND gate 1564 associated with the stage 1556*b*. Similarly, the forcing inputs to the alternate stages 1557*a* by an AND gate 1566 and the forcing input to the stage 1557*b* by an AND gate 1568 are the only different input signals to the respective stages 1557*a* and 1557*b*. Similarly, the inputs to the the stages 1558*a* and 1558*b* and 1559*b* differ only in their forcing input signals. The forcing input signals are generated to allow forcing of certain bit combinations to be applied to the external assembler decode circuits 1508, 1518, 1522 and 1528. This is done to allow gating of information from sources not specified directly in the control words. An example would be the forcing of bits which would be decoded and activate a gate signal to enable gating the bus 8*a*** from memory through the external assembler.

The section 1538 also obtains address indicia input alternately from the C1 input from the decode bus 140, the C2 input from the decode bus 140 or the switch bus 186. Gating for the C1 input from the decode bus 140 is obtained from an OR gate 1570. Gating input for the C2 input of the decode bus 140 is obtained from an OR gate 1572. The gating for the switch input is obtained from the inverter **1540*a*. The output from the section 1538 is decoded in a decode section 1540 comprising eight individual AND gates 1574. Each of the individual AND gates decodes one of eight possible combinations from the output from the individual sections 1575, 1576, and 1577 of the sections 1538**.

The output from the circuits 1534 and 1540 combine together to select one of thirty-two possible data sources. The output signals from the circuits 1534 and 1540 cooperate in a manner identical with a coincident current memory insofar as one signal from each circuit is employed to a particular AND gate by a decode AND circuit (not shown) so as to enable the input circuitry to the register in a manner well known in the prior art. In this manner, the contents of the main data bus 16 as applied to the external register array 31 is enabled allowing information to be written into the selected external register.

While the invention has been particularly shown and described with reference to a preferred embodiment thereof, it will be understood by those skilled in the art that various changes in form and details may be made therein without departing from the spirit and scope of the invention.

What is claimed is:

1. An electronic digital computing apparatus comprising,

- a main data store having a plurality of separate storage positions and a fixed number of positions are combined into data storage units and each of said data storage units are further sub-divided into a plurality of sub-units and certain of said storage units being employed for storing microprogram control words and first signal controlled selection means for rendering any chosen one of said data storage units accessible and second signal controlled means for writing into any sub-unit storage position,
- a secondary data store having a plurality of separate storage positions and a fixed number of positions are combined into a plurality of data storage units and said storage units are arranged into a plurality of sections and each unit comprises a plurality of sub-units and third signal controlled selection means for rendering any chosen one of said data storage units accessible,
- a data transfer channel means including sub-unit selection means intermediate said secondary data store and said main data store,
- a sub-unit identification means,
- fourth signal controlled means responsive to said sub-unit identification means for writing a sub-unit of data into a location of said secondary data store identified by said sub-unit identification means, and
- transfer control means for effecting transfer over said transfer channel means of at least one data sub-unit from one of said data stores to a selected sub-unit position in said remaining data store.

2. An electronic digital computing apparatus comprising,

- a main data store having a plurality of separate storage positions and a fixed number of positions are combined into data storage units and each of said data storage units are further sub-divided into a plurality of sub-units and certain of said storage units being employed for storing microprogram control words and first signal controlled selection means for rendering any chosen one of said data storage units accessible and second signal controlled means for writing into any sub-unit storage position;
- a secondary data store having a plurality of separate storage positions and a fixed number of positions are combined into a plurality of data storage units and said storage units are arranged into a plurality of sections and each unit comprises a plurality of sub-units and third signal controlled selection means for rendering any chosen one of said data storage units accessible;
- a data transfer channel means including
  - sub-unit selection means,
  - a first gated input circuit responsive to the data accessed from said main data store,
  - a second gated input circuit responsive to the data accessed from said secondary data store, and
  - a first output means;
- an arithmetic logic unit responsive to said first output means for manipulating data applied therefrom, as identified by said sub-unit selection means;
- a sub-unit identification means connected to said sub-unit selection means; and
- fourth signal controlled means responsive to said first output means and said sub-unit identification means for writing a sub-unit of data into a location of said secondary data store identified by said sub-unit identification means.

3. An electronic digital computing apparatus comprising,

- a main data store having a plurality of separate storage positions and a fixed number of positions are combined into data storage units and each of said data storage units are further sub-divided into a plurality of sub-units and certain of said storage units being employed for storing microprogram control words and certain of said control words having first address indicia and first signal controlled selection means for rendering any chosen one of said data storage units accessible and second signal controlled means for writing into any sub-unit storage position,
- a secondary data store having a plurality of separate storage positions and a fixed number of positions are combined into a plurality of data storage units and said storage units are arranged into a plurality of sections and each unit comprises a plurality of sub-units and certain of said sub-units being employed for storing second address indicia and third signal controlled selection means for rendering any chosen one of said data storage units accessible and fourth signal controlled means for writing into any sub-unit storage position and combination of sub-unit storage positions, transfer means including sub-unit selection means and a plurality of gated input circuits and a full unit output circuit and a sub-unit output circuit, a first gated input circuit being responsive to said secondary data store, an arithmetic logic unit having input means responsive to said sub-unit output circuit for manipulating data applied therefrom and having output means at which said manipulated data is available, a second one of said plurality of gated input circuits being responsive to said arithmetic logic unit output means, a plurality of sub-unit storage register external to said data stores and addressably arranged in matrix configuration and each of said external registers having a gated input means and an output means, a third one of said plurality of gated input circuits being responsive to said output means of each external register for assembling certain plurality of said external registers into a unit storage group.

4. An electronic digital computing apparatus comprising, a main data store having a plurality of separate storage positions and a fixed number of positions are combined into data storage units and each of said data storage units are further sub-divided into a plurality of sub-units and certain of said storage units being employed for storing microprogram control words and first signal controlled selection means for rendering any chosen one of said data storage units accessible and second signal controlled means for writing into any sub-unit storage position and for writing into combinations of sub-unit storage positions, a secondary data store having a plurality of separate storage positions and a fixed number of positions are combined into a plurality of data storage units and said storage units are arranged into a plurality of sections and each unit comprises a plurality of sub-units and certain of said sub-units being employed for storing address indicia and third signal controlled selection means for rendering any chosen one of said data storage units accessible and fourth signal controlled means for writing into any sub-unit storage position and for writing into combinations of sub-unit storage positions, a sub-unit identification means responsive to said control words and said address indicia for generating gating signals, and transfer means including sub-unit selection means responsive to said control words and said sub-unit identification means for effecting partial unit gating and sub-unit gating.

5. An electronic digital computing apparatus as recited in claim 4 and further comprising, a plurality of storage registers externally positioned from said data stores and each of said external registers having a gated input means and an output means, and said transfer means further comprising a gated input circuit responsive to said output means of each of said external register for assembling the contents of any one of said registers and for assembling the contents of combinations of said registers.

References Cited

UNITED STATES PATENTS

| | | | |
|---|---|---|---|
| 3,351,909 | 11/1967 | Hummel | 340—172.5 |
| 3,348,210 | 10/1967 | Ochsner | 340—172.5 |
| 3,341,817 | 9/1967 | Smeltzer | 340—172.5 |

GARETH D. SHAW, Primary Examiner